United States Patent
Hayashi et al.

(10) Patent No.: US 7,362,486 B2
(45) Date of Patent: Apr. 22, 2008

(54) OPTICAL SCANNING DEVICE WITH AT LEAST ONE RESIN LENS FOR CONTROLLING A BEAM WAIST POSITION SHIFT

(75) Inventors: Yoshinori Hayashi, Tokyo (JP); Takeshi Ueda, Tokyo (JP); Kohji Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 33 days.

(21) Appl. No.: 11/223,051

(22) Filed: Sep. 12, 2005

(65) Prior Publication Data

US 2006/0077500 A1 Apr. 13, 2006

(30) Foreign Application Priority Data

| Sep. 29, 2004 | (JP) | ............................ 2004-284792 |
| Oct. 29, 2004 | (JP) | ............................ 2004-315996 |
| Feb. 8, 2005 | (JP) | ............................ 2005-031429 |
| Feb. 23, 2005 | (JP) | ............................ 2005-047314 |

(51) Int. Cl.
G02B 26/08 (2006.01)
G02B 3/08 (2006.01)

(52) U.S. Cl. .................................... 359/205; 359/742
(58) Field of Classification Search .............. 359/205, 359/566, 571, 207, 742
See application file for complete search history.

(56) References Cited

U.S. PATENT DOCUMENTS

| 659,353 | A | * | 10/1900 | Pitkin | .......................... 362/339 |
| 4,998,790 | A | * | 3/1991 | Iizuka et al. | ................. 359/207 |
| 5,208,701 | A | * | 5/1993 | Maeda | ........................ 359/574 |
| 5,212,501 | A | | 5/1993 | Nakamura et al. | |
| 6,104,522 | A | | 8/2000 | Hayashi et al. | |
| 6,215,574 | B1 | * | 4/2001 | Toyoda | ........................ 359/207 |
| 2002/0008896 | A1 | | 1/2002 | Ishibe | |
| 2003/0071203 | A1 | | 4/2003 | Inagaki | |
| 2003/0206322 | A1 | | 11/2003 | Atsuumi et al. | |
| 2004/0075912 | A1 | | 4/2004 | Kim | |
| 2004/0169905 | A1 | | 9/2004 | Hayashi et al. | |

(Continued)

FOREIGN PATENT DOCUMENTS

EP 0 872 754 A1 10/1998

(Continued)

OTHER PUBLICATIONS

"Fresnel lens." Britannica Concise Encyclopedia. 2003. Xreferplus. Feb. 8, 2007 <http://www.xreferplus.com/entry/5843740>.*

(Continued)

*Primary Examiner*—Stephone B. Allen
*Assistant Examiner*—Jennifer L Doak
(74) *Attorney, Agent, or Firm*—Oblon, Spivak, McClelland, Maier & Neustadt, P.C.

(57) ABSTRACT

A first optical system guides a light beam from a light source to an optical deflector, and a second optical system converges the light beam deflected by the optical deflector on a surface to be scanned. The first optical system includes at least one resin lens having a diffractive surface. The second optical system includes at least one resin optical element. A beam diameter depth in a main scanning direction, Wm, that can have a maximum intensity of $1/e^2$, satisfies conditions $$\Delta m1 + \Delta m2 + \Delta m3 - \Delta d1 \times (f2/f1)^2 < Wm/40 \quad (1)$$

$$\Delta d1 > 0 \text{ and } \Delta m2 < 0. \quad (2)$$

16 Claims, 13 Drawing Sheets

U.S. PATENT DOCUMENTS

| | | |
|---|---|---|
| 2005/0018268 A1 | 1/2005 | Hayashi et al. |
| 2005/0093955 A1 | 5/2005 | Izumi et al. |
| 2005/0099663 A1 | 5/2005 | Hayashi et al. |
| 2006/0077500 A1 | 4/2006 | Hayashi et al. |
| 2006/0285187 A1 | 12/2006 | Ichii et al. |
| 2007/0091398 A1* | 4/2007 | Ueda et al. .................. 359/18 |

FOREIGN PATENT DOCUMENTS

| | | |
|---|---|---|
| JP | 11-142733 | 5/1999 |
| JP | 11-223783 | 8/1999 |
| JP | 11-242157 | 9/1999 |
| JP | 3008380 | 12/1999 |
| JP | 2000-171741 | 6/2000 |
| JP | 2001-56436 | 2/2001 |
| JP | 2001-305453 | 10/2001 |
| JP | 2002-214556 | 7/2002 |
| JP | 2002-287062 | 10/2002 |
| JP | 3397683 | 2/2003 |
| JP | 3473351 | 9/2003 |
| JP | 2003-337295 | 11/2003 |
| JP | 2004-126192 | 4/2004 |
| JP | 2004-280056 | 10/2004 |
| JP | 3618557 | 11/2004 |

OTHER PUBLICATIONS

"Fresnel lens." The American Heritage® Dictionary of the English Language. 2003. Xreferplus. Feb. 8, 2007 <http://www.xreferplus.com/entry/4089526>.*
U.S. Appl. No. 11/146,106, filed Jun. 7, 2005, Atsuumi et al.
U.S. Appl. No. 11/609,796, filed Dec. 12, 2006, Hayashi et al.
U.S. Appl. No. 11/745,096, filed May 7, 2007, Hayashi et al.
U.S. Appl. No. 11/782,268, filed Jul. 24, 2007, Ichii et al.
U.S. Appl. No. 11/844,643, filed Aug. 24, 2007, Saisho et al.
U.S. Appl. No. 11/850,401, filed Sep. 5, 2007, Saisho et al.

* cited by examiner

MAIN SCANNING DIRECTION

SUB-SCANNING DIRECTION

- NORMAL TEMPERATURE
- TEMPERATURE VARIATION
- WAVELENGTH JUMP

MAIN SCANNING DIRECTION

SUB-SCANNING DIRECTION

♦ NORMAL TEMPERATURE
■ TEMPERATURE VARIATION

MAIN SCANNING DIRECTION

SUB-SCANNING DIRECTION

◆ NORMAL TEMPERATURE
■ TEMPERATURE VARIATION
▲ WAVELENGTH JUMP

MAIN SCANNING DIRECTION

SUB-SCANNING DIRECTION

♦ NORMAL TEMPERATURE
■ TEMPERATURE VARIATION

US 7,362,486 B2

OPTICAL SCANNING DEVICE WITH AT LEAST ONE RESIN LENS FOR CONTROLLING A BEAM WAIST POSITION SHIFT

CROSS-REFERENCE TO RELATED APPLICATIONS

The present document incorporates by reference the entire contents of Japanese priority document, 2004-284792 filed in Japan on Sep. 29, 2004, 2004-315996 filed in Japan on Oct. 29, 2004, 2005-031429 filed in Japan on Feb. 8, 2005, 2005-047314 filled in Japan on Feb. 23, 2005.

BACKGROUND OF THE INVENTION

1. Field of the Invention

The present invention relates to an optical scanning device and an image forming apparatus.

2. Description of the Related Art

The recent years have seen advancement in high-density image formation through optical scanning in image forming apparatuses, such as digital copiers, laser printers, and the like. Also, there is a requirement for a smaller beam spot on the photosensitive drum and, from the point of view of overall cost reduction of the optical scanning device, use of a resin lens.

On the other hand, any variation in environmental temperature brings about a variation in the curvature, thickness, and refractive index of a resin lens. A variation in the wavelength also causes a variation in the refractive index due to dispersion of a resin lens. This tendency of the lens characteristics to vary with temperature fluctuations or wavelength variation results in a large beam spot and causes the image focus location (point of focus) of the beam spot to vary, degrading the quality of the image.

This problem is not limited to resin lenses. Lens characteristics of even glass lenses vary with temperature and wavelength.

An improved resin lens structure is disclosed in Japanese Patent Laid-Open Publication No. 2002-214556. Japanese Patent Laid-Open Publication No. 2004-126192, Japanese Patent Laid-Open Publication No. 2003-337295, and Japanese Patent Laid-Open Publication No. H11-223783 disclose a lens with a diffractive surface. Japanese Patent Laid-Open Publication No. 2004-280056 discloses a method of forming a full color image by combining the toner images of different colors.

Resin lenses are preferable over glass lenses because they are light weight and non-expensive. Further, special figures, such as an aspherical surface, can be easily formed on a resin lens. Optical characteristics of a resin lens can be improved by forming special surfaces on the resin lenses. Because the optical characteristics of a resin lens can be improved, the same function can be performed with less number of lenses.

In other words, using resin lens can make the laser scanning device more compact, lighter, and cheaper. However, on the flipside, resin lenses are susceptible to variations in environmental conditions, and particularly, change shape and have varying refractive indices with change in the temperature. Consequently, their optical characteristics, and particularly, the power, deviate from the design value, thus causing a variation in the "beam spot diameter" which is the laser spot diameter on the surface being scanned.

The method of canceling out the variation in the power of the resin lens due to temperature variation by using a positive lens and a negative lens in the optical scanning device is very well known.

Semiconductor laser devices are employed as a light source in the optical scanning devices. These Semiconductor laser devices generally tend to output light having a longer wavelength when there is a rise in the temperature ("variation in the wavelength due to temperature variation"). The wavelength also varies due to "mode hopping". The variation in the wavelength gives rise to chroma aberration of the optical system used in the optical scanning device, which in turn results in a variation in the beam spot diameter.

Thus, in the optical scanning device using resin lenses in the optical system and a semiconductor laser device as a light source, it has to be taken into consideration while carrying out optical designing that optical characteristics can vary not only due to temperature variation but also due to the variation in the wavelength of the light source.

Optical scanning devices (laser scanning devices) designed taking into account the variation in the optical characteristics and the wavelength of the light source due to temperature have been disclosed in Japanese Patent Laid-Open Publication No. 2002-287062, Japanese Patent No. 3397683, and Japanese Patent Laid-Open Publication No. 2000-171741 in which a power diffractive surface is provided to stabilize the optical characteristics.

In the optical scanning device disclosed in Japanese Patent Laid-Open Publication No. 2001-287062, a light source optical system lets a light beam emitted from a light source travel parallel in a main scanning direction and converges the light beam emitted from the light source near the deflective surface of an optical deflector in a sub-scanning direction. The light source optical system is a single resin optical element having more than one reflective surface without an axis of rotation symmetry, and two transparent surfaces, with a power diffractive surface provided in the transparent surfaces. In a comparative example of the disclosed optical scanning device, one power diffractive surface each is provided in a resin collimator lens that collimates the light beam emitted from the semiconductor laser device and a resin cylindrical lens that converges the collimated light beam in the sub-scanning direction. "Power diffractive surface" refers to a diffractive surface having a lens power due to diffraction.

In Japanese Patent No. 3397683, a method is disclosed for reducing and compensating for the variation in "the focal position of the beam scanning the surface" by positioning a diffractive surface more towards the light source than the optical deflector and another diffractive surface in the scanning optical system that converges the deflected beam towards the scanning surface, thereby changing the diffraction angle according to the variation in the wavelength.

In Japanese Patent Laid-Open Publication No. 2000-171741, a method of correction by "varying the focal position of the light beam scanning the surface" according to the variation in the wavelength of the light emitted from the semiconductor laser device, by making the surface of the collimator lens, which converts the light beam emitted from the semiconductor laser device into parallel rays, as the power diffractive surface.

In the light source optical system disclosed in Japanese Patent Laid-Open Publication No. 2002-287062, a single optical element must include both the transparent surface and the reflective surface, and a curved reflective surface. This is particularly easy to design for manufacturing purposes.

A collimator lens that lets the light beam emitted from the semiconductor laser device to travel parallel generally the most powerful lens among the optical elements used in an optical scanning device. Therefore, when employing a collimator lens as a power diffractive surface, such as in the instance disclosed as a comparative example in Patent document 2, or in Japanese Patent Laid-Open Publication No. 2000-171741, there is a risk of an adverse effect in the form of "degradation of wavefront aberration of the collimated light beam". Since degradation of wavefront aberration includes the effect of increasing the beam spot diameter, using collimating lens poses a problem for high resolution images for which a very small beam spot diameter is a prerequisite.

Further, in optical scanning devices, it is common to include an anamorphic optical element as one of the optical elements disposed between the light source and the scanning surface. The anamorphic optical element has a different imaging action in the main scanning direction and the sub-scanning direction. Thus, optical scanning devices generally have different imaging actions in the main scanning direction and the sub-scanning direction. In the method of forming power diffractive surface on the collimating lens disclosed in Japanese Patent Laid-Open Publication No. 2002-287062 and Japanese Patent Laid-Open Publication No. 2000-171741, the power diffractive surface is rotationally symmetrical with respect to the optical axis. Consequently, the effect of variation in the emission wavelength of the semiconductor laser device on imaging in the main scanning direction and the sub-scanning direction cannot be adjusted independently.

In the method disclosed in Japanese Patent Laid-Open Publication NO. 3397683, the scanning optical element on which the power diffractive surface and which converges the deflected beam towards the scanning surface is generally a lens that is long in the main-scanning direction. The process of forming a diffractive surface on an operative area of the long lens is a time-consuming one as a large area needs to be covered, the low production rate of the lens pushing up the cost.

SUMMARY OF THE INVENTION

It is an object of the present invention to at least solve the problems in the conventional technology.

According to an aspect of the present invention, an optical scanning device includes a light source that emits a light beam; a first optical system that guides the light beam emitted by the light source; an optical deflector that deflects the light beam guided by the first optical system; and a second optical system that converges the light beam deflected by the optical deflector on a surface to be scanned. The first optical system includes at least one resin lens having a diffractive surface, the second optical system includes at least one resin optical element. A beam diameter depth in a main scanning direction, Wm, that can have a maximum intensity of $1/e^2$, satisfies conditions $$\Delta m1 + \Delta m2 + \Delta m3 - \Delta d1 \times (f2/f1)^2 < Wm/40 \quad (1)$$

$$\Delta d1 > 0 \text{ and } \Delta m2 < 0 \quad (2)$$

where, $\Delta m1$ is a beam waist position shift in the main scanning direction due to a change in the power in a refracting unit when the temperature in the first optical system rises by 1° C., $\Delta m2$ is a beam waist position shift in the main scanning direction due to a change in the power in the diffracting unit when the temperature in the first optical system rises by 1° C., $\Delta m3$ is a beam waist position shift in the main scanning direction when the temperature in the second optical system rises by 1° C., $\Delta d1$ is a shift in the distance between a forward principal point of the first optical system in the main scanning direction and the light source when the temperature in the first optical system rises by 1° C., f1 is a focal distance of the first optical system in the main scanning direction, and f2 is a focal distance of the second optical system in the main scanning direction.

According to another aspect of the present invention, an optical scanning device includes a light source that emits a light beam; a first optical system that guides the light beam emitted by the light source; an optical deflector that deflects the light beam guided by the first optical system; and a second optical system that converges the light beam deflected by the optical deflector on a surface to be scanned. The first optical system includes at least one resin lens having a diffractive surface, the second optical system includes at least one resin optical element. A beam diameter depth in a sub-scanning direction, Ws, that can have a maximum intensity of $1/e^2$, satisfies conditions $$\Delta s1 + \Delta s2 + \Delta s3 - \Delta d1 \times (\beta 1 \times \beta 2)^2 < Ws/40 \quad (4)$$

$$\Delta d1 > 0 \text{ and } \Delta s2 + \Delta s2 < 0 \quad (5)$$

where, $\Delta s1$ is a beam waist position shift in the sub-scanning direction due to a change in the power in the refracting unit when the temperature in the first optical system rises by 1° C., $\Delta s2$ is a beam waist position shift in the sub-scanning direction due to a change in the power in the diffracting unit when the temperature in the first optical system rises by 1° C., $\Delta s3$ is a beam waist position shift in the sub-scanning direction when the temperature in the second optical system rises by 1° C., $\Delta d1$ is a shift in the distance between a forward principal point in a main scanning direction of the first optical system and the light source when the temperature in the first optical system rises by 1° C., $\beta 1$ is a lateral magnification of the first optical system in the sub-scanning direction, and $\beta 2$ is a lateral magnification of the second optical system in the sub-scanning direction.

According to another aspect of the present invention, an optical scanning device includes a light source that emits a light beam; a coupling lens that shapes the light beam into a beam pattern; an anamorphic optical element that guides the light beam shaped by the coupling lens; an optical deflector that deflects the light beam guided by the anamorphic optical element; and a scanning optical system that converges the light beam deflected by the optical deflector on a surface to be scanned to form a laser spot. The scanning optical system includes more than one resin lens. The anamorphic optical element is a resin lens having a first surface and a second surface, the first surface being rotationally symmetric having formed thereon a concentric circular power diffractive surface, the second surface having formed thereon a power diffractive surface that converts the light beam emitted from the light source into a parallel light beam in a main scanning direction and into a convergent light beam in a sub-scanning direction. The power of the power diffractive surface is set so that a beam waist position shift in a main scanning direction or a sub-scanning direction or both the main scanning direction and the sub-scanning direction, caused by mode hopping or temperature variation in the semiconductor laser device is substantially zero.

According to another aspect of the present invention, an optical scanning device includes a light source that emits a light beam; a coupling lens that shapes the light beam into a beam pattern; an anamorphic optical element that guides the light beam shaped by the coupling lens; an optical deflector that deflects the light beam guided by the anamorphic optical element; and a scanning optical system that converges the light beam deflected by the optical deflector on a surface to be scanned to form a laser spot. The scanning optical system includes more than one resin lens. The anamorphic optical element is an anamorphic resin lens having a first surface and a second surface, the first surface being anamorphic refractive surface, the second surface bearing thereon a power diffractive surface having an axis in a main scanning direction. The power of the power diffractive surface is set so that a beam waist position shift in the main scanning direction or a sub-scanning direction or both the main scanning direction and the sub-scanning direction, caused by mode hopping or temperature variation in the semiconductor laser device is substantially zero.

According to still another aspect of the present invention, an image forming apparatus includes an optical scanning device according to the present invention.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
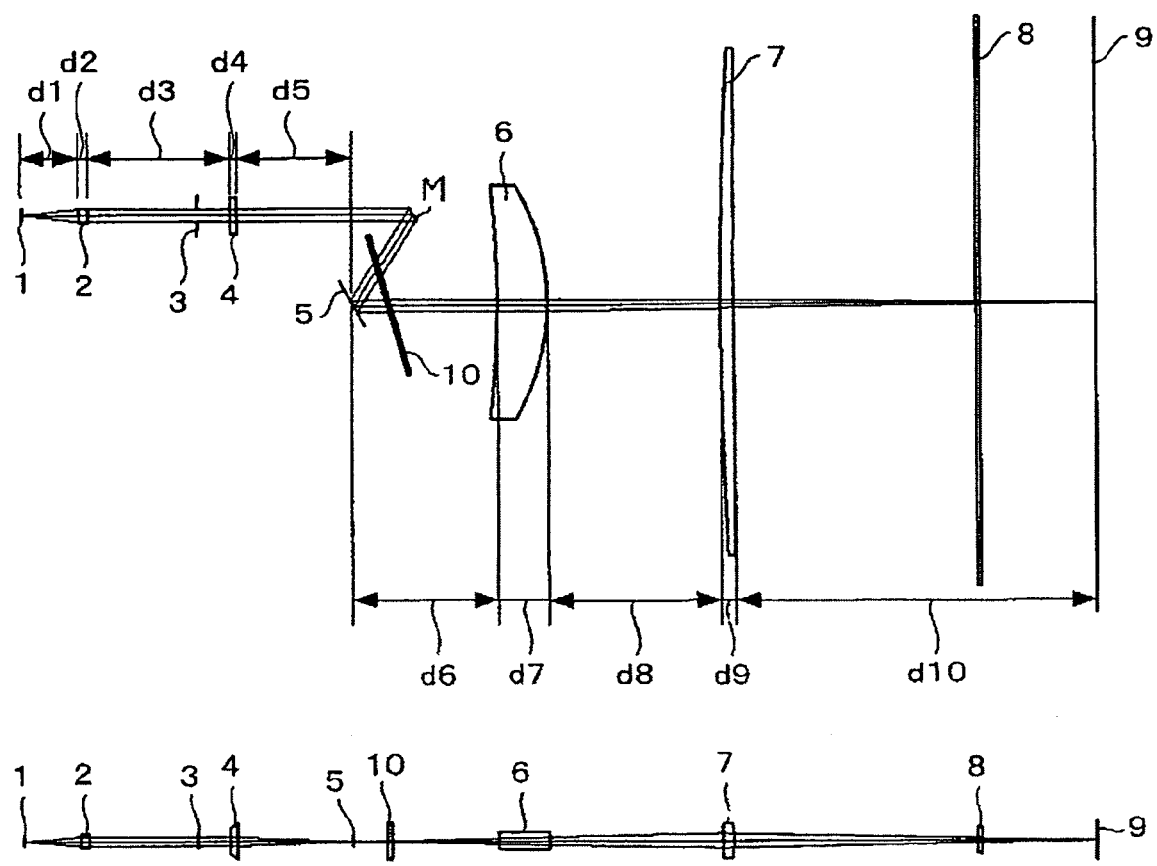
FIG. 1 is a schematic of an optical arrangement of an optical scanning device according to an embodiment of the present invention.

Exemplary embodiments of the present invention are explained below in detail with reference to accompanying drawings.

An optical scanning device according to an embodiment of the present invention includes a first optical system and a second optical system and performs optical scanning by guiding a light beam from a light source to an optical deflector through the first optical system and converging the deflected light beam emerging from the optical deflector towards the scanning surface with the aid of the second optical system. The first optical system includes at least one resin lens having a diffractive surface and the second optical system has at least one resin optical element.

A beam diameter depth in the main scanning direction, Wm, that can have a maximum intensity of $1/e^2$, satisfies the following conditions:

$$\Delta m1 + \Delta m2 + \Delta m3 - \Delta d1 \times (f2/f1)^2 < Wm/40 \qquad (1)$$

$$\Delta d1 > 0 \text{ and } \Delta m2 < 0 \qquad (2)$$

where, $\Delta m1$ is a beam waist position shift in the main scanning direction due to a change in the power in a refracting unit when the temperature in the first optical system rises by 1° C., $\Delta m2$ is a beam waist position shift due in the main scanning direction to a change in the power in the diffracting unit when the temperature in the first optical system rises by 1° C., $\Delta m3$ is a beam waist position shift in the main scanning direction when the temperature in the second optical system rises by 1° C., $\Delta d1$ is a shift in the distance between a forward principal point of the first optical system in the main scanning direction and the light source when the temperature in the first optical system rises by 1° C., f1 is the focal distance of the first optical system in the main scanning direction, and f2 is the focal distance of the second optical system in the main scanning direction.

The resin lens in the first optical system has more than one diffractive surface having power (refractive power). The shift in the power of the resin lens due to temperature fluctuation is of two types, namely power shift of diffracting unit and power shift of refracting unit. The power shift of diffracting unit refers to the shift in the power of the diffractive surface (in the instance where there are two or more diffractive surfaces, the combined power of the diffractive surfaces is considered). The power shift of refractive unit refers to the shift in the power the resin lens has due to refraction.

Shift in beam waist position in main scanning direction refers to a shift in the beam waist position in the main scanning direction. Main scanning beam diameter (spot diameter in the main scanning direction) is defined as the diameter of the portion of the scanning surface on which the optical intensity of the beam spot in the main scanning direction is a maximum of $1/e^2$. The beam diameter depth in the main scanning direction, Wm, of the beam spot is defined as not exceeding +10% of the beam spot diameter in the main scanning direction.

The light source of the optical scanning device can be a semiconductor laser device. However, it is preferable that the beam diameter depth in the main scanning direction, Wm, that can have a maximum intensity of $1/e^2$, satisfies the following condition:

$$-Wm < \Delta m'1 + \Delta m'2 + \Delta m'3 < 0 \qquad (3)$$

where, Δm'1 is a beam waist position shift in the main scanning direction due to a change in the power in the refracting unit of the first optical system, Δm'2 is a beam waist position shift in the main scanning direction due to a change in the power in the diffracting unit of the first optical system, and Δm'3 is a beam waist position shift in the second optical system in the main scanning direction, when the emission wavelength of the light source is increased by 1 nm.

By making the power of the diffracting unit of the first optical system positive, the beam waist position shift in the main scanning direction due to increase in temperature, Δm2, is made negative, the shift in the distance between the light source and the forward principal point of the first optical system in the main scanning direction, Δd1, is made positive (the above condition (2)), and the shift in the beam waist position shift in the main scanning direction brought about by Δd1, $-\Delta d1 \times (f2/f1)^2$, is made negative. Thus, the left hand side of the equation (1), representing the total beam waist position shift in the main scanning direction of the optical scanning device due to the beam waist position shift due to temperature increase in individual units, is reduced.

In an optical scanning device, the temperature can potentially go up by about 20° C. That is why the upper limit of Condition (1) has been taken as Wm/(20×2). If the value on the left hand side of Condition (1) exceeds the value on the right hand side, the spot diameter (beam diameter in the main scanning direction) exceeds the permissible level, resulting in image degradation (degradation of tone and sharpness).

If a semiconductor laser device that issues light beams of varying emission wavelengths is used as the light source, other than temperature-related change in the refractive index of the refracting unit and the shape of the resin lens, and the shift in the distance between the light source and the first optical system, one also needs to take into account the change in the wavelength of the beam (the wavelength generally tends to become longer with the rise in temperature). Consequently, it is necessary to make the beam spot position shift in the main scanning direction of the entire system due only to wavelength variation negative.

If the beam spot position shift in the main scanning direction of the entire system due only to wavelength variation is positive, even if Condition (1) is satisfied, the beam spot position shift in the main scanning direction due to wavelength change is added to it, the beam diameter in the main scanning direction may exceed the permissible level.

In other words, it is necessary to make the right hand side of Condition (3) less than 0. However, if the sum in Condition (3) is a large negative value, the beam diameter in the main scanning direction is bound to exceed the permissible value. Consequently, the lower limit of Condition (3) is set is −Wm. Further, what is known as a wavelength jump is a well-known phenomenon in semiconductor laser devices and there can be a beam waist position shift in the main scanning direction due to wavelength jump. However, since the wavelength jump is usually only in the order of 0.5 nm, beam waist position shift in the main scanning direction does not lead to the problem of exceeding the permissible value of beam diameter if the sum in Condition (3) is larger than −Wm.

The second optical element, which has a positive power in the sub-scanning direction, is made of a resin optical element. Therefore, due to the expansion of the resin optical element due to the temperature rise, variation in the emission wavelength and refractive index, a beam waist position shift in the sub-scanning direction, Δs3, again shifts away from the optical deflector (in the positive direction).

The refracting unit of the first optical element, which has a positive power in the sub-scanning direction, is again made of a resin optical element. Therefore, in this case also, due to the expansion of the resin optical element due to the temperature rise, variation in the emission wavelength and refractive index, the beam waist position shift in the sub-scanning direction, Δs1, shifts away from the optical deflector (in the positive direction).

The optical scanning device has the following characteristics. A beam diameter depth in the sub-scanning direction, Ws, that can have a maximum intensity of $1/e^2$, satisfies the following conditions:

$$\Delta s1 + \Delta s2 + \Delta s3 - \Delta d1 \times (\beta1 \times \beta2)^2 < Ws/40 \qquad (4)$$

$$\Delta d1 > 0 \text{ and } \Delta s2 + \Delta s2 < 0 \qquad (5)$$

where, Δs1 is a beam waist position shift in the sub-scanning direction due to a change in the power in the refracting unit when the temperature in the first optical system rises by 1° C., Δs2 is a beam waist position shift in the sub-scanning direction due to a change in the power in the diffracting unit when the temperature in the first optical system rises by 1° C., Δs3 is a beam waist position shift in the sub-scanning direction when the temperature in the second optical system rises by 1° C., Δd1 is a shift in the distance between a forward principal point of the first optical system in the sub-scanning direction and the light source when the temperature in the first optical system rises by 1° C., β1 is a lateral magnification of the first optical system in the sub-scanning direction, and β2 is a lateral magnification of the second optical system in the sub-scanning direction.

Beam waist position shift in the sub-scanning direction refers to a shift in the beam waist position in the sub-scanning direction. Beam diameter in sub-scanning direction (spot diameter in the sub-scanning direction) is defined as the diameter of the portion of the scanning surface on which the optical intensity of the beam spot in the sub-scanning direction is a maximum of $1/e^2$. The beam diameter depth in the sub-scanning direction, Ws, of the beam spot is defined as not exceeding +10% of the beam waist diameter in the sub-scanning direction.

The light source of the optical scanning device can be a semiconductor laser device. However, it is preferable that the beam diameter depth in the sub-scanning direction, Ws, that can have a maximum intensity of $1/e^2$, satisfies the following condition:

$$-Ws < \Delta s'1 + \Delta s'2 + \Delta s'3 < 0 \qquad (6)$$

where, Δs'1 is a beam waist position shift in the sub-scanning direction due to a change in the power in the refracting unit of the first optical system, Δs'2 is a beam waist position shift in the sub-scanning direction due to a change in the power in the diffracting unit of the first optical system, and Δs'3 is beam waist position shift in the sub-scanning direction in the second optical system, when the emission wavelength of the light source is increased by 1 nm.

By providing the diffracting unit in the first optical system, making Δs1+Δs2<0 by making the beam waist position shift in the sub-scanning direction due to a change in the power in the diffracting unit, Δs2, negative, making the shift in the distance between the light source and the forward principal point of the first optical system in the sub-scanning direction, Δd1, positive, the waist position shift in the sub-scanning direction brought about by Δd1, −Δd1×(β1×β2), negative, the sum of Condition (4), which represents the total beam waist position shift in the sub-scanning direction of the optical scanning device, due to the beam waist position shift caused by temperature increase in individual units, is reduced.

In an optical scanning device, the temperature can potentially go up by about 20° C. That is why the upper limit of Condition (4) has been taken as Wm/(20×2). If the value on the left hand side of Condition (4) exceeds the value on the right hand side value, the spot diameter in the sub-scanning direction (beam diameter in the sub-scanning direction) exceeds the permissible level, resulting in image degradation (degradation of tone and sharpness).

When a semiconductor laser device is employed as a light source, it is necessary to take into account the fact that any change in the wavelength is accompanied by a shift in the beam waist position in the sub-scanning direction as well as in the main scanning direction.

By satisfying Condition (3) pertaining to the main scanning direction and Condition (5), the beam diameter in the sub-scanning direction has been limited to within the permissible value even if there is a variation in the emission wavelength from the light source. Further, even if there is a wavelength jump, it is usually in the range of 0.5 nm. Consequently, even if the sum in Condition (5) is larger than −Ws, wavelength jump does not pose any problem.

It is preferable that the beam diameter depth in the main scanning direction, Wm, of the optical scanning device satisfy the following conditions:

$$\Delta m1 + \Delta m2 + \Delta m3 - \Delta d1 \times (f2/f1)^2 < Wm/40 \quad (1)$$

$$\Delta d1 > 0 \text{ and } \Delta m2 < 0 \quad (2)$$

where, Δm1 is a beam waist position shift in the main scanning direction due to a change in the power in a refracting unit when the temperature in the first optical system rises by 1° C., Δm2 is a beam waist position shift in the main scanning direction due to a change in the power in the diffracting unit when the temperature in the first optical system rises by 1° C., Δm3 is a beam waist position shift in the main scanning direction when the temperature in the second optical system rises by 1° C., Δd1 is the shift in the distance between the forward principal point of the first optical system in the main scanning direction and the light source when the temperature in the first optical system rises by 1° C., f1 is the focal distance of the first optical system in the main scanning direction, and f2 is the focal distance of the second optical system in the main scanning direction.

The light source of the optical scanning device can be a semiconductor laser device. However, it is preferable that the beam diameter depth in the main scanning direction, Wm, that can have a maximum intensity of 1/e², satisfies the following condition:

$$-Wm < \Delta m'1 + \Delta m'2 + \Delta m'3 < 0 \quad (3)$$

where, Δm'1 is a beam waist position shift in the main scanning direction due to a change in the power in the refracting unit of the first optical system, Δm'2 is a beam waist position shift in the main scanning direction due to a change in the power in the diffracting unit of the first optical system, and Δm'3 is a beam waist position shift in the main scanning direction in the second optical system, when the emission wavelength of the light source is increased by 1 nm.

Further, by satisfying Conditions (1), (2), (3), (4), and (5), the beam diameter can be limited to within the permissible limit in both main scanning direction and sub-scanning direction.

From the explanation so far, it is evident that optimizing the shifting of beam waist position due to temperature fluctuation gives rise to a slight shift in the beam waist position due to wavelength jump. The beam waist position shift due to wavelength jump may pose a problem for achieving a small beam spot diameter. The beam waist position shift due to wavelength jump is greater in the main scanning direction than in the sub-scanning direction. Consequently, to realize a very small beam spot diameter, the first optical system may include at least one glass lens and at least one resin lens having a diffractive surface, with the power of the glass lens in the main scanning direction being greater than the power of the resin lens in the main scanning direction.

Thus, it is preferable that the first optical system in all the optical scanning devices described above have at least one glass lens and at least one resin lens having a diffractive surface, with the power of the glass lens in the main scanning direction being greater than the power of the resin lens in the main scanning direction.

All the lenses used in the first optical system and the second optical system in the optical scanning devices described so far can be resin lenses.

By using only resin lenses in the second optical system, material recycling can be encouraged, thus realizing environment conservation.

The effect of achieving a small beam spot diameter can be demonstrated most effectively in an optical scanning device having a uniform temperature distribution within. An optical scanning device with a uniform temperature distribution within can be realized by setting the first optical system and the second optical system in a single housing, and allowing airflow between the first optical system and the second optical system to achieve a uniform temperature and, therefore, a steady beam spot diameter.

The first optical system and the second optical system in optical scanning device are set in a single housing, with provision for airflow between the first optical system and the second optical system.

The image forming apparatus according to the present invention includes any one of the optical scanning device described above.

In the optical scanning device according to an embodiment of the present invention, the first optical system and the second optical system have resin lenses. Using resin lens in the optical system is cost-effective, offers a wide range of optical surface shapes, and ensures enhancement of the initial optical characteristics.

The second optical element includes a resin optical element. Therefore, due to the expansion of the resin optical element caused by temperature rise, variation in the emission wavelength and refractive index, the beam waist position shift in the sub-scanning direction, Δm3, is away from the optical deflector (in the positive direction).

The first optical element includes a resin optical element. Therefore, in this case also, due to the expansion of the resin optical element due to the temperature rise, variation in the emission wavelength and refractive index, the beam waist position shift in the main scanning direction, Δm1, is away from the optical deflector (in the positive direction).

Thus, the shift in the distance between the forward principal point of the first optical system in the main scanning direction and the light source is considered as the variation in the image focus location of the beam spot due to temperature fluctuation. Further, variation in the emission wavelength of the semiconductor laser device being used as the light source is taken into account. If the optical scanning device is used in the image forming apparatus according to the embodiment, the variation in the beam diameter is effectively reduced so that images having superior quality can be obtained.

FIG. 1 is a schematic of an optical arrangement of an optical scanning device according to an embodiment of the present invention. The upper drawing in FIG. 1 is a view from the sub-scanning direction and the lower drawing is a view from the main scanning direction.

The reference numeral 1 denotes a light source, the reference numeral 2 denotes a coupling lens, the reference numeral 3 denotes an aperture, the reference numeral 4 denotes a first lens which is anamorphic, the reference numeral 5 denotes a polygonal mirror (one reflective surface of the polygonal mirror is illustrated in FIG. 1) which functions as the optical deflector, the reference numerals 6 and 7 denote scanning lenses, the reference numeral 8 denotes a dustproof glass, the reference numeral 9 denotes a scanning surface, and the reference numeral 10 denotes a soundproof glass. The light path is bent by a mirror M disposed between the first lens 4 and the polygonal mirror 5. However, the mirror M can be omitted from the layout of the optical system. To make the illustration easy, the mirror M has not been shown in the lower drawing FIG.

The light source 1 is a semiconductor laser device with a cover glass having a thickness of 0.3 mm.

A divergent light beam emitted from the light source 1 passes through the coupling lens 2 and emerges as a mildly divergent beam or a parallel beam or a mildly convergent beam, which passes through the aperture 3. The aperture 3 carries out beam-shaping. Then the beam passes through the first lens 4 to emerge as a parallel beam in the main scanning direction and converges near the deflective surface of the polygonal mirror 5 as a long line in the main scanning direction.

The deflected beam from the polygonal mirror 5 passes through the scanning lens 6, the scanning lens 7, and the dustproof glass 8. The beam converges as a beam spot on the scanning surface 9 due to the action of the scanning lenses 6 and 7. The soundproof glass 10 disposed between the polygonal mirror 5 and the scanning lens 6 closes a window provided on the soundproof housing in which the polygonal mirror 5 is placed. The light beam from the light source 1 passes through the soundproof glass 10 to become incident on the polygonal mirror 5. The beam deflected from the polygonal mirror 5 again passes through the soundproof glass 10 to become incident on the scanning lens 6.

The coupling lens 2 and the first lens 4 form the first optical system, and the scanning lenses 6 and 7 form the second optical system. As described in a later section, the light source 1 and the coupling lens 2 are fixed to a not shown aluminium member.

COMPARATIVE EXAMPLE

A comparative example will be explained now. An optical arrangement of the comparative example does not include a diffractive surface. In this comparative example, all the lenses, namely the coupling lens 2, the first lens 4, and the scanning lenses 6 and 7, are resin lenses.

The optical system of the comparative example is characterized as follows: The emission wavelength of the light source 1 is 780.1 nm at 25° C. and 786.5 nm at 45° C. The unit of length is mm unless otherwise specified.

The incident surface, that is, the surface of the coupling lens 2 facing the light source 1, is a concentric aspherical surface represented by Expression (7).

$$X=(h^2/R)/[1+\sqrt{1-(1+K)(h/R)^2}]+A4 \cdot h^4+A6 \cdot h^6+A8 \cdot h^8+A10 \cdot h^{10} \quad (7)$$

where, h is a distance from the optical axis, R is a paraxial curvature radius, K is a cone constant, A4, A6, A8, A10, etc. are high-order coefficients, and X is a depth along the optical axial.

The values of R, K, A4, A6, A8, and A10 are as follows:
R=86.09118
K=361.987634
A4=−0.827025E−04
A6=−0.413360E−05
A8=0.942600E−06
A10=−0.936986E−07

0.942600E−06, for example, indicates $0.942600 \times 10^{-6}$. The same notation is used hereinafter.

The exit surface of the coupling lens 2 is also a concentric aspherical surface represented by Expression (7). The values of R, K, A4, A6, A8, and A10 are as follows:
R=−8.71000
K=−0.310240
A4=0.592273E−04
A6=0.250465E−06
A8=0.119847E−06
A10=−0.563217E−08

The incident surface of the first lens 4 is an anamorphic surface represented by Expression (8)

$$X=\{(1/Rm) \cdot y^2+(1/Rs) \cdot z^2\}/[1+\sqrt{1-(y/Rm)^2-(z/Rs)^2}] \quad (8)$$

where, y is a distance from the optical axis in the main scanning direction, z is a distance from the optical axis in the sub-scanning direction, Rm is a curvature radius in the main scanning direction, Rs is a curvature radius in the sub-scanning direction, and X is the depth along the optical axis. The values are as follows:
Rm=500, Rs=35.83

The exit surface of the first lens 4 is a plane surface.

The incident surface of the scanning lens 6 is a concentric aspherical surface represented by Expression (7), the values of R, K, AR, A6, A8, and A10 are as follows:
R=−312.6
K=2.667
A4=1.79E−07
A6=−1.08E−12
A8=−3.18E−14
A10=3.74E−18

The exit surface of the scanning lens 6 is also a concentric aspherical surface represented by Expression (7), the values of R, K, AR, A6, A8, and A10 are as follows:
R=−83.0
K=0.02
A4=2.50E−07
A6=−1.08E−12
A8=4.54E−15
A10=−3.03E−18

The vertex on both the surfaces of the scanning lens 6 is shifted 1.16 mm upwards with respect to the principal ray shown in the upper drawing of FIG. 1.

The incident surface of the scanning lens 7 is an "acircular arc" represented by Expression (9) in the main scanning direction, and a "continually changing sub-scanning curvature radius in the main scanning direction" in the sub-scanning direction, represented by Expression (10).

$$X=(y^2/Rm)/[1+\sqrt{1-(1+K)(y/Rm)^2}]+A4\cdot y^4+A6\cdot y^6+A8\cdot y^8+A10\cdot y^{10} \quad (9)$$

where, y denotes the distance from the optical axis in the main scanning direction, Rm is the curvature radius in the main scanning direction, K is the cone constant, A4, A6, A8, and A10 are high-order coefficients, and X is the depth along the optical axis.

$$Rs(y)=Rs\Sigma bj\cdot y^j (j=1, 2, 3, \text{ and so on}) \quad (10)$$

where, y is the distance from the optical axis in the main scanning direction, Rs(y) is the curvature radius in the sub-scanning direction of position y from the optical axis in the main scanning direction, Rs is the curvature radius in the sub-scanning direction on the optical axis, bj (where j=1, 2, 3, and so on) is a high-order coefficient. The values are as follows:

Rm=500
K=−71.73
A4=4.33E−08
A6=−5.97E−13
A8=−1.28E−16
A10=5.73E21
Rs=−47.7
B2=1.60E−03
b4=−2.32E−07
b6=1.60E−11
b8=−5.61E−16
b10=2.18E−20
b12=−1.25E−24

The exit surface of the scanning lens 7 is a "toroidal surface" having a shape in the sub-scanning direction derived from the arc represented by Expression (11) by shifting the arc by a distance of Rm from the vertex along the axial direction and rotating around the axis parallel to the sub-scanning direction.

$$X=(z^2/Rs)/[1+\sqrt{1-(z/Rs)^2}] \quad (11)$$

where, y is the distance from the optical axis in the main scanning direction, Rs is the paraxial curvature radius in the sub-scanning direction, and X is the depth along the optical axis. The values of Rm and Rs are as follows:

Rm=−1000, Rs=−23.38

The vertex on both surfaces of the scanning lens 7 is shifted 1.21 mm towards the scanning direction (upward in FIG. 1) with respect to the principal ray.

Next, meanings of distances d1 through d10 FIG. will be explained. d1 is a distance on the optical axis from the emitter of the light source 1 to the incident surface of the coupling lens 2. d2 is a thickness of the couple lens 2. d3 is a distance on the optical axis from the exit surface of the coupling lens 2 to the incident surface of the first lens 4. d4 is a thickness of the first lens 4. d5 is a distance from the exit surface of the first lens to the deflective surface of the polygonal mirror 5 via the mirror M. d6 is a distance from the deflective surface of the polygonal mirror 5 to the incident surface of the scanning lens 6. d7 is a thickness of the scanning lens 6. d8 is a distance from the exit surface of the scanning lens 6 to the incident surface of the scanning lens 7. d9 is a thickness of the scanning lens 7. d10 is a distance from the exit surface of the scanning lens 7 to the scanning surface 9. These distances are defined under the conditions when the deflected beam is incidental on the target position 0 on the scanning surface 9.

In the comparative example, the values of the distances d1 through d10 are as follows:

d1=12.843
d2=3.8
d3=102.8
d4=3.0
d5=69.3
d6=51.7
d7=31.4
d8=78.0
d9=3.5
d10=143.62

The thickness of the dustproof glass 8 is 1.9 mm (at 25° C.). The refractive index of the dustproof glass 8 is 1.511161 at 25° C. and an emission wavelength of 780.1 nm and 1.511161 at 45° C. and an emission wavelength of 786.5 nm. The coefficient of linear expansion of the dustproof glass 8 is 7.5E−06 K$^{-1}$.

All the lenses are made of resin. The refractive index of the resin material is 1.523946 at 25° C. and a wavelength of 780.1 nm, and 1.522105 at 45° C. and a wavelength of 786.5 nm. The coefficient of linear expansion of the resin material is 7.0E−05 K$^{-1}$.

Table 1 shows the focal positions (beam waist positions) on the scanning surface in the main scanning and the sub-scanning directions, calculated using the aforementioned data and taking into consideration the effect of temperature on emission wavelength, refractive index, surface shape and thickness.

TABLE 1

| | Focal position | |
|---|---|---|
| Temperature | Main scanning direction | Sub-scanning direction |
| 25° C. | 0.0 mm | 0.0 mm |
| 45° C. | +11.6 mm | +3.3 mm |

It is evident from Table 1 that when the temperature goes up from 25° C. to 45°, the focal position in both the main scanning and sub-scanning directions changes considerably, and the beam diameter exceeds the permissible range.

Three working examples, first through third, of the optical system in the optical scanning device according to the embodiment are described next.

The layouts of the optical elements are identical to that shown in FIG. 1 and hence the same reference numerals are used in the explanation.

In the first to third working examples, a diffractive surface is provided in the resin lens that is disposed closer to the light source 1 than the polygonal mirror 5.

The light source 1 is a semiconductor laser device having a cover glass of 0.3 mm thickness. The light beam emitted from the light source 1 becomes a substantially parallel beam when it emerges from the coupling lens 2, passes through the aperture 3, enters the first lens 4, which is an anamorphic lens, and is converted into a convergent beam near the deflective surface of the polygonal mirror 5 only in the sub-scanning direction. In other words, the first lens 4 has a positive power only in the sub-scanning direction. The light beam forms an image of a long line in the main scanning direction at the position of the deflective surface of the polygonal mirror 5, is deflected by the polygonal mirror 5, passes through the scanning lens 6 disposed on the side of the polygonal mirror 5 and the scanning lens 7 disposed on the side of the scanning surface 9, passes through the dustproof glass 8 converges on the imaging surface. As explained later, the light source and the coupling lens 2 are fixed to a single member.

The coupling lens 2, the first lens 4, and the scanning lenses 6 and 7 are all made of resin. The use of resin as the material for lens allows pre-carving of a negative of the diffraction grating in a mold, and transferring the grating through injection molding or heat transfer, thus facilitating mass production.

The surface of the coupling lens 2 that faces toward the light source 1 has a diffractive surface having a positive power in both main scanning and sub-scanning directions, and the surface of the coupling lens 2 that faces toward the aperture 3 has a refractive surface having a positive power and an effect similar to an aspheric surface. The diffractive surface is set such that the direction change of the angle of refraction due to wavelength variation is the reverse of the normal refractive surface. Consequently, by partially assigning the positive power of the optical system is to the diffractive surface, it is possible to correct the focal position shift due to temperature variation arising from not only the coupling lens 2 but also other resin lenses.

However, if the positive power of the coupling lens 2 is assigned only to the diffractive surface, the sensitivity to a change in the power due to wavelength variation increases. Hence, it is preferable to have a refractive surface as well that has a positive power. As the diffractive surface that faces toward the light source 1 has identical power in both main scanning and sub-scanning directions, there is no adverse effect on the performance if a rotation around the optical axis takes place when fixing the coupling lens 2.

The surface of the first lens 4 that faces toward the aperture 3 has a refractive surface having a negative power only in the sub-scanning direction. The surface of the first lens 4 that faces toward the polygonal mirror 5 (or mirror M) has a diffractive surface having a positive power only in the sub-scanning direction. The focal position shift due to temperature in the main scanning direction is corrected by the diffractive surface of the coupling lens 2. However, as the positive power of the entire optical system in the sub-scanning direction is stronger than in the main scanning direction, to correct the focal position shift due to temperature variation in the sub-scanning direction, further positive power is assigned in the sub-scanning direction. This is why a diffractive surface having a positive power only in the sub-scanning direction is provided in the first lens 4.

The power of the entire first lens 4 is determined according to the target value of the beam spot diameter in the sub-scanning direction (sub-scanning beam diameter) and is smaller than the positive power of the diffractive surface required for correcting the focal position shift due to temperature variation in the sub-scanning direction. Therefore, the refractive surface of the first lens 4 is assigned a negative power so that positive power can be ensured by the diffractive surface and an appropriate power can be set for the entire first lens 4. Further, as the expansion of the concave surface due to temperature rise causes the focal length to extend in the negative direction contrasting with the extension of the focal distance of the entire system in the positive direction, the focus shift due to temperature variation can be reduced.

Figure 5:
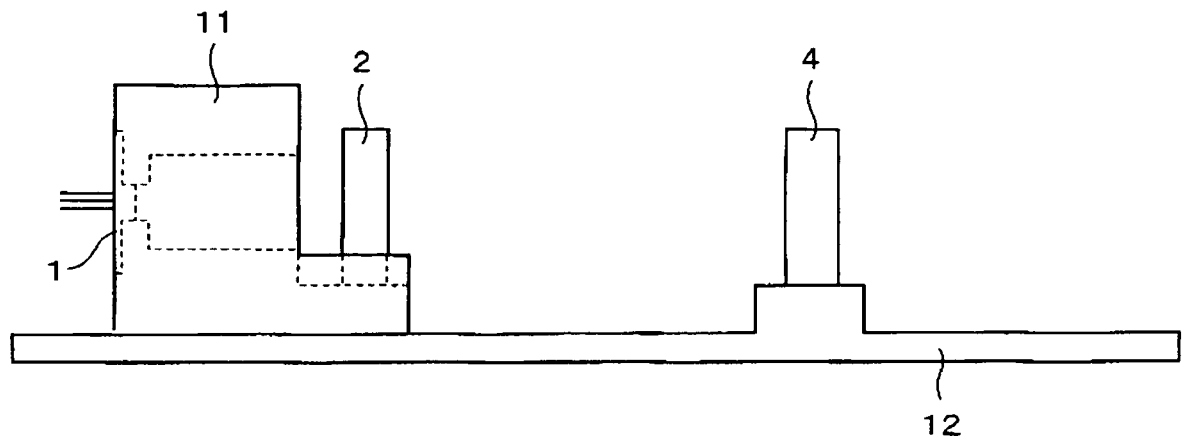
FIG. 5 is a schematic for explaining relative positions of a light source and a first optical system.

The relative positioning of the light source 1, the coupling lens 2, and the first lens 4 is explained next with reference to FIG. 5.

The light source 1 fixed to a first holding member 11 made of aluminium by press-fitting. Position adjustment of the coupling lens 2 is made in the optical axis direction and the coupling lens 2 is fixed to the first holding member 11 by bonding. Adjusting the position of the coupling lens 2 in the optical axis direction, a substantially parallel light beam can be obtained even if the position of the emission point of the semiconductor laser device varies inside the semiconductor laser device casing.

The first holding member 11 is a single piece made of aluminium. In FIG. 5, the coupling lens 2 is shown to be bonded to the first holding member 11. However, the first holding member 11 may also be made of a plurality of members, and the coupling lens 2 may be fixed to the first holding member 11 by a fixing method other than bonding.

The first holding member 11 in turn is fixed to a second holding member 12, which is also made of aluminium. The first lens 4 fixed to the second holding member at a position at least in the optical axis direction such that the predetermined focal position in the sub-scanning direction (beam waist position in the sub-scanning direction) is obtained. As the first lens 4 has a power only in the sub-scanning direction, the focal position in the main-scanning direction is not affected even if adjustment of the position of the first lens 4 is made in the optical axis direction. Consequently, independent adjustments can be made for the main scanning and the sub-scanning directions.

First Working Example

The first working example of the embodiment will be explained now. The emission wavelength of the light source is 655 nm at 25° C. and 659 mm at 45° C.

The characteristics of the coupling lens 2 are explained first. The incident surface is a diffractive surface having concentric circular gratings. Phase function $\phi(h)$ of the diffractive surface is represented by Expression (12).

$$\phi(h)=C1 \cdot h^2 \tag{12}$$

where, h is the distance from the optical axis, C1 is a phase coefficient. The value of the phase coefficient, C1, is as follows:

C1=−1.127E−02.

The exit surface is an aspherical surface represented by Expression (7), the values of R, K, A4, A6, A8, and A10 are as follows:

R=−34.32864

K=−71.517137

A4=−0.208422E−03

A6=0.651475E−05

A8=−0.238199E−06

A10=0.770435E−08

The characteristics of the first lens 4" will be explained now. The surface of the first lens 4 that faces toward the light source 1 is a plane surface in the main scanning direction and an acircular arc represented by Expression (13) in the sub-scanning direction.

$$X=(z^2/Rs)/([1+\sqrt{\{1-(1+K)(z/Rs)^2\}}]+B4 \cdot z^4+B6 \cdot z^6+B8 \cdot z^8+B10 \cdot z^{10} \tag{13}$$

where, z is the distance from the optical axis in the sub-scanning direction, Rs is the paraxial curvature radius in the sub-scanning direction, K is the cone factor, B4, B6, B8, and B10 are high-order coefficients, and X is the depth along the optical axis.

The values of Rs, K, B4, B6, B8, and B10 are as follows:

Rs=−54.46507

K=−0.072542

B4=0.577350E−07

B6=0.474038E−07
B8=−0.190253E−07
B10=0.247352E−08

The exit surface is a diffractive surface having gratings in the sub-scanning direction.

The phase function φ(z) of the diffractive optical surface is represented by Expression (14).

$$\phi(z) = C2 \cdot z^2 \tag{14}$$

where, z is a distance from the optical axis in the sub-scanning direction, and C2 is a phase coefficient. The value of the phase coefficient, C2, is as follows:

C2=−8.8148E−03

The characteristics of the scanning lens 6″ will be explained now. The incident surface of the scanning lens 6 is an acircular arc represented by Expression (9) in the main scanning direction. The curvature, Cs(Y) of the scanning lens at a distance y from the optical axis in the main scanning direction varies according to Expression (15) as follows:

$$Cs(Y) = 1/Rs(0) + B1 \cdot Y + B2 \cdot Y^2 + B3 \cdot Y^3 + B4 \cdot Y^4 + B5 \cdot Y^5 +. \tag{15}$$

The values of Rm, K, A4, A6, A8, A10, . . . , Rs(=Rs(0)), B1, B2, B3, B4, B5 . . . are as follows:

Rm=−279.9, Rs=−61
K=−2.900000E+01
A4=1.755765E−07
A6=−5.491789E−11
A8=1.087700E−14
A10=−3.183245E−19
A12=−2.635276E−24
B1=−2.066347E−06
B2=5.727737E−06
B3=3.152201E−08
B4=2.280241E−09
B5=−3.729852E−11
B6=−3.283274E−12
B7=1.765590E−14
B8=1.372995E−15
B9=−2.889722E−18
B10=−1.984531E−19

The exit surface of the scanning lens 6 is an aspherical surface represented by Expression (7).

The values of R, K, A4, A6, A8, A10, . . . are as follows:
R=−83.6
K=−0.549157
A4=2.748446E−07
A6=4.502346E−12
A8=−7.366455E−15
A10=1.803003E−18
A12=2.727900E−23

The characteristics of the scanning lens 7″ will be explained now. The incident surface of the scanning lens 7 is an acircular arc represented by Expression (9) in the main scanning direction. The curvature Cs(Y) in the sub-scanning direction varies according to Expression (15).

The values of Rm, K, A4, A6, A8, A10, . . . , Rs(=Rs(0)), B1, B2, B3, B4, B5, . . . are as follows:
Rm=6950, Rs=110.9
K=0.000000E+00
A4=1.549648E−08
A6=1.292741E−14
A8=−8.811446E−18
A10=−9.182312E−22
B1=−9.593510E−07
B2=−2.135322E−07
B3=−8.079549E−12
B4=2.390609E−12
B5=2.881396E−14
B6=3.693775E−15
B7=−3.258754E−18
B8=1.814487E−20
B9=8.722085E−23
B10=−1.340807E−23

The exit surface of the scanning lens 7 is an acircular arc represented by Expression (9) in the main scanning direction. The curvature in the sub-scanning direction varies according to Expression (15).

The values of Rm, K, A4, A6, A8, A10, . . . , Rs(=Rs(0)), B1, B2, B3, B4, B5, . . . are as follows:
Rm=766, Rs=−62.22
K=0.000000E+00
A4=−1.150396E−07
A6=1.096926E−11
A8=−6.542135E−16
A10=1.984381E−20
A12=−2.411512E−25
B2=3.644079E−07
B4=−4.847051E−13
B6=−1.666159E−16
B8=4.534859E−19
B10=−2.819319E−23

The various distances are as follows:
d1=27.07144
d2=3.8
d3=102.8
d4=3.0
d5=121.7448
d6=64.007
d7=22.6
d8=75.85
d9=4.9
d10=158.71

The semiconductor laser device emits light beams of wavelengths 655 nm and 659 nm at 25° C. and 45° C., respectively. Both the soundproof glass 10 and the dustproof glass 8 have a thickness of 1.9 mm (at 25° C.). The refractive index of the dustproof glass 8 and the soundproof glass 10 is 1.514371 at 25° C. and an emission wavelength of 655 nm, 1.514327 at 45° C. and an emission wavelength of 659 nm, and 1.514291 at 25° C. and an emission wavelength of 656 nm. The coefficient of linear expansion of both the dustproof glass 8 and the soundproof glass 10 is 7.5E−06 K$^{-1}$.

All the lenses are made of resin and have a refractive index of 1.527257 at 25° and a wavelength of 655 nm, 1.525368 at 45° C. and a wavelength of 659 nm, and 1.527222 at 25° C. and a wavelength of 656 nm. The coefficient of linear expansion of the resin lenses is 7.0E−05 K$^{-1}$. The coefficient of linear expansion of the first holding member 11 is 4.0E−05 K$^{-1}$.

Second Working Example

The second working example of the embodiment will be explained now. The emission wavelength of the light source is 655 nm at 25° C. and 659 nm at 45° C.

The coupling lens 2 is made of glass. The incident surface of the coupling lens 2 is a plane surface and the exit surface is an aspherical surface represented by Expression (7). The shape of the exit surface of the coupling lens 2 is optimized so as to correct the wavefront aberration. The value of the paraxial curvature radius R is −18.49. The light beam emerging from the coupling lens 2 is virtually a parallel beam.

The characteristics of the first lens 4″ will be explained now. The incident surface of the first lens 4 is a toroidal surface having a curvature radius of −246.5 in the main scanning direction and −52.2 in the sub-scanning direction. The incident surface of the first lens 4 is a plane surface having an elliptical diffractive surface. The phase function $\phi(y,z)$ of the diffractive surface is represented by Expression (16)

$$\phi(y,z) = C3 \cdot y^2 + C4 \cdot z^2 \quad (16)$$

where, y is the distance from optical axis in the main scanning direction, z is the distance from optical axis in the sub-scanning direction, and C3 and C4 are the phase coefficients. The values of the phase coefficients are as follows:

C3=−0.009027 and C4=−0.001065

The various distances are as follows:

d1=24.25
d2=4.5
d3=61.71
d4=3.0
d5=121.7
d6=64.00685
d7=22.6
d8=75.85
d9=4.9
d10=158.71

The characteristics of lenses after the polygonal mirror 5 are identical to those for the first working example.

Both the soundproof glass 10 and the dustproof glass 8 have a thickness of 1.9 mm, which is the same as the first working example. The refractive index of the soundproof glass 10 and the dustproof glass 10 is 1.514371 at 25° C. and an emission wavelength of 655 nm, 1.514291 at 45° C. and an emission wavelength of 659 nm, and 1.514327 at 25° C. at an emission wavelength of 656 nm. The coefficient of linear expansion of the soundproof glass 10 and the dustproof glass 8 is 7.5E−06 K$^{-1}$.

All the other lenses other than the coupling lens 2 are made of resin and have a refractive index of 1.527257 at 25° C. and a wavelength of 655 nm, 1.525368 at 45° C. and a wavelength of 659 nm, and 1.527222 at 25° C. and a wavelength of 656 nm. The coefficient of linear expansion of the resin lenses is 7.0E−05 K$^{-1}$.

The refractive index of the glass, from which the coupling lens 2 is made, is 1.689631 at 25° C. and a wavelength of 655 nm, 1.689528 at 45° C. and a wavelength of 659 nm, and 1.689581 at 25° C. and a wavelength of 656 nm. The coefficient of linear expansion of the glass is 7.5E−06 K$^{-1}$.

The coefficient of linear expansion of the first holding member is 2.3E−05 K$^{-1}$.

Third Working Example

The second working example of the embodiment will be explained now. The emission wavelength of the light source is 655 nm at 25° C. and 659 nm at 45° C.

The coupling lens 2 is made of glass. The incident surface of the coupling lens 2 is a plane surface and the exit surface is an aspherical surface represented by Expression (7). The shape of the exit surface is optimized so as to correct the wavefront aberration. The value of the paraxial curvature radius R is the same as for the second working example, that is, −18.49. The light beam emerging from the coupling lens 2 is virtually a parallel beam.

The characteristics of the first lens 4″ will be explained now. The incident surface of the first lens 4 is a rotationally symmetrical spherical surface having a curvature radius of −246.5 with concentric diffraction gratings provided thereon as a diffractive surface. The diffractive surface is represented by Expression (12) in terms of its distance, h, from the optical axis and its phase coefficient, C1. The value of the phase coefficient, C1, is as follows:

C1=−0.00107

The exit surface of the first lens 4 is a cylindrical surface having a curvature radius of 69.16 only in the sub-scanning direction, the surface having gratings in the sub-scanning direction, forming a diffractive surface.

The phase function $\phi(z)$ of the diffractive surface is represented by Expression (17) in terms of distance z from the optical axis in the sub-scanning direction and phase coefficient C2.

$$\phi(z) = C2 \cdot z^2 \quad (17)$$

The value of the phase coefficient, C2, is −0.001069.

The various distances are identical to those of second working example.

The characteristics of the lenses after the polygonal mirror 5 identical to those of the first working example.

Both the soundproof glass 10 and the dustproof glass 8 have a thickness of 1.9 mm, which is the same as that in the first and the second working examples. The refractive index of the soundproof glass 10 and the dustproof glass 10 is 1.514371 at 25° C. and an emission wavelength of 655 nm, 1.514291 at 45° C. and an emission wavelength of 659 nm, and 1.514327 at 25° C. at an emission wavelength of 656 nm. The coefficient of linear expansion of the soundproof glass 10 and the dustproof glass 8 is 7.5E−06 K$^{-1}$. All the other lenses other than the coupling lens 2 are made of resin and have a refractive index of 1.527257 at 25° C. and a wavelength of 655 nm, 1.525368 at 45° C. and a wavelength of 659 nm, and 1.527222 at 25° C. and a wavelength of 656 nm. The coefficient of linear expansion of the resin lenses is 7.0E−05 K$^{-1}$.

The refractive index of the glass, from which the coupling lens 2 is made, is 1.689631 at 25° C. and a wavelength of 655 nm, 1.689528 at 45° C. and a wavelength of 659 nm, and 1.689581 at 25° C. and a wavelength of 656 nm. The coefficient of linear expansion of the glass is 7.5E−06 K$^{-1}$. The coefficient of linear expansion of the first holding member is 2.3E−05 K$^{-1}$.

Figure 2A:
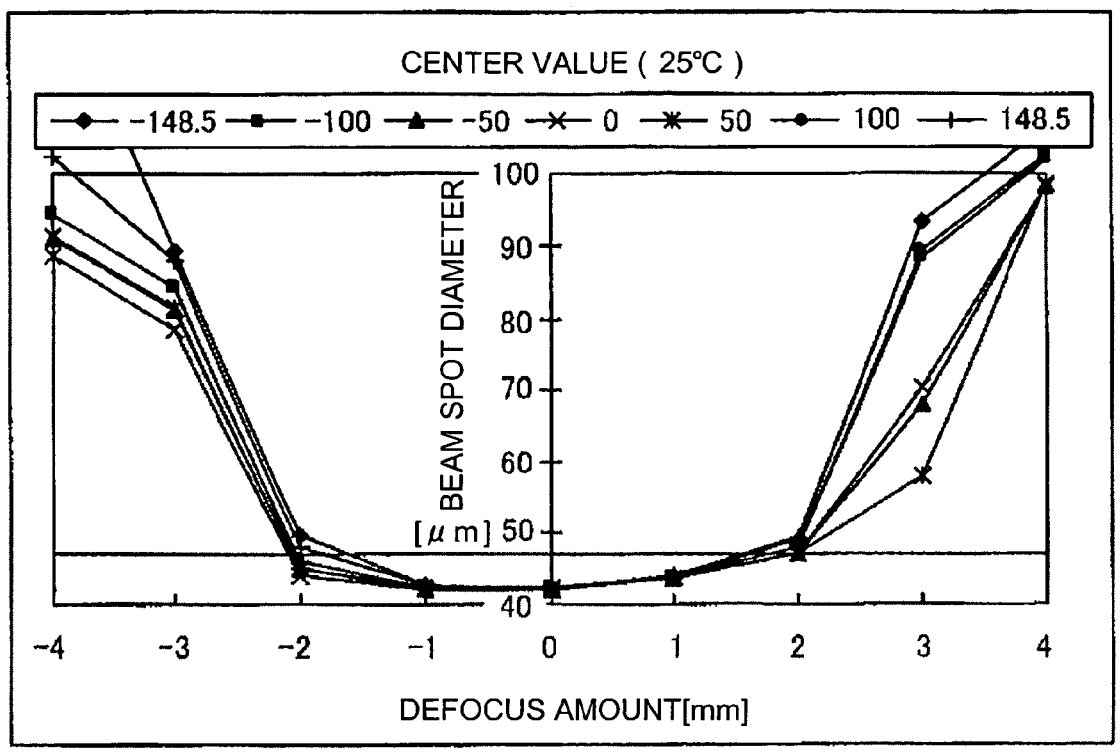
FIG. 2A and FIG. 2B depict depth characteristic of a first working example.
Figure 2B:
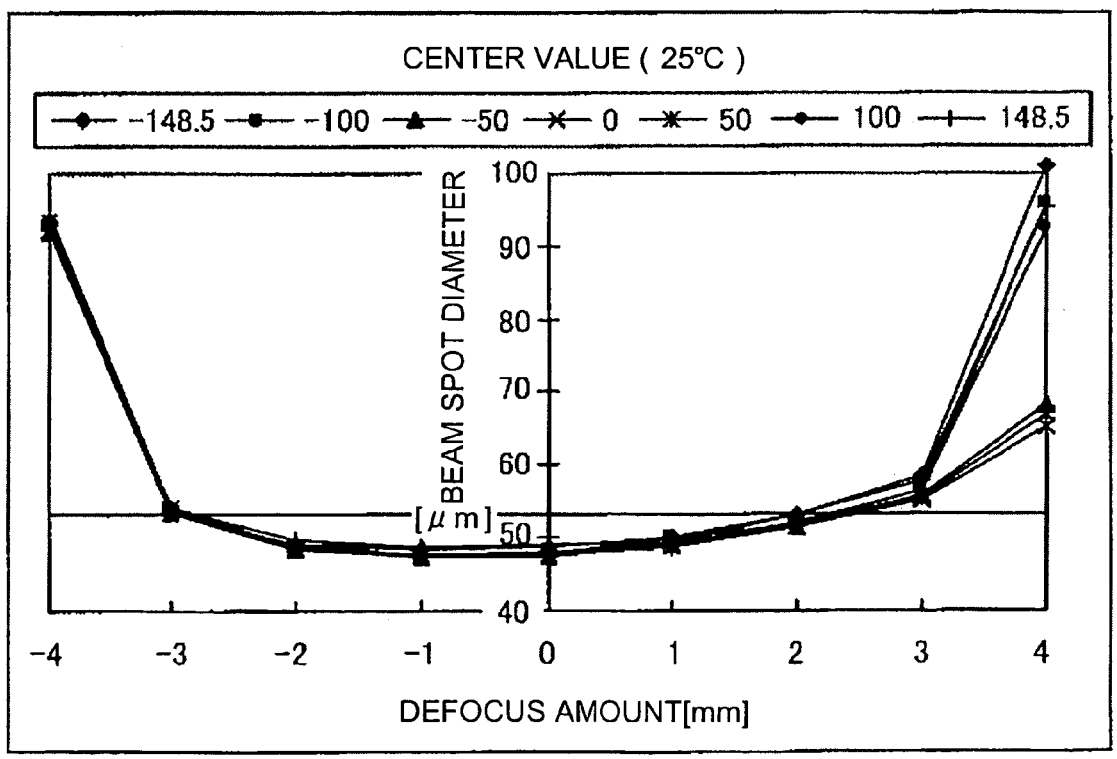
Figure 3A:
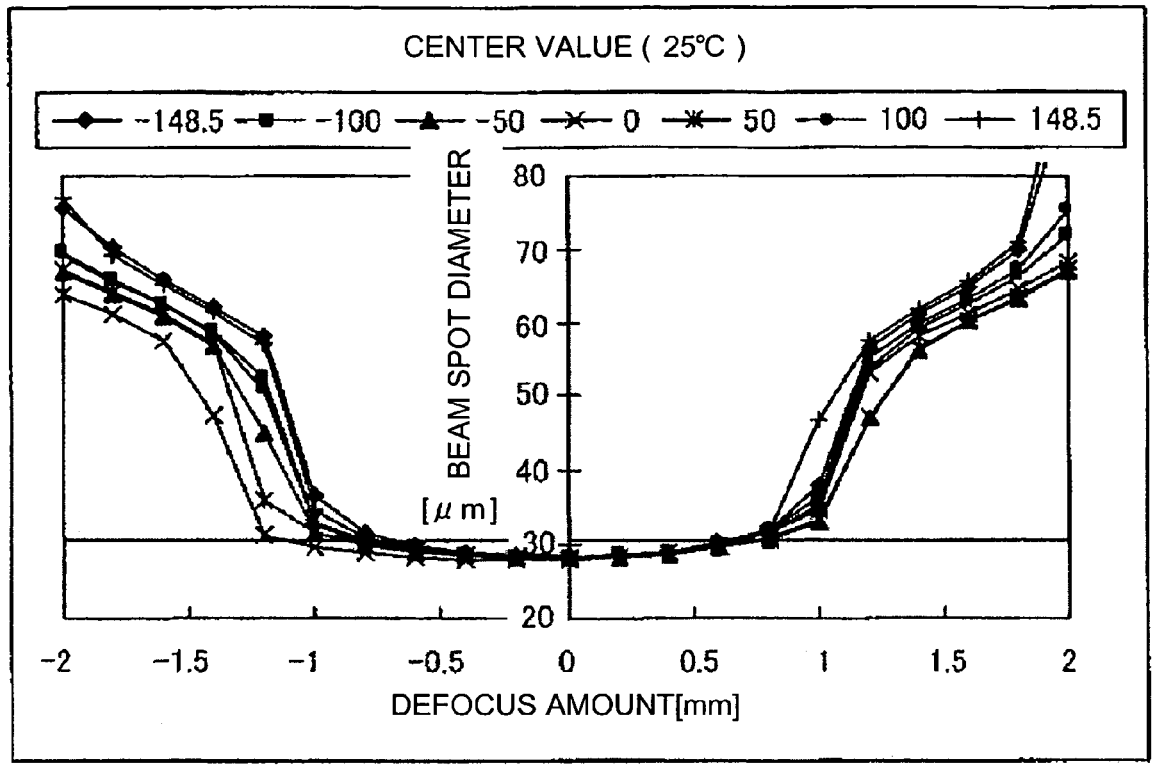
FIG. 3A and FIG. 3B depict depth characteristic of a second working example.
Figure 3B:
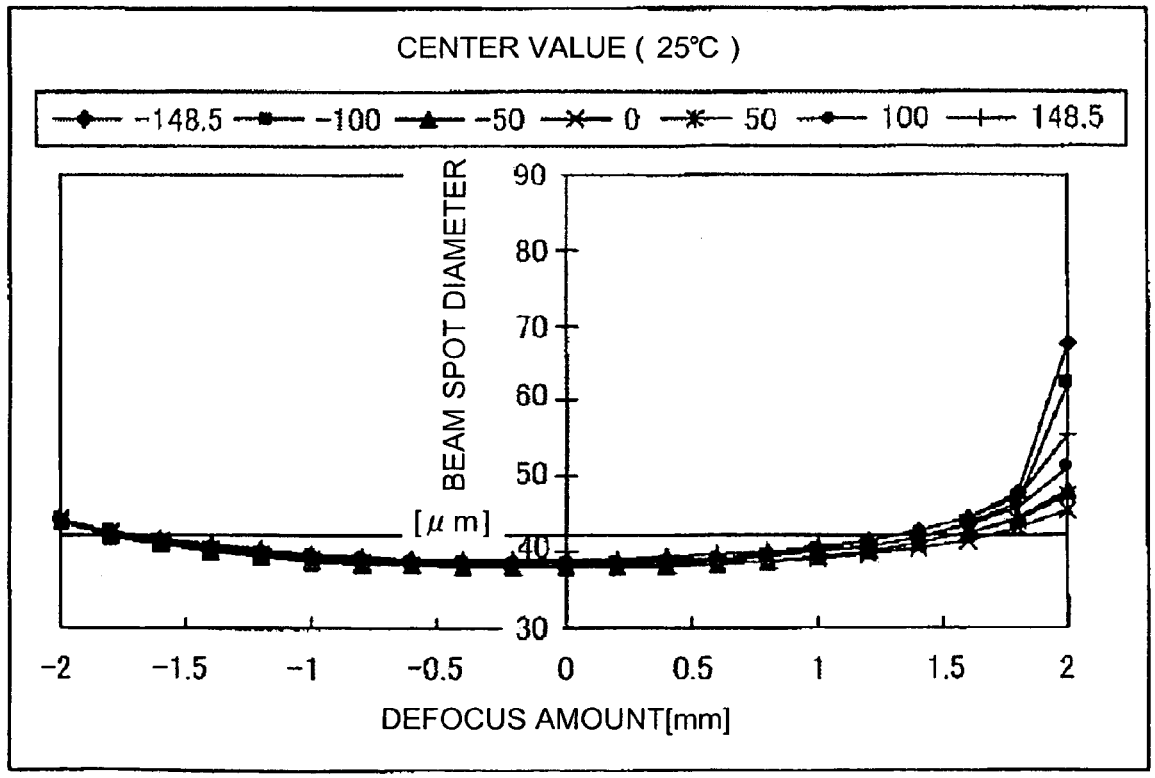
Figure 4A:
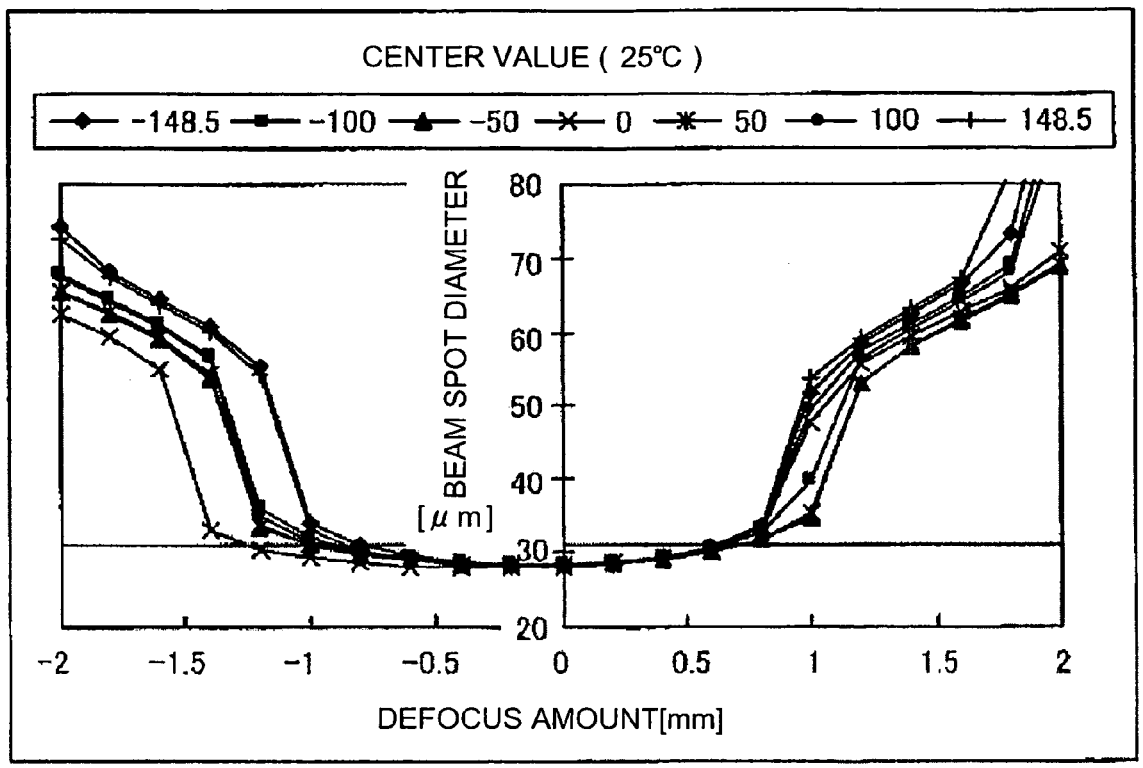
FIG. 4A and FIG. 4B depict depth characteristic of a third working example.
Figure 4B:
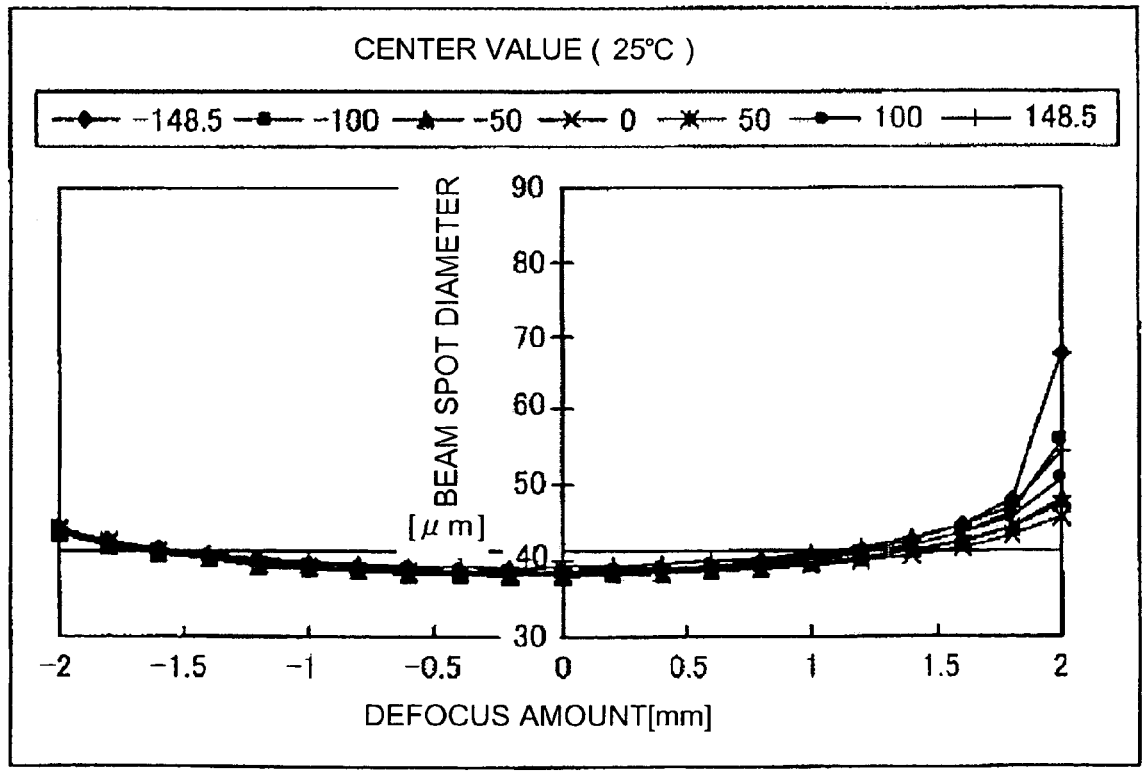

FIG. 2A and FIG. 2B depict depth characteristic of the first working example, FIG. 3A and FIG. 3B depict depth characteristic of the second working example, and FIG. 4A and FIG. 4B depict depth characteristic of the third example.

In FIG. 2A, FIG. 2B, FIG. 3A, FIG. 3B, FIG. 4A, and FIG. 4B, the vertical axis represents the beam spot diameter and the horizontal axis represents the defocus amount (shift length between the scanning surface and the beam waist position). Thus, the lines in these drawings represent the beam spot diameter on the scanning surface when the beam waist position shifts by a defocus amount on the scanning surface. The upper drawing in FIG. 2 represents the main scanning direction and the lower drawing represents the sub-scanning direction. Likewise, FIG. 3A and FIG. 4A represent the main scanning direction and FIG. 3B and FIG. 4B represent the sub-scanning direction.

Table 2 lists the parameters of Conditions (1) through (6) and their values for the first to third working examples.

TABLE 2

| Condition | | First working example | Second working example | Third working example |
|---|---|---|---|---|
| Condition (1) and (2) | $\Delta m1$ | 2.20E−01 | −2.50E−03 | −2.50E−03 |
| | $\Delta m2$ | −1.90E−01 | −1.60E−02 | −1.60E−02 |
| | $\Delta d1$ | 1.08E−03 | 6.21E−04 | 6.21E−04 |
| | f1 | 27.0 | 27.0 | 27.0 |
| | $\Delta m3$ | 6.62E−02 | 6.62E−02 | 6.62E−02 |
| | f2 | 238.5 | 238.5 | 238.5 |
| | Left hand side of Condition (1) | 0.01 | 0.00 | 0.00 |
| | Wm | 3.2 | 1.2 | 1.2 |
| | Right hand side of Condition (1) | 0.16 | 0.06 | 0.06 |
| Condition (3) | $\Delta m'1$ | 0.05 | 0.13 | 0.13 |
| | $\Delta m'2$ | −1.60 | −0.15 | −0.15 |
| | $\Delta m'3$ | 0.02 | 0.02 | 0.02 |
| | Sum of $\Delta m'1$ through $\Delta m'3$ | −1.5 | 0.0 | 0.0 |
| | Wm | 3.2 | 1.2 | 1.2 |
| Condition (4) and (5) | $\Delta s1$ | 2.00E−02 | −3.50E−02 | −3.50E−02 |
| | $\Delta s2$ | −8.50E−02 | −4.06E−02 | −4.06E−02 |
| | $\Delta s3$ | 7.85E−02 | 7.85E−02 | 7.85E−02 |
| | $\Delta d1$ | 1.08E−03 | 6.21E−04 | 6.21E−04 |
| | $\beta1$ | −4.4 | −4.4 | −4.4 |
| | $\beta2$ | −0.98 | −0.98 | −0.98 |
| | Left hand side of Condition (4) | 0.0 | −0.01 | −0.01 |
| | Ws | 5.0 | 2.8 | 2.8 |
| | Right hand side of Condition (4) | 0.25 | 0.14 | 0.14 |
| Condition (6) | $\Delta s'1$ | 0.005 | 0.005 | 0.005 |
| | $\Delta s'2$ | −0.360 | −0.380 | −0.380 |
| | $\Delta s'3$ | 0.020 | 0.020 | 0.020 |
| | Ws | 5.0 | 2.8 | 2.8 |
| | Sum of $\Delta s'1$ through $\Delta s'3$ | −0.3 | −0.4 | −0.4 |

As is evident from Table 2, Conditions (1) through (6) are satisfied and excellent optical characteristics is realized in first to third working examples even when there is temperature and wavelength variation. It is assumed that the optical scanning device described in the embodiment/working examples adopt a single beam method. However, other methods such as a multi-beam method may be adopted for optical scanning, by using a prism for combining the light beams from a plurality of semiconductor laser devices, or by using semiconductor laser array.

Figure 6:
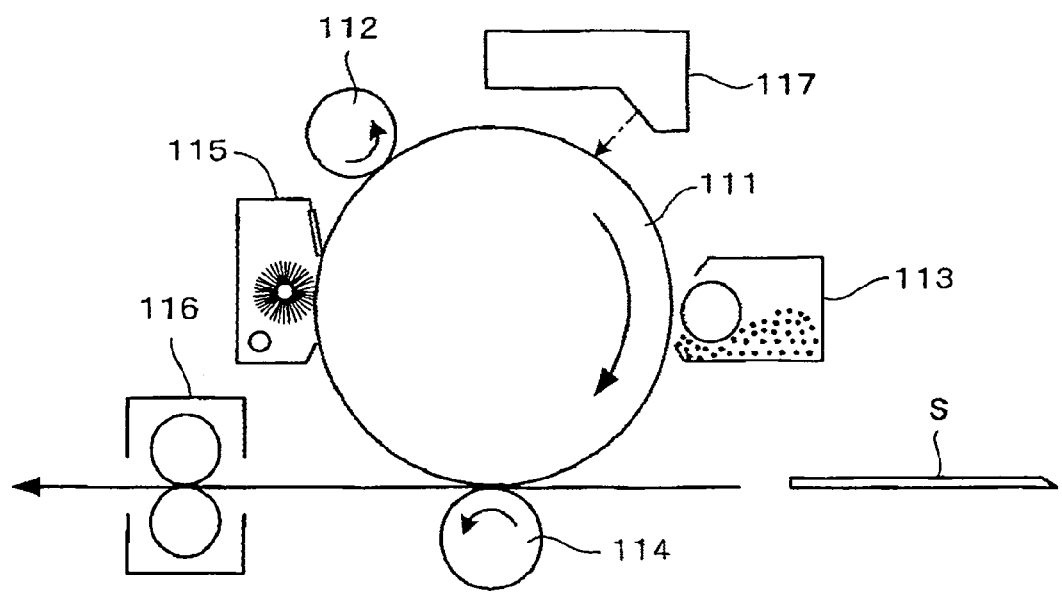
FIG. 6 is a schematic of relevant parts of an image forming apparatus.

FIG. 6 is a schematic of an image forming apparatus in which an optical scanning device according to above embodiment is employed. The reference numeral 111 denotes a photosensitive body in the form of a drum and which is optically conductive and turns at a constant speed. The surface of the photosensitive body 111 is uniformly charged by a charging roller 112 which functions as a charging unit. An optical scanning device 117 carries out optical scanning to form an electrostatic latent image on the photosensitive body 111. The optical scanning device 117 has a structure that is explained with respect to FIG. 1

The electrostatic latent image (negative latent image) is developed by a developing device 113 to thereby obtaining a visible toner image. The toner image is transferred to a recording medium S, which is in the form of a sheet, by a transfer unit 114, fixed by a fixing device 116, and ejected out of the image forming apparatus.

A cleaning device 115 cleans paper particles and the residual toner remaining on the photosensitive body 111 after the transfer of the toner image.

An optical scanning device according to any of the three working examples described earlier can be used as the optical scanning device 117.

A tandem-type color image forming apparatus may also be used as the image forming apparatus.

Another embodiment of the optical scanning device according to the present invention optically scans the scanning surface by the method mentioned next. The light beam from the semiconductor laser device is converted to a beam of desired beam pattern by the coupling lens. The beam then passes through an anamorphic optical element, which guides the beam to an optical deflector. The beam deflected by the optical deflector is converged on the scanning surface by a scanning optical system to form a laser spot and scan the scanning surface.

That is, the scanning optical system consists of more than one resin lens.

The anamorphic optical element that guides the beam emerging from the coupling lens to the optical deflector is a resin lens. One surface of the anamorphic optical element is a rotationally symmetrical concentric circular power diffractive surface. The other surface of the anamorphic optical element is a parallel linear power diffractive surface in the main scanning direction and has a converging effect only in the sub-scanning direction.

The power of the power diffractive surfaces is set such that the beam waist position shift in the main scanning direction or sub-scanning direction or both main scanning and sub-scanning directions caused by mode hopping or temperature variation or both in the semiconductor laser device is kept substantially zero.

Power diffractive surface refers to a surface having a diffractive function equal to the lens action. Concentric circular surface refers to the arrangement of the gratings forming the power diffractive surface in a concentric circular fashion. Parallel linear surface refers to the arrangement of the gratings forming the diffractive surface in a parallel linear fashion.

The coupling lens converts the light beam emitted from the semiconductor laser device to a beam having desired beam pattern. Desired beam pattern refers to parallel beam, mildly divergent beam, or mildly convergent beam. The optical element disposed more towards the image side than the coupling lens can be adjusted according to the beam emerging from the coupling lens.

The laser spot formed on the scanning surface by the optical scanning device is an image of the light source, that is, the emitter of the semiconductor laser device. However, the power of the optical elements disposed between the light source and the scanning surface differ in the main scanning direction and the sub-scanning direction, it is necessary to take into account the fact that the beam waist positions in the main scanning direction and the sub-scanning direction will be different.

One surface of the anamorphic optical element (the anamorphic resin lens) of the optical scanning device can be a spherical surface having a concentric circular power diffractive surface thereon and the other surface can be a cylindrical surface having a linear power diffractive surface thereon (claim 2). "Spherical surface having a concentric circular power diffractive surface thereon" indicates that the surface on which the circular power diffractive surface is provided is itself spherical. Similarly, "cylindrical surface having a liner power diffractive surface thereon" indicates that the surface on which the linear power diffractive surface is provided is itself cylindrical.

By providing the power diffractive surface on a spherical or cylindrical surface, the optical power of the curved surface bearing the power diffractive surface can be combined with the power of the power diffractive surface.

The anamorphic optical element can be constructed as "an optical element having a positive power in the sub-scanning direction but no power in the main scanning direction at standard wavelength" by canceling out the power of the concentric circular power diffractive surface and the power of the spherical surface bearing the power diffractive surface at standard wavelength.

"Standard wavelength" refers to the optical system design-level emission wavelength of the semiconductor laser device.

It is preferable to set the coupling action of the coupling lens as "collimating action".

By rendering the anamorphic optical element devoid of power in the main scanning direction, the variation in the beam waist position in the sub-scanning direction caused by processing error or imposing error that may occur when initially imposing the optical system can be adjusted without affecting the optical characteristics in the main scanning direction by shifting the anamorphic optical element in the direction of the optical axis.

By rendering one surface spherical with concentric circular power diffractive surface provided thereon, good alignment of the incident surface and the exit surface is realized as no degradation of the optical characteristics takes place because of the rotation of this surface around the optical axis.

It is preferable that the coupling lens be made of glass. The glass lens is not easily affected by environmental variation, making it easy to design other optical elements.

In the optical scanning device according to the present invention, a single beam scanning method may be adopted by using an ordinary semiconductor laser device, or the widely known multi-beam scanning method may be adopted by using a semiconductor laser array or by combining the light beams from two or more semiconductor laser devices.

The image forming apparatus according to the present invention forms a latent image by optically scanning the photosensitive image bearing member by means of an optical scanning unit and includes more than one image forming unit that converts the latent image into a visible image by a developer. The optical scanning unit used in the image forming apparatus according to the present invention is an optical scanning device according to any one of the embodiments described earlier.

The image forming apparatus can be constructed with a single image forming unit to produce monochromic images, or with two or more image forming units to produce two-tone images, multi-tone, and full color images. A separate optical scanning device may be provided for each image forming unit. Alternatively, as disclosed in Japanese Patent Laid-Open Publication No. 2004-280056, some of the optical elements, for instance, optical deflectors, or a part of the scanning optical system, may be shared by a plurality of image forming units.

In the case of multiple image forming units, the image forming units may be set at different locations with respect to a single image bearing member. Alternatively, in a tandem-type color image forming apparatus, each of the image bearing members arranged antero-posteriorly has a separate image forming unit.

The variation in the beam waist position due to variation in the environment and wavelength is briefly discussed next, given that resin lenses are included in the optical system of the optical scanning device.

The possible reasons for the variation in the beam waist position due to temperature variation are "variation of the refractive index itself of the resin lens", "variation of the shape of the resin lens", and "variation in the refractive index of the resin lens (color aberration) due to the variation in the emission wavelength of the semiconductor laser device".

The refractive index of the resin lens decreases due to the decrease in the density caused by the expansion of the resin lens accompanying the temperature rise.

The shape of the resin lens changes with the rise in temperature, the surface curvature reducing due to the expansion of the resin lens accompanying the temperature rise.

The emission wavelength of the semiconductor laser device tends to get longer with the temperature rise, causing the refractive index of the resin lens to drop.

In other words, irrespective of whether the resin lens is a positive lens or a negative lens, the absolute value of the lens power against the light beam from the semiconductor laser device decreases with the rise in temperature.

As the diffraction angle is proportional to the wavelength, the absolute value of the power due to the diffracting unit of the power diffractive surface tends to increase with the wavelength, irrespective of whether the diffracting unit is positive or negative.

Accordingly, if the combined power of the resin lenses in the optical system of the optical scanning device is positive (or negative), the change in the power of the resin lens due to temperature variation and the change in the power in the diffraction unit of the power diffractive surface can be canceled out by making the power of the diffraction unit positive (or negative).

The power diffractive surface, which is an anamorphic optical element used in the optical scanning device according to the present invention, is provided on spherical and cylindrical surfaces as well as on plane surfaces. In some cases, the part of the power diffractive surface touching the substrate also possesses power. However, "diffraction unit" of the power diffractive surface refers only to the part of the diffractive surface that has the only power of the diffractive surface and precludes the part having of "the power of the part touching the substrate".

To give a specific example, if we assume the power of both the resin lenses in the optical system and the diffraction unit of the power diffractive surface to be positive, and the environmental temperature to be rising, then, $$A>1, B>0, C>0, \text{ and } D<0$$

where, A is the beam waist position shift amount due to variation in the refractive index of the resin lens, B is the beam waist position shift amount due to change in the shape of the resin lens, C is the beam waist position shift amount due to the variation in the refractive index of the resin lens due to the variation in the emission wavelength of the semiconductor laser device, and D is the beam waist position shift amount due to the change in the power of the diffraction unit of the power diffractive surface due to the variation in the emission wavelength of the semiconductor laser device.

The total beam waist position shift amount accompanying the temperature variation is A+B+C−D. Since A, B, and C can be made constant by using an optical system having resin lenses, the variation in the beam waist position can be corrected favorably by setting the power of the diffraction unit of the power diffractive surface to satisfy the condition, A+B+C−D=0.

Other than temperature variation, mode hopping also causes the emission wavelength to vary. Since wavelength variation due to mode hopping is a microscopic physical phenomenon, it is extremely difficult to predict.

If emission wavelength variation due to mode hopping occurs irrespective of the variation in the temperature, and if the emission wavelength variation due to mode hopping occurs when there is no change in the standard temperature, then, in the aforementioned Condition A and B would be 0. However, D, which in this case is the beam waist position shift amount due to mode hopping, becomes excessive, making the total beam waist position shift amount, C−D, less than zero. Thus, the beam position in this case changes significantly and is difficult to correct.

Thus, in an optical scanning device that employs power diffractive surfaces, it is important to correct not only the beam waist position variation due to temperature variation but also the beam waist position variation due to mode hopping to always obtain a steady beam spot diameter.

To decrease the variation in the beam waist position due to the variation in the emission wavelength resulting from mode hopping, it is necessary to set power of the diffraction unit of the power diffractive surface appropriately. Assigning a substantial power to the diffraction unit of the power diffractive surface will result in an increased variation beam waist position.

Thus, in the optical scanning device according to the present invention, the power of the diffraction unit of the power diffractive surface is set so that the beam waist position shift in the main scanning direction or the sub-scanning direction or both main scanning and sub-scanning directions, caused by mode hopping or temperature variation in the semiconductor laser device is substantially zero.

It is preferable that the power of the diffraction unit of the power diffractive surface Pm (in the main scanning direction) and Ps (in the sub-scanning direction) and the power of the coupling lens Pcm (in the main scanning direction) and Pcs (in the sub-scanning direction) have the following relation.

$$4 < Pcm/Pm < 26 \quad (1)$$

$$0.5 < Pcs/Ps < 26 \quad (2)$$

In the present invention, both the incident surface and the exit surface of the anamorphic optical elements are provided with the power diffractive surface. Thus, Pm and Ps refer to the combined power of the incident surface and the exit surface of the anamorphic optical elements in the main scanning direction and the sub-scanning direction, respectively.

If the parameter Pcm/Pm of Condition (1) is plotted on the horizontal axis and the beam waist position shift amount in the main scanning direction due to mode hop-induced emission wavelength variation is plotted on the vertical axis, it can be observed that the beam waist position shift amount increases linearly with the parameter Pcm/Pm.

It is preferable to keep the beam waist position shift amount in the main scanning direction due to mode hop-induced emission wavelength variation to 0.5 mm or less. In the linear relation between Pcm/Pm and the beam waist position shift amount, the value of the parameter Pcm/Pm corresponding to the beam waist position shift amount in main scanning direction due to mode hop-induced emission wavelength variation 0.5 is 26. Accordingly, the upper limit of the parameter is set as 26 in Condition (1).

If the parameter Pcm/Pm of condition (1) is plotted on the horizontal axis and the beam waist position shift amount in the main scanning direction due to temperature variation is plotted on the vertical axis, it can be observed that the beam waist position shift amount decreases linearly with the parameter Pcm/Pm.

It is preferable to also keep the beam waist position shift amount in the main scanning direction due to temperature variation to 0.5 mm or less. In the linear relation between Pcm/Pm and the beam waist position shift amount, the value of the parameter Pcm/Pm corresponding to the beam waist position shift amount in main scanning direction due to temperature variation 0.5 is 4. Accordingly, the lower limit of the parameter is set as 4 in Condition (1).

Similarly, if the parameter Pcs/Ps of Condition (2) is plotted on the horizontal axis and the beam waist position shift amount in the sub-scanning direction due to mode hop-induced emission-wavelength variation is plotted on the vertical axis, it can be observed that the beam waist position shift amount increases linearly with the parameter Pcs/Ps.

It is preferable to keep the beam waist position shift amount in the sub-scanning direction due to mode hop-induced emission wavelength variation to 0.5 mm or less. In the linear relation between Pcs/Ps and the beam waist position shift amount, the value of the parameter Pcs/Ps corresponding to the beam waist position shift amount in the sub-scanning direction due to mode hop-induced emission wavelength variation 0.5 is 26. Accordingly, the upper limit of the parameter is set as 26 in Condition (2).

If the parameter Pcs/Ps of Condition (2) is plotted on the horizontal axis and the beam waist position shift amount in the sub-scanning direction due to temperature variation is plotted on the vertical axis, it can be observed that the beam waist position shift amount decreases linearly with the parameter Pcs/Ps.

It is preferable to also keep the beam waist position shift amount in the sub-scanning direction due to temperature variation to 0.5 mm or less. In the linear relation between Pcs/Ps and the beam waist position shift amount, the value of the parameter Pcs/Ps corresponding to the beam waist position shift amount in sub-scanning direction due to temperature variation 0.5 is 0.5. Accordingly, the lower limit of the parameter is set as 0.5 in Condition (2).

Thus, in the optical scanning device according to the present invention, the power of the power diffractive surface is set so that the beam waist position shift in the main scanning direction or the sub-scanning direction or both main scanning and sub-scanning directions, caused by mode hopping and temperature variation in the semiconductor laser device is substantially zero. Thus by efficiently correcting the beam waist position shift arising not only from temperature variation but also emission wavelength variation due to mode hopping, it can be ensured that the beam spot diameter is always steady when optical scanning is carried out. Thus, by using this optical scanning device in the image forming apparatus according to the present invention, stable image forming can be ensured.

Exemplary embodiments of the present invention are explained next with reference to the accompanying drawings.

Figure 7:
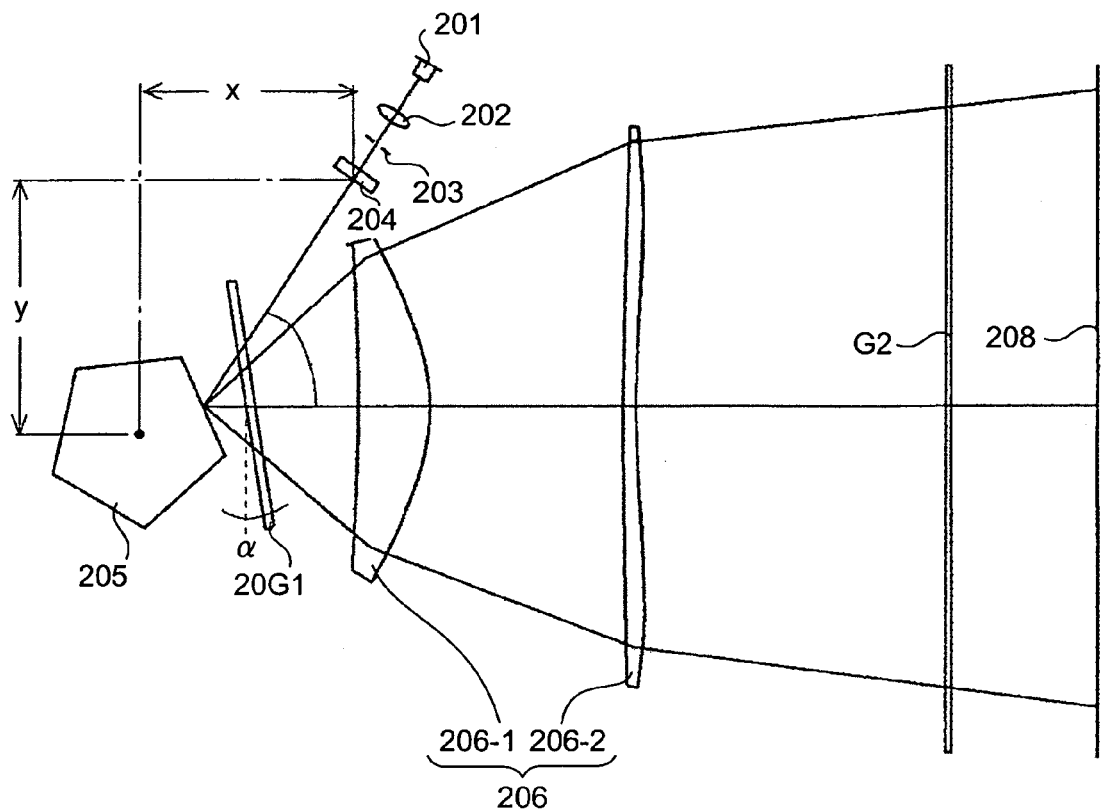
FIG. 7 is a schematic of relevant parts of an optical scanning device.

FIG. 7 is a drawing illustrating an optical arrangement according to one embodiment of the optical scanning device.

In FIG. 7, the reference numeral 201 denotes a semiconductor laser device functioning as a light source. The reference numeral 202 denotes a coupling lens. The reference numeral 203 denotes an aperture. The reference numeral 204 denotes an anamorphic optical element. The reference numeral 205 denotes a polygonal mirror which is a rotary polygonal mirror functioning as an optical deflector. The reference numeral 206 denotes a scanning optical element. The reference numeral 208 denotes a scanning surface. The reference symbol 20G1 denotes a soundproof glass that closes a window of a not shown soundproof housing in which the polygonal mirror 205 is housed. The reference symbol 20G2 denotes a dustproof glass provided at the deflected light beam exit of the housing in which the optical system is housed.

A divergent light beam emitted from the light source 201 passes through the coupling lens 202 and emerges as a substantially parallel beam. The emerging beam passes through the aperture 203, which carries out beam-shaping. The beam then enters the anamorphic optical element 204. The beam emerging from the anamorphic optical element 204 converges in the sub-scanning direction, passes through the soundproof glass 20G1 to emerge as a parallel beam in the main scanning direction and converges near the deflective surface of the polygonal mirror 205 as "a long line in the main scanning direction". The beam deflected from the polygonal mirror 205 passes through the soundproof glass 20G1 to become incident on the scanning optical system 206.

The scanning optical system 206 includes two lenses 206-1 and 206-2. The light beam emerging from the lenses 206-1 and 206-2 passes through the dustproof glass 20G2 and enters the scanning surface 208 and forms a beam spot on the scanning surface 208 due to the action of the scanning optical system 206.

The polygonal mirror 205 turns at a constant speed and the beam deflected by the deflective surface is deflected at isometric speed. The scanning optical system 206 includes an fθ feature that shifts the beam spot produced by the beam deflected at isometric speed in the sub-scanning direction (in the vertical direction in FIG. 7) at a constant speed. The beam spot thus scans the scanning surface 208 at a constant speed.

The scanning optical system 206 is also anamorphic. By geometric optically conjugating the position of the deflective surface of the polygonal mirror 205 and the position of the scanning surface 208, the slant of the polygonal mirror 205 is corrected. The scanning surface 208 is in actuality the surface of a photosensitive medium.

The anamorphic optical element 204 is an anamorphic resin lens. One surface of the anamorphic optical element 204 is a spherical surface on which a concentric circular power diffractive surface is provided. The other surface is a cylindrical surface on which a linear power diffractive surface is provided.

Figure 8:
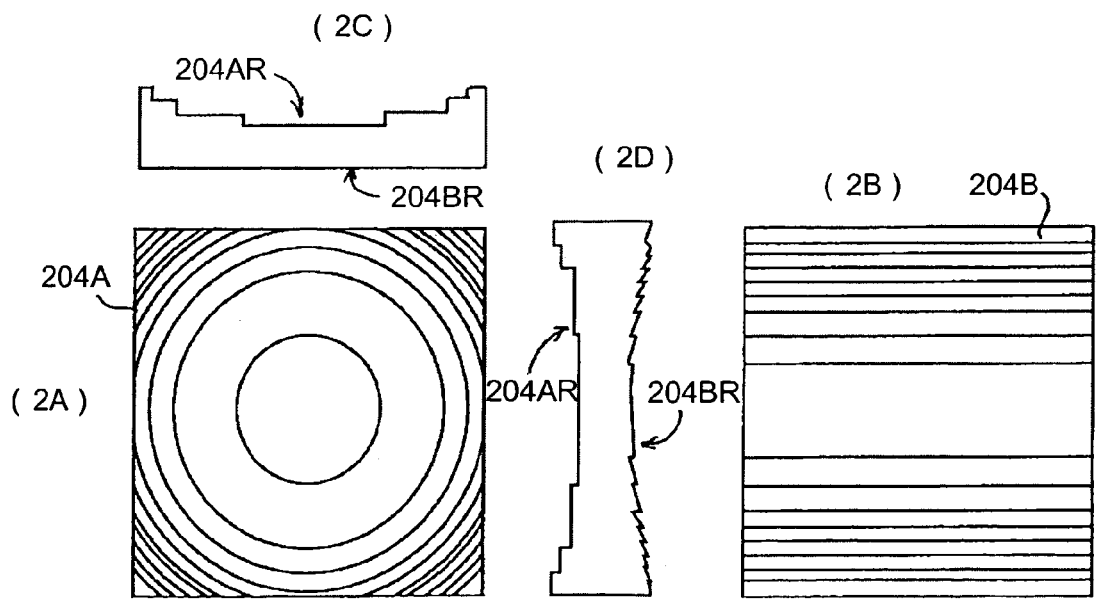
FIG. 8 is a schematic of an anamorphic optical element.

FIG. 8 is a drawing illustrating the anamorphic optical element 204.

(2A) of FIG. 8 represents the incident surface of the anamorphic optical element as viewed from the optical axis direction. (2B) of FIG. 8 represents the exit surface of the anamorphic optical element 204 as viewed from the optical axis. In (2A) and (2B) the horizontal direction represents the main scanning direction and the vertical direction represents the sub-scanning direction. (2C) of FIG. 8 represents a cross-sectional view of the anamorphic optical element 204 cut parallel to the main scanning direction and including the optical axis. (2D) of FIG. 8 represents an imaginary cross-sectional view of the anamorphic optical element 204 cut parallel to the sub-scanning direction and including the optical axis.

As shown in (2A), when viewed from the optical axis direction, an incident surface 4A of the anamorphic optical element 204 has a power diffractive surface 4AR consisting of concentric circular grooves. As shown in (2C) and (2D), the power diffractive surface 4A is formed on a concave spherical surface. The concentric circular power diffractive surface, which is the power diffractive surface 4AR at the incident end of the anamorphic optical element 204, has a positive power. However, the concave spherical surface on which the power diffractive surface 4AR is formed has a negative power. The positive power of the concentric circular power diffractive surface and the negative power of the concave spherical surface cancel each other out at standard wavelength.

As shown in (2B), when viewed from the optical axis direction, an exit surface 4B of the anamorphic optical element 204 has a power diffractive surface 4BR consisting of linear grooves. As shown in (2D), the power diffractive surface 4B is formed on a concave cylindrical surface. The linear power diffractive surface, which is the power diffractive surface 4BR at the exit end of the anamorphic optical element 204, has a positive power in the sub-scanning direction. However, the concave cylindrical surface on which the power diffractive surface 4BR is formed has a negative power. The positive power of the linear diffractive surface in the sub-scanning direction exceeds the negative power of the concave cylindrical surface at standard wavelength.

Thus, on the incident surface of the anamorphic optical element 204, the power of the concentric circular power diffractive surface and the power of the concave spherical surface bearing the power diffractive surface cancel each other out at standard wavelength. On the exit surface of the anamorphic optical element 204, the positive power of the linear power diffractive surface in the sub-scanning direction exceeds the negative power of the cylindrical surface bearing the linear power diffractive surface in the sub-scanning direction at standard wavelength. Consequently, the anamorphic optical element 204 does not have any power in the main scanning direction and has a positive power in the sub-scanning direction at standard wavelength.

Therefore, the light beam (parallel light beam) entering the anamorphic optical element 204 from the light source end emerges from the anamorphic optical element 204 as a parallel beam in the main scanning direction and a convergent beam in the sub-scanning direction.

The power of the power diffractive surfaces in the main scanning direction and the sub-scanning direction is set so that the beam waist position shift in the main scanning direction or the sub-scanning direction or both main scanning and sub-scanning directions, caused by mode hopping and temperature variation in the semiconductor laser device 201, is substantially zero.

Fourth Working Example

A fourth working example pertaining to the embodiment described above is explained next.

Table 3 lists the data pertaining to the glass materials (referred to as glass 1 and glass 2) and the resin material (referred to as resin) used in the comparative examples explained later.

TABLE 3

|  | Center value | Wavelength jump | Temperature variation | Coefficient of linear expansion |
|---|---|---|---|---|
| Glass 1 | 1.68963 | 1.68959 | 1.68953 | $7.5 \times 10^{-6}$ |
| Glass 2 | 1.51437 | 1.51434 | 1.51429 | $7.5 \times 10^{-6}$ |
| Resin | 1.52726 | 1.52723 | 1.52537 | $7.5 \times 10^{-5}$ |

In Table 3, "center value" refers to the refractive index corresponding to an operating wavelength (standard wavelength) at 25° C., "wavelength jump" refers to the refractive index when there is a wavelength jump due to mode hopping, and "temperature variation" refers to the refractive index when the temperature goes up by 20° C. from the standard temperature. A wavelength jump of about 0.8 nm due to mode hopping is assumed.

The elements of the optical system are as follows:

"Light Source"

The semiconductor laser device 201 that functions as the light source has a standard emission wavelength, which is the wavelength set at the time of designing, of 655 nm, increasing by 0.2 nm with every 1° C. rise of temperature from the standard temperature of 25° C. A wavelength variation of 0.8 nm due to mode hopping is assumed.

"Coupling Lens"

The coupling lens 202 is a glass lens made of glass 1. The coupling lens 202 is placed such that the forward principal point is at a distance of 27 mm from the emitter of the semiconductor laser device 201 so that the collimation takes place at a focal distance of 27 mm. The coupling lens 202 includes an aspherical surface, which adequately corrects the wavefront aberration of the collimated light beam.

The semiconductor laser device 201 and the coupling lens 202 are fixed to a holding member made of a material with a linear expansion coefficient of $7.0 \times 10^{-5}$.

"Aperture"

The aperture 203 is a rectangular opening with an opening diameter of 8.14 mm in the main scanning direction and 2.96 mm in the sub-scanning direction, and shapes the light beam collimated by the coupling lens 202.

"Anamorphic Optical Element"

The incident surface of the anamorphic optical element 204 is a concave spherical surface that has formed thereon a concentric circular power diffractive surface. The exit surface of the anamorphic optical element 204 is a concave cylindrical surface that has formed thereon a linear power diffractive surface.

The phase function of the power diffractive surface $W_{in}$ on the incident surface is represented by the expression as follows:

$$W_{in} = C_0 \cdot r^2$$

The phase function of the power diffractive surface $W_{out}$ on the exit surface is represented by the expression as follows:

$$W_{out} = C_z \cdot Z^2$$

where, r is represented by the expression as follows:

$$r^2 = Y^2 + Z^2$$

where, Y denotes a coordinate in the main scanning direction and Z denotes a coordinate in the sub-scanning direction (the origin point of both Y and Z being the optical axis position).

The coefficients $C_0$ and $C_z$ are as follows:

$C_0 = -1.07033 \times 10^{-3}$ and $C_z = -7.8825 \times 10^{-3}$

"Optical Deflector"

The polygonal mirror 205 that functions as the optical deflector has five reflective surfaces with an incircle radius of 18 mm. The distance between the exit surface of the anamorphic optical element 204 and the optical axis of the polygonal mirror 205, represented by a "horizontal distance x" and a "vertical distance y" in FIG. 7, are 82.97 mm and 112.77 mm, respectively.

The soundproof glass 20G1 is made of glass 1 and has a thickness of 1.9 mm and a tilt angle α from γ direction (vertical direction in FIG. 7) of 16°.

The angle θ formed between the direction of the light beam propagation from the light source and direction of propagation of the light beam deflected towards the target position 0 on the scanning surface 208 is 58°. Table 4 lists the data pertaining to all the elements constituting the optical system, from the light source to the optical deflector.

TABLE 4

|  | $R_m$ | $R_s$ | L | n |
|---|---|---|---|---|
| Light source | — | — | 55.74 | — |
| Aperture | — | — | 34.71 | — |
| Anamorphic optical element | Incident surface-Concave spherical surface −246.5 | Exit surface-Concave cylindrical surface −52.16 | 3 | Resin |
| Optical deflector (rotation axis) | — | — | — | — |

In Table 4, $R_m$ represents curvature radius in the main scanning direction, $R_s$ represents curvature radius in the sub-scanning direction, and L represents distance between surfaces. The unit is millimeter.

Table 5 lists data of optical elements that come after the optical deflector.

TABLE 5

|  | $R_m$ | $R_s$ | $D_x$ | $D_y$ | n |
|---|---|---|---|---|---|
| Optical deflector (Rotation axis) | — | — | 79.75 | 8.8 | — |
| Scanning optical system 6-1 | −279.88 | −61.00 | 22.6 | 0 | Resin |
|  | −83.58762 |  | 75.85 | 0 | — |
| Scanning optical system 6-2 | 6950 | 110.91 | 4.9 | 0 | Resin |
|  | 765.95 | −68.22 | 158.71 | 0 | — |
| Scanning surface | — | — | — | — | — |

In table 5, $R_m$ represents paraxial curvature in the main scanning direction, $R_s$ represents paraxial curvature in the sub-scanning direction, and $D_x$ and $D_y$ represent relative distance from the origin point of one optical element to the origin point of the next optical element. The unit is millimeter.

For example, the distance $D_x$ in the optical axis direction (x direction, horizontal direction in FIG. 7) from the rotation axis of the optical deflector (polygonal mirror 205) to the origin point of the incident surface of the lens 206-1 of the scanning optical system 206 is 79.75 mm. The distance $D_y$ in the main scanning direction (y direction, vertical direction in FIG. 7) from the rotation axis of the optical deflector (polygonal mirror 205) to the origin point of the incident surface of the lens 206-1 of the scanning optical system 206 is 8.8 mm.

The thickness of the lens 206-1 on the optical axis is 22.6 mm, the distance between the lenses 206-1 and 206-2 is 75.85, the thickness of the lens 206-2 on the optical axis is 4.9 mm, and the distance between the lens 206-2 to the scanning surface 208 is 158.71. As shown in FIG. 7, the dustproof glass 20G2 of a thickness of 1.9 mm and made of glass 1 having the specifications shown in Table 3 is disposed between the lens 206-2 of the scanning optical system 206 and the scanning surface 208.

All the surfaces of the lenses 206-1 and 206-2 of the scanning optical system 206 are aspherical.

The incident surface of the lens 206-1 and the incident and the exit surfaces of the lens 206-2 are acircular arc represented by Expression 1 in the main scanning direction. The curvature in the sub-scanning cross-section (an imaginary cross-section parallel to the optical axis and the sub-scanning direction) varies according to Expression 2 in the main scanning direction.

The exit surface of the lens 206-1 is concentric aspherical represented by a Expression 3.

"Aspherical Arc"

"Aspherical arc" shape is represented by the expression as follows:

$$X=(Y^2/Rm)/[1+\sqrt{\{1-(1+Km)(Y/Rm)^2\}}]+A_1Y+A_2Y^2+A_3Y^3+A_4Y^4+A_5Y^5+ \quad (1)$$

where, Rm is the paraxial curvature radius in the main scanning direction, Y is the distance from the optical axis in the main scanning direction, Km is the cone constant, A1, A2, A3, A4, A5, and so on are high-order coefficients, and X is the depth along the optical axis.

"Variation in Curvature in Sub-Scanning Cross-Section"

This is represented by the expression as follows:

$$Cs(Y)=\{1/Rs(0)\}+B_1Y+B_2Y^2+B_3Y^3+B_4Y^4+ \quad (2)$$

where, Y is the sub-scanning direction coordinate with the optical axis position as the origin point, Cs(Y) is the curvature in the sub-scanning cross-section, Rs(0) is the curvature radius in the sub-scanning cross-section including the optical axis, and $B_1$, $B_2$, $B_3$, and so on are coefficients.

"Rotationally Symmetrical Aspherical Surface"

This shape is represented by the expression as follows:

$$X=(H^2/R)/[1+\sqrt{\{1-(1+K)(H/R)^2\}}]+A_1Y+A_2Y^2+A_3Y^3+A_4Y^4+A_5Y^5+ \quad (3)$$

where, R is the paraxial curvature radius, H is the distance from the optical axis, K is the cone constant, $A_1, A_2, A_3, A_4, A_5$, and so on, are high-order coefficients, and X is the depth along the optical axis.

Table 6 lists the coefficients of the incident surface (special surface) of the lens 206-1.

TABLE 6

| Coefficient in main scanning direction | | Coefficient in sub-scanning direction | |
|---|---|---|---|
| K | $-2.900 \times 10$ | $B_1$ | $-2.066 \times 10^{-6}$ |
| $A_1$ | 0 | $B_2$ | $5.728 \times 10^{-8}$ |
| $A_2$ | 0 | $B_3$ | $3.152 \times 10^{-8}$ |
| $A_3$ | 0 | $B_4$ | $2.280 \times 10^{-9}$ |
| $A_4$ | $1.756 \times 10^{-7}$ | $B_5$ | $-3.730 \times 10^{-11}$ |
| $A_5$ | 0 | $B_6$ | $-3.283 \times 10^{-12}$ |
| $A_6$ | $-5.492 \times 10^{-11}$ | $B_7$ | $1.766 \times 10^{-14}$ |
| $A_7$ | 0 | $B_8$ | $1.373 \times 10^{-18}$ |
| $A_8$ | $1.088 \times 10^{-14}$ | $B_9$ | $-2.890 \times 10^{-18}$ |
| $A_9$ | 0 | $B_{10}$ | $-1.985 \times 10^{-19}$ |
| $A_{10}$ | $-3.183 \times 10^{-19}$ | $B_{11}$ | 0 |
| $A_{11}$ | 0 | $B_{12}$ | 0 |
| $A_{12}$ | $-2.635 \times 10^{-24}$ | $B_{13}$ | 0 |

Table 7 lists the coefficients of the exit surface (concentric aspherical surface) of the lens 206-1.

TABLE 7

| | Coefficient |
|---|---|
| K | $-0.549$ |
| $A_1$ | 0 |
| $A_2$ | 0 |
| $A_3$ | 0 |
| $A_4$ | $2.748 \times 10^{-7}$ |
| $A_5$ | 0 |
| $A_6$ | $-4.502 \times 10^{-12}$ |
| $A_7$ | 0 |
| $A_8$ | $-7.366 \times 10^{-15}$ |
| $A_9$ | 0 |
| $A_{10}$ | $1.803 \times 10^{-18}$ |
| $A_{11}$ | 0 |
| $A_{12}$ | $2.728 \times 10^{-23}$ |

Table 8 lists the coefficients of the incident surface (special surface) of the lens 206-2.

TABLE 8

| Coefficient in main scanning direction | | Coefficient in sub-scanning direction | |
|---|---|---|---|
| K | 0 | $B_1$ | $-9.594 \times 10^{-7}$ |
| $A_1$ | 0 | $B_2$ | $-2.135 \times 10^{-7}$ |
| $A_2$ | 0 | $B_3$ | $-8.080 \times 10^{-12}$ |
| $A_3$ | 0 | $B_4$ | $2.391 \times 10^{-12}$ |
| $A_4$ | $1.550 \times 10^{-8}$ | $B_5$ | $2.881 \times 10^{-14}$ |
| $A_5$ | 0 | $B_6$ | $3.694 \times 10^{-15}$ |
| $A_6$ | $1.293 \times 10^{-14}$ | $B_7$ | $-3.259 \times 10^{-18}$ |
| $A_7$ | 0 | $B_8$ | $1.814 \times 10^{-20}$ |
| $A_8$ | $-8.811 \times 10^{-18}$ | $B_9$ | $8.722 \times 10^{-23}$ |
| $A_9$ | 0 | $B_{10}$ | $-1.341 \times 10^{-23}$ |
| $A_{10}$ | $-9.182 \times 10^{-22}$ | $B_{11}$ | 0 |

Table 9 lists the coefficients of the exit surface (special surface) of the lens 206-2.

TABLE 9

| Coefficient in main scanning direction | | Coefficient in sub-scanning direction | |
|---|---|---|---|
| K | 5.790 | $B_1$ | 0 |
| $A_1$ | 0 | $B_2$ | $3.644 \times 10^{-7}$ |
| $A_2$ | 0 | $B_3$ | 0 |
| $A_3$ | 0 | $B_4$ | $-4.847 \times 10^{-13}$ |
| $A_4$ | $-1.150 \times 10^{-7}$ | $B_5$ | 0 |
| $A_5$ | 0 | $B_6$ | $-1.666 \times 10^{-16}$ |
| $A_6$ | $1.097 \times 10^{-11}$ | $B_7$ | 0 |

TABLE 9-continued

| Coefficient in main scanning direction | | Coefficient in sub-scanning direction | |
|---|---|---|---|
| $A_7$ | 0 | $B_8$ | $4.535 \times 10^{-19}$ |
| 0 | $-6.542 \times 10^{-16}$ | $B_9$ | 0 |
| $A_9$ | 0 | $B_{10}$ | $-2.819 \times 10^{-23}$ |
| $A_{10}$ | $1.984 \times 10^{-20}$ | $B_{11}$ | 0 |
| $A_{11}$ | 0 | $B_{12}$ | 0 |
| $A_{12}$ | $-2.412 \times 10{-25}$ | $B_{13}$ | 0 |

Figure 9A:
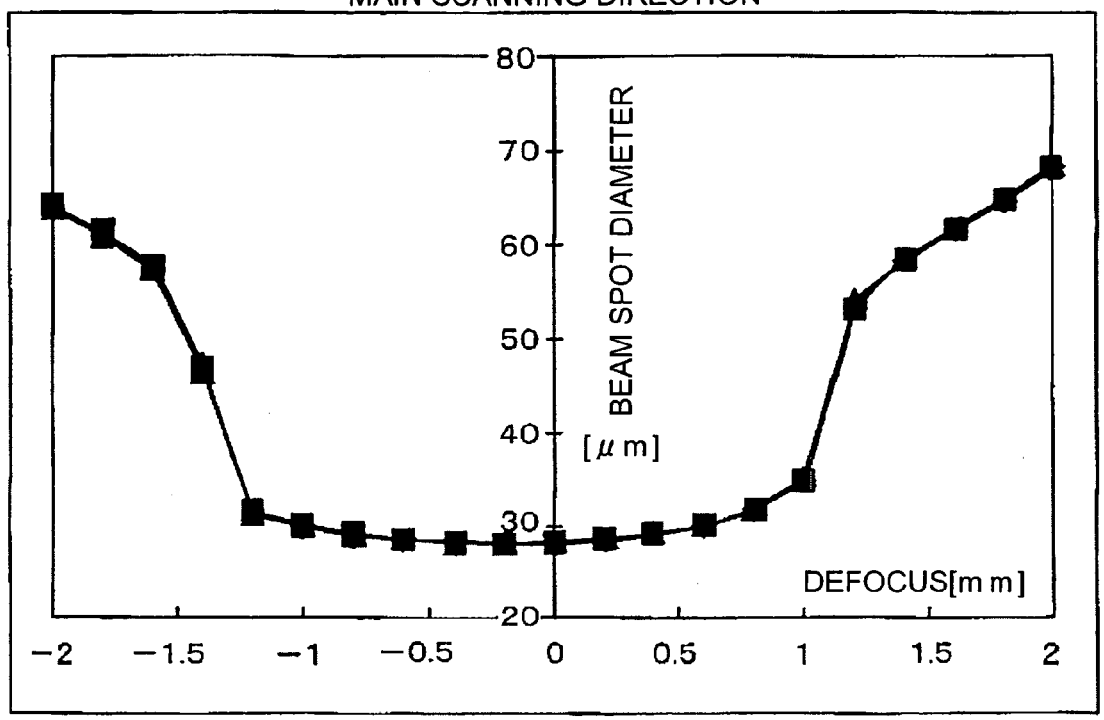
FIG. 9A and FIG. 9B depict depth characteristic of a fourth working example.
Figure 9B:
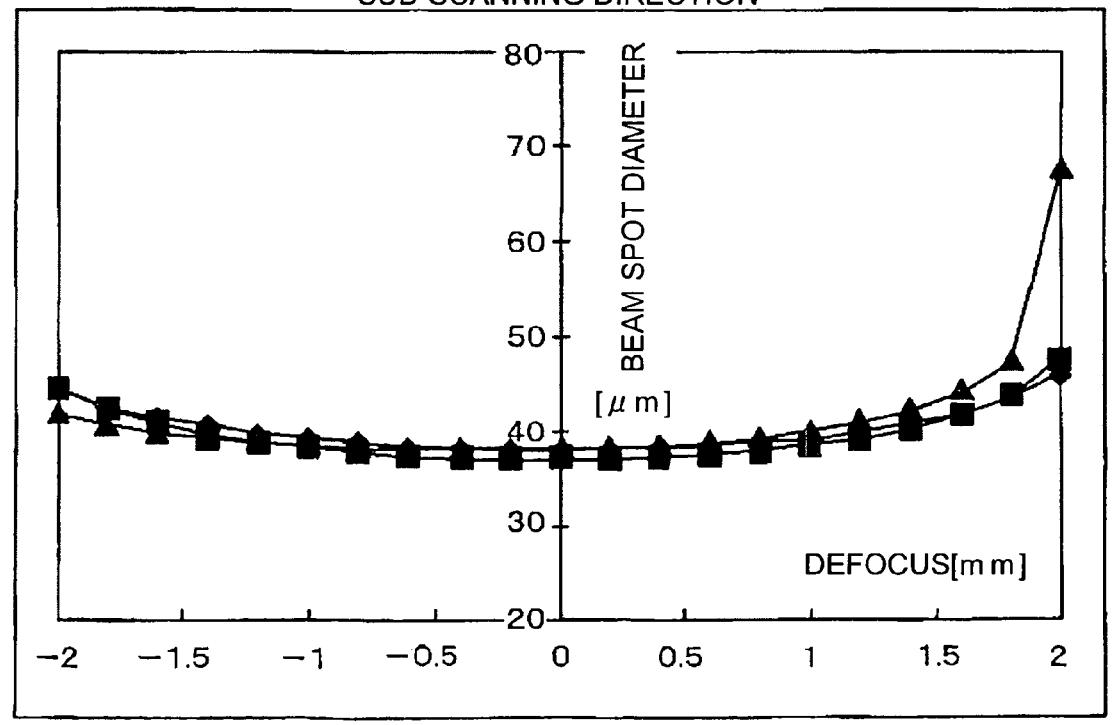

FIG. 9A and FIG. 9B are drawings illustrating the relation between the beam spot diameter in the main scanning and sub-scanning directions and the when the beam spot position defocuses on the scanning surface in the optical scanning device according to the fourth working example.

The conditions under which the relation between the two are plotted are, at the standard temperature of 25° C. ("Normal temperature"), when there is a temperature rise of 20° C. ("temperature variation"), and when there is a variation of 0.8 nm in the emission wavelength due to mode hopping ("wavelength jump").

FIG. 9A pertains to the beam spot diameter in the main scanning direction and FIG. 9B pertains to the beam spot diameter in the sub-scanning direction. In both the cases the target position of the beam spot is 0. As is evident from FIGS. 9A and 9B, in the optical scanning device according to the fourth working example, there is virtually no change in the relation between the beam spot diameter and the defocus amount in either the main scanning direction or the sub-scanning direction under all the three conditions, namely, under normal temperature, when there is a temperature variation, and when there is a wavelength jump. This indicates that irrespective of the temperature variation and mode hopping, there is practically no change in the beam waist position in either the main scanning direction or the sub-scanning direction.

Incidentally, in the fourth working example, the ratios Pcm/Pm and Pcs/Ps, which satisfy Conditions (1) and (2), are as follows:

*Pcm/Pm*=9.2 and *Pcs/Ps*=1.1 where, Pm is the power of the power diffractive surface in the main scanning direction, Ps is the power of the power diffractive surface in the sub-scanning direction, Pcm is the power of the coupling lens in the main scanning direction, and Pcs is the power of the coupling lens in the sub-scanning direction. Further, Pm is the power of the diffraction unit on the power diffractive surface (concentric circular power diffractive surface) at the incident end in the main scanning direction, and Ps is the combined power of the diffraction unit of the power diffractive surface provided on the incident surface in the sub-scanning direction and the diffraction unit of the power diffractive surface provided on the exit surface in the sub-scanning direction.

In other words, in the optical scanning device according to the fourth working example, the light beam emitted from the semiconductor laser device 201 is converted to a beam of desired beam pattern by the coupling lens 202. The beam then passes through the anamorphic optical element 204, which guides the beam to the optical deflector 205. The beam deflected by the optical deflector 205 is converged on the scanning surface 208 by a scanning optical system 206 to form a laser spot and scan the scanning surface 208. The scanning optical system 206 includes the resin lenses 206-1 and 206-2. One surface of the anamorphic optical element 204, which is a resin lens, is of rotationally symmetrical shape bearing thereon a concentric circular power diffractive surface and the other surface bears thereon a power diffractive surface parallel to the main scanning direction and that converges the beam only in the sub-scanning direction. The power of the power diffractive surfaces are set so that the variation in the beam waist position arising due to mode hopping or temperature variation in the semiconductor laser device 201 is substantially 0.

One surface of the anamorphic optical element 204 is a spherical surface bearing the concentric circular power diffractive surface thereon, while the other surface is a cylindrical surface bearing a linear power diffractive surface thereon. The power of the concentric circular power diffractive surface and the power of the spherical surface bearing the power diffractive surface cancel each other out at standard wavelength. Consequently, the anamorphic optical element 204 does not have any power in the main scanning direction and has a positive power in the sub-scanning direction at standard wavelength. The coupling lens 202 is made of glass.

A comparative example is presented next.

"Comparative Example"

In the comparative example, the opening diameter of the aperture 203 of the fourth working example is changed in the main scanning direction to 7.85 mm and in the sub-scanning direction to 3 mm, and a cylindrical anamorphic optical element 204 made of glass 2 having the specifications shown in Table 3 is used. To make the conditions identical to the fourth working example, the positional relation between the cylindrical lens and the optical deflector is changed. The positions of the optical elements are the same as in the fourth working example.

Table 10, similar to Table 4, lists the data pertaining to the optical elements from the light source to the optical deflector of the comparative example.

TABLE 10

| | $R_m$ | $R_s$ | L | n |
|---|---|---|---|---|
| Light source | — | — | 55.74 | — |
| Aperture | — | — | 36.8 | — |
| Cylindrical lens | 8 | 64.5 | 3 | Glass 2 |
| | 8 | 8 | — | — |
| Optical deflector (rotation axis) | — | — | — | — |

Figure 10A:
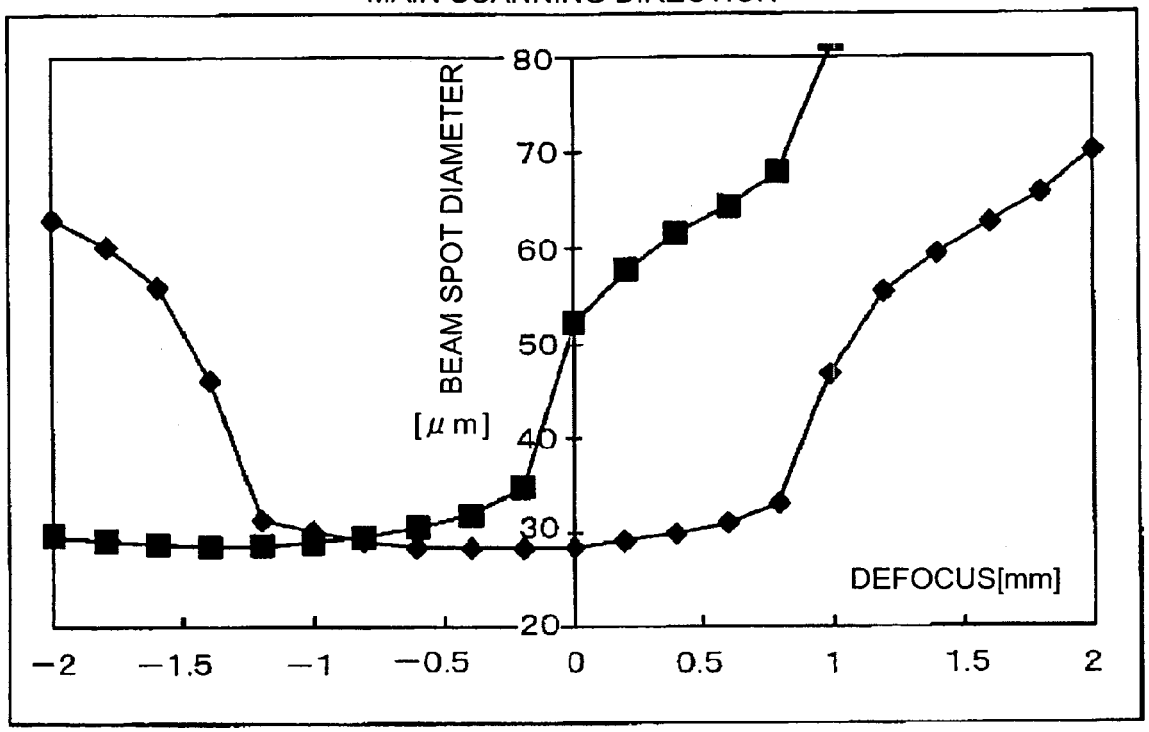
FIG. 10A and FIG. 10B depth characteristic of a comparative example devoid of a power diffractive surface.
Figure 10B:
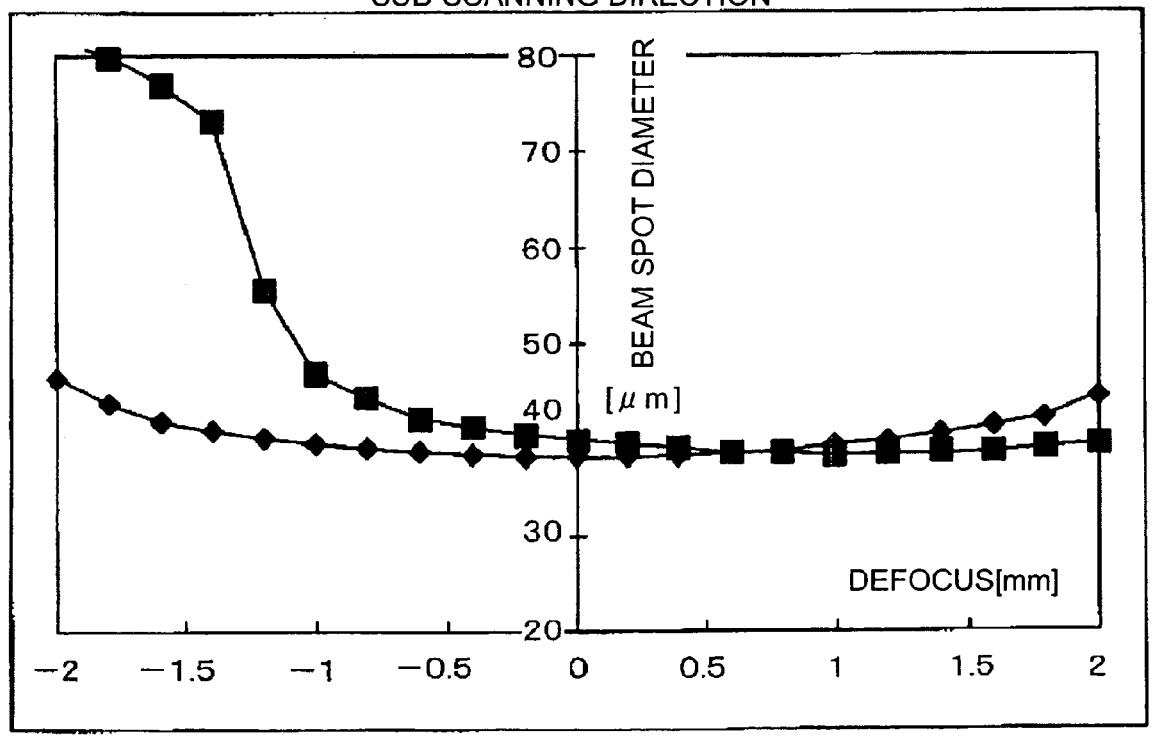

FIG. 10A and FIG. 10B, like FIG. 9A and FIG. 9B, are drawings illustrating the relation between the beam spot diameter in the main scanning and sub-scanning directions and the when the beam spot position defocuses on the scanning surface in the optical scanning device according to the comparative example. The conditions under which the relation between the two are plotted are, at the standard temperature of 25° C. ("Normal temperature"), and when there is a temperature rise of 20° C. ("temperature variation").

As is evident from FIG. 10A and FIG. 10B, as no power diffractive surfaces are present in the comparative example, the beam waist position varies substantially in both main scanning direction (FIG. 10A) and sub-scanning direction (FIG. 10B) when there the temperature goes up, thus necessitating drastic steps for preventing beam waist position variation to obtain high-resolution images.

Figure 11:
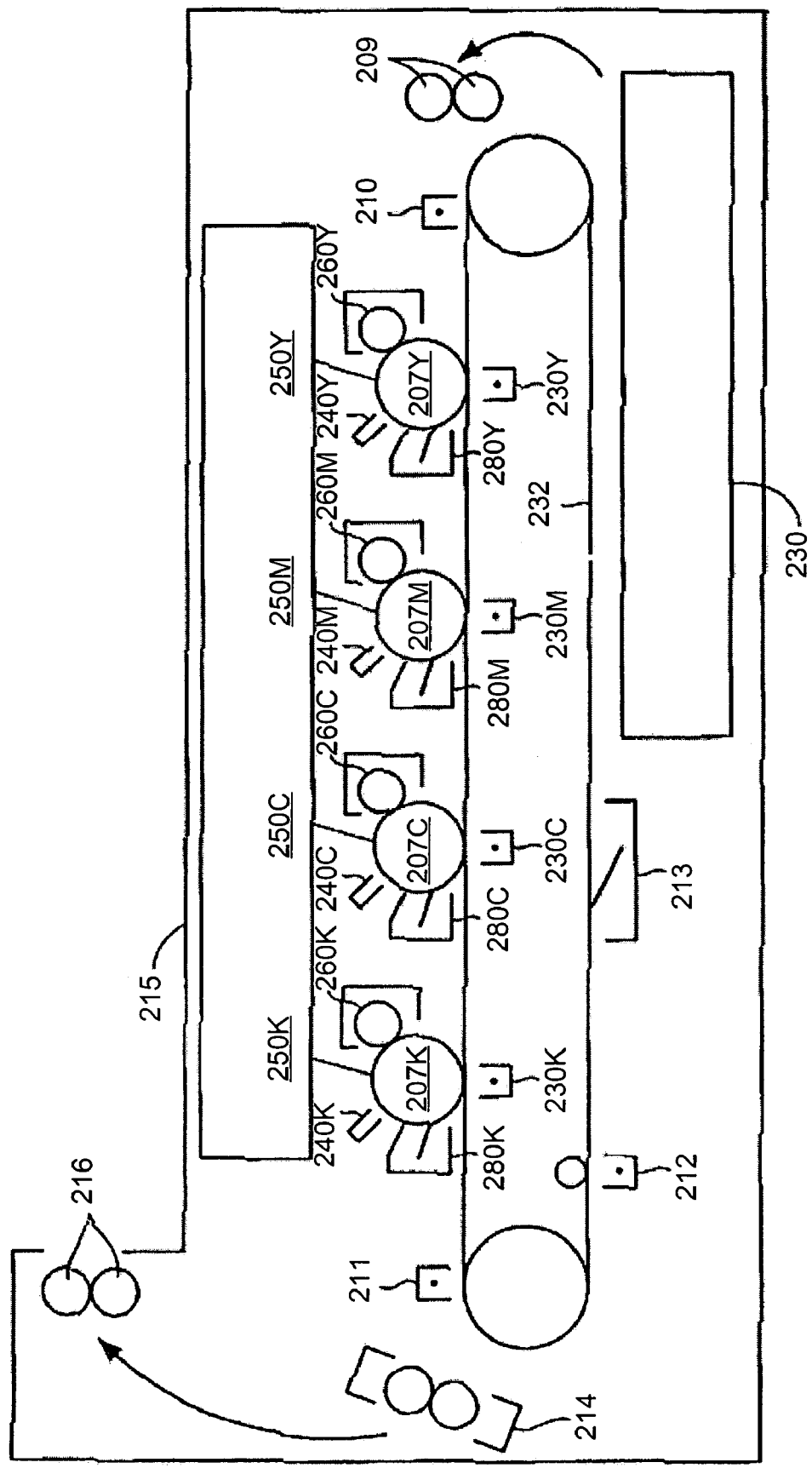
FIG. 11 is a schematic of another image forming apparatus.

FIG. 11 is a schematic diagram of the image forming apparatus according to one embodiment of the present invention.

The image forming apparatus in question is a tandem-type full color laser printer.

A paper feeding cassette 230 and a transfer belt 232 that carries a not shown transfer sheet fed by the paper feeding cassette 230 are disposed horizontally at the bottom of the image forming apparatus. Four photosensitive members for the four colors yellow Y, magenta M, cyan C, and black K, namely, 207Y, 207M, 207C, and 207K are arranged in that order from the upstream end, above the transfer belt 232 at equal spacing between them. In the description hereinafter, the reference symbols Y, M, C, and K will denote the colors yellow, magenta, cyan, and black, respectively.

All the photosensitive members 207Y, 207M, 207C, and 207K are of the same diameter. Around each of the photosensitive members 207Y, 207M, 207C, and 207K are arranged digital image processing members according to the sequence in which image processing occurs. For example, around the photosensitive member 207Y are sequentially arranged an electric charger 240Y, an optical scanning device 250Y, a developing device 260Y, a transfer charger 230Y, a cleaning device 280Y, etc. The other photosensitive members 207M, 207C, and 207K, also have a similar set up around them.

In other words, the image forming apparatus according to the present embodiment has four optical scanning devices 250Y, 250M, 250C, and 250K, one each for each photosensitive member 207Y, 207M, 207C, and 207K, which form the scanning surfaces for each of the colors, yellow, magenta, cyan, and black.

A separate optical scanning device having the configuration of the optical elements as shown in FIG. 7 may be provided one apiece for each photosensitive member. Alternatively, as disclosed in Japanese Patent Laid-Open Publication No. 2004-280056, a optical deflector (rotary polygonal mirror) shared by all the photosensitive members 207Y, 207M, 207C, and 207K, and one lens 206-1 of the scanning optical system shared by two photosensitive members 207M and 207Y, and another lens 206-1 shared by the other two photosensitive members 207K and 207C.

Around the transfer belt 232 are arranged a pair of resist rollers 209 upstream of the photosensitive member 207Y, a belt separating charger 211 downstream of the photosensitive member 207K, quenching charger 212, a belt cleaning device 213, etc. Further downstream of the belt separating charger 211 is disposed a fixing device 214 which is oriented towards an ejection tray 215 and is connected to a pair of ejection rollers 216.

In the image forming apparatus having the structure described above, in full-color mode, each of the optical scanning devices 250Y, 250M, 250C, and 250K carries out optical scanning based on the image signal of each color Y, M, C, and K and forms an electrostatic latent image on each of the photosensitive members 207Y, 207M, 207C, and 207K. These electrostatic latent images are developed by the toners of the respective colors and converted to toner images. The toner images electrostatically adhere to the transfer belt 232 and are sequentially transferred to superposed on the transfer sheet. The superposed toner image on the transfer sheet is fixed by the fixing device 214 to form a full color image. The transfer sheet bearing the full color image is ejected to the ejection tray 215.

By using the optical scanning device according to the fourth working example in the image forming apparatus according to the present embodiment, always a steady beam spot diameter can be ensured. Thus, a compact and cost-effective image forming apparatus can be realized that produces high-resolution images.

In the optical scanning device according to another embodiment of the present invention, the light beam from the semiconductor laser device is shaped to a desired beam pattern by the coupling lens and is guided to the optical deflector through the anamorphic optical element. The beam deflected by the optical deflector is converged on the scanning surface by the scanning optical system to form a laser spot and scan the scanning surface. The optical scanning device according to another embodiment has the following features.

In other words, the scanning optical system includes more than one resin lens.

One surface of the anamorphic optical element, which is a resin lens, is an anamorphic refractive surface and the other surface has an elliptical shape bearing a power diffractive surface thereon with the axis in the main scanning direction.

The power of the power diffractive surface is set such that the beam waist position shift due to mode hopping or temperature variation or both in the semiconductor laser device is kept substantially zero in the main scanning direction or in the sub-scanning direction or in both directions. "Power diffractive surface" refers to a surface having a diffractive function equal to the lens action.

The axis of the elliptical shape of the power diffractive surface is parallel to the main scanning direction. Therefore, the other axis of the elliptical shape of the power diffractive surface is parallel to the sub-scanning direction. Thus, if the axis parallel to the main scanning direction is the long axis, the axis parallel to the sub-scanning direction would be the short axis and vice versa.

The coupling lens converts the light beam emitted from the semiconductor laser device to a beam having desired beam pattern. "Desired beam pattern" refers to "parallel beam", "mildly divergent beam", or "mildly convergent beam". The optical element disposed more towards the image side than the coupling lens can be adjusted according to the beam emerging from the coupling lens.

The laser spot formed on the scanning surface by the optical scanning device is an image of the light source, that is, the emitter of the semiconductor laser device. However, the power of the optical elements disposed between the light source and the scanning surface differ in the main scanning direction and the sub-scanning direction, it is necessary to take into account the fact that the beam waist positions in the main scanning direction and the sub-scanning direction will be different.

The anamorphic optical element (anamorphic resin lens) of the optical scanning device according the present embodiment can possess a positive power only in sub-scanning direction and no power in the main scanning direction. When this is the case, it is preferable to set the coupling action of the coupling lens as "collimating action". By rendering the anamorphic optical element devoid of power in the main scanning direction, the variation in the beam waist position in the sub-scanning direction caused by processing error or imposing error that may occur when initially imposing the optical system can be adjusted without affecting the optical characteristics in the main scanning direction by shifting the anamorphic optical element in the direction of the optical axis.

It is preferable that the refractive surface of the anamorphic optical element in the optical scanning device should be such that the absolute value of the curvature radius in the main scanning direction should be greater than in the sub-scanning direction.

Further, the power diffractive surface of the anamorphic optical element in the optical scanning device is an elliptical surface formed on a plane surface. Though the power diffractive surface may be formed on other surfaces such as spherical surface, cylindrical surface, toric surface, etc., it is preferable that the power diffractive surface be formed on a plane surface.

It is preferable that the coupling lens be made of glass. The glass lens is not easily affected by environmental variation, making it easy to design other optical elements.

In the optical scanning device according to the present invention, a single beam scanning method may be adopted by using an ordinary semiconductor laser device, or the widely known multi-beam scanning method may be adopted by using a semiconductor laser array or by combining the light beams from two or more semiconductor laser devices.

The image forming apparatus according to the present invention forms a latent image by optically scanning the photosensitive image bearing member by means of an optical scanning unit and includes more than one image forming unit that converts the latent image into a visible image by a developer. More than one optical scanning device is used as the optical scanner in the image forming apparatus according to the present invention.

The image forming apparatus can be constructed with a single image forming unit to produce monochromic images, or with two or more image forming units to produce two-tone images, multi-tone, and full color images. A separate optical scanning device may be provided for each image forming unit. Alternatively, as disclosed in Japanese Patent Laid-Open Publication No. 2004-280056, some of the optical elements, for instance, optical deflectors, or a part of the scanning optical system, may be shared by a plurality of image forming units.

In the case of multiple image forming units, the image forming units may be set at different locations with respect to a single image bearing member. Alternatively, in a tandem-type color image forming apparatus, each of the image bearing members arranged antero-posteriorly has a separate image forming unit.

The variation in the beam waist position due to variation in the environment and wavelength is briefly discussed next, given that resin lenses are included in the optical system of the optical scanning device.

The possible reasons for the variation in the beam waist position due to temperature variation are "variation of the refractive index itself of the resin lens", "variation of the shape of the resin lens", and "variation in the refractive index of the resin lens (color aberration) due to the variation in the emission wavelength of the semiconductor laser device".

The refractive index of the resin lens decreases due to the decrease in the density caused by the expansion of the resin lens accompanying the temperature rise. The shape of the resin lens changes with the rise in temperature, the surface curvature reducing due to the expansion of the resin lens accompanying the temperature rise. The emission wavelength of the semiconductor laser device tends to get longer with the temperature rise, causing the refractive index of the resin lens to drop.

In other words, irrespective of whether the resin lens is a positive lens or a negative lens, the absolute value of the lens power against the light beam from the semiconductor laser device decreases with the rise in temperature.

As the diffraction angle is proportional to the wavelength, the absolute value of the power due to the diffracting unit of the power diffractive surface tends to increase with the wavelength, irrespective of whether the diffracting unit is positive or negative.

Accordingly, if the combined power of the resin lenses in the optical system of the optical scanning device is positive (or negative), the change in the power of the resin lens due to temperature variation and the change in the power in the diffraction unit of the power diffractive surface can be canceled out by making the power of the diffraction unit positive (or negative).

To give a specific example, if we assume the power of both the resin lenses in the optical system and the diffraction unit of the power diffractive surface to be positive, and the environmental temperature to be rising, then, $$A>0, B>0, C>0, \text{ and } D<0$$

where, A is the beam waist position shift amount due to variation in the refractive index of the resin lens, B is the beam waist position shift amount due to change in the shape of the resin lens, C is the beam waist position shift amount due to the variation in the refractive index of the resin lens due to the variation in the emission wavelength of the semiconductor laser device, and D is the beam waist position shift amount due to the change in the power of the diffraction unit of the power diffractive surface due to the variation in the emission wavelength of the semiconductor laser device (The variation in the distance in the direction away from the optical deflector is taken as positive).

The total beam waist position shift amount accompanying the temperature variation is A+B+C−D. Since A, B, and C can be made constant by using an optical system having resin lenses, the variation in the beam waist position can be corrected favorably by setting the power of the diffraction unit of the power diffractive surface to satisfy the condition, A+B+C−D=0.

Other than temperature variation, mode hopping also causes the emission wavelength to vary. Since wavelength variation due to mode hopping is a microscopic physical phenomenon, it is extremely difficult to predict.

If emission wavelength variation due to mode hopping occurs irrespective of the variation in the temperature, and if the emission wavelength variation due to mode hopping occurs when there is no change in the standard temperature, then, in the aforementioned Conditions A and B would be 0. However, D, which in this case is the beam waist position shift amount due to mode hopping, becomes excessive, making the total beam waist position shift amount, C−D, less than zero. Thus, the beam position in this case changes significantly and is difficult to correct.

Thus, in an optical scanning device that employs power diffractive surfaces, it is important to correct not only the beam waist position variation due to temperature variation but also the beam waist position variation due to mode hopping to always obtain a steady beam spot diameter.

To decrease the variation in the beam waist position due to the variation in the emission wavelength resulting from mode hopping, it is necessary to set power of the diffraction unit of the power diffractive surface appropriately. Assigning a substantial power to the diffraction unit of the power diffractive surface will result in an increased variation beam waist position.

Thus, in the optical scanning device according to the present invention, the power of the diffraction unit of the power diffractive surface is set so that the beam waist position shift in the main scanning direction or the sub-scanning direction or both main scanning and sub-scanning directions, caused by mode hopping or temperature variation in the semiconductor laser device is substantially zero.

It is preferable that the power of the diffraction unit of the power diffractive surface Pm (in the main scanning direction) and Ps (in the sub-scanning direction) and the power of the coupling lens Pcm (in the main scanning direction) and Pcs (in the sub-scanning direction) have the following relation.

$$4 < Pcm/Pm < 26 \quad (1)$$

$$0.5 < Pcs/Ps < 26 \quad (2)$$

If the parameter Pcm/Pm of Condition (1) is plotted on the horizontal axis and the beam waist position shift amount in the main scanning direction due to mode hop-induced emission wavelength variation is plotted on the vertical axis, it can be observed that the beam waist position shift amount increases linearly with the parameter Pcm/Pm.

It is preferable to keep the beam waist position shift amount in the main scanning direction due to mode hop-induced emission wavelength variation to 0.5 mm or less. In the linear relation between Pcm/Pm and the beam waist position shift amount, the value of the parameter Pcm/Pm corresponding to the beam waist position shift amount in main scanning direction due to mode hop-induced emission wavelength variation 0.5 is 26. Accordingly, the upper limit of the parameter is set as 26 in Condition (1).

If the parameter Pcm/Pm of condition (1) is plotted on the horizontal axis and the beam waist position shift amount in the main scanning direction due to temperature variation is plotted on the vertical axis, it can be observed that the beam waist position shift amount decreases linearly with the parameter Pcm/Pm.

It is preferable to also keep the beam waist position shift amount in the main scanning direction due to temperature variation to 0.5 mm or less. In the linear relation between Pcm/Pm and the beam waist position shift amount, the value of the parameter Pcm/Pm corresponding to the beam waist position shift amount in main scanning direction due to temperature variation 0.5 is 4. Accordingly, the lower limit of the parameter is set as 4 in Condition (1).

Similarly, if the parameter Pcs/Ps of Condition (2) is plotted on the horizontal axis and the beam waist position shift amount in the sub-scanning direction due to mode hop-induced emission wavelength variation is plotted on the vertical axis, it can be observed that the beam waist position shift amount increases linearly with the parameter Pcs/Ps.

It is preferable to keep the beam waist position shift amount in the sub-scanning direction due to mode hop-induced emission wavelength variation to 0.5 mm or less. In the linear relation between Pcs/Ps and the beam waist position shift amount, the value of the parameter Pcs/Ps corresponding to the beam waist position shift amount in the sub-scanning direction due to mode hop-induced emission wavelength variation 0.5 is 26. Accordingly, the upper limit of the parameter is set as 26 in Condition (2).

If the parameter Pcs/Ps of condition (2) is plotted on the horizontal axis and the beam waist position shift amount in the sub-scanning direction due to temperature variation is plotted on the vertical axis, it can be observed that the beam waist position shift amount decreases linearly with the parameter Pcs/Ps.

It is preferable to also keep the beam waist position shift amount in the sub-scanning direction due to temperature variation to 0.5 mm or less. In the linear relation between Pcs/Ps and the beam waist position shift amount, the value of the parameter Pcs/Ps corresponding to the beam waist position shift amount in sub-scanning direction due to temperature variation 0.5 is 0.5. Accordingly, the lower limit of the parameter is set as 0.5 in Condition (2).

Thus, in the optical scanning device according to the present invention, the power of the power diffractive surface is set so that the beam waist position shift in the main scanning direction or the sub-scanning direction or both main scanning and sub-scanning directions, caused by mode hopping and temperature variation in the semiconductor laser device is substantially zero. Thus by efficiently correcting the beam waist position shift arising not only from temperature variation but also emission wavelength variation due to mode hopping, it can be ensured that the beam spot diameter is always steady when optical scanning is carried out. Thus, by using this optical scanning device in the image forming apparatus according to the present invention, stable image forming can be ensured.

Exemplary embodiments of the present invention are explained next with reference to the accompanying drawings.

Figure 12:
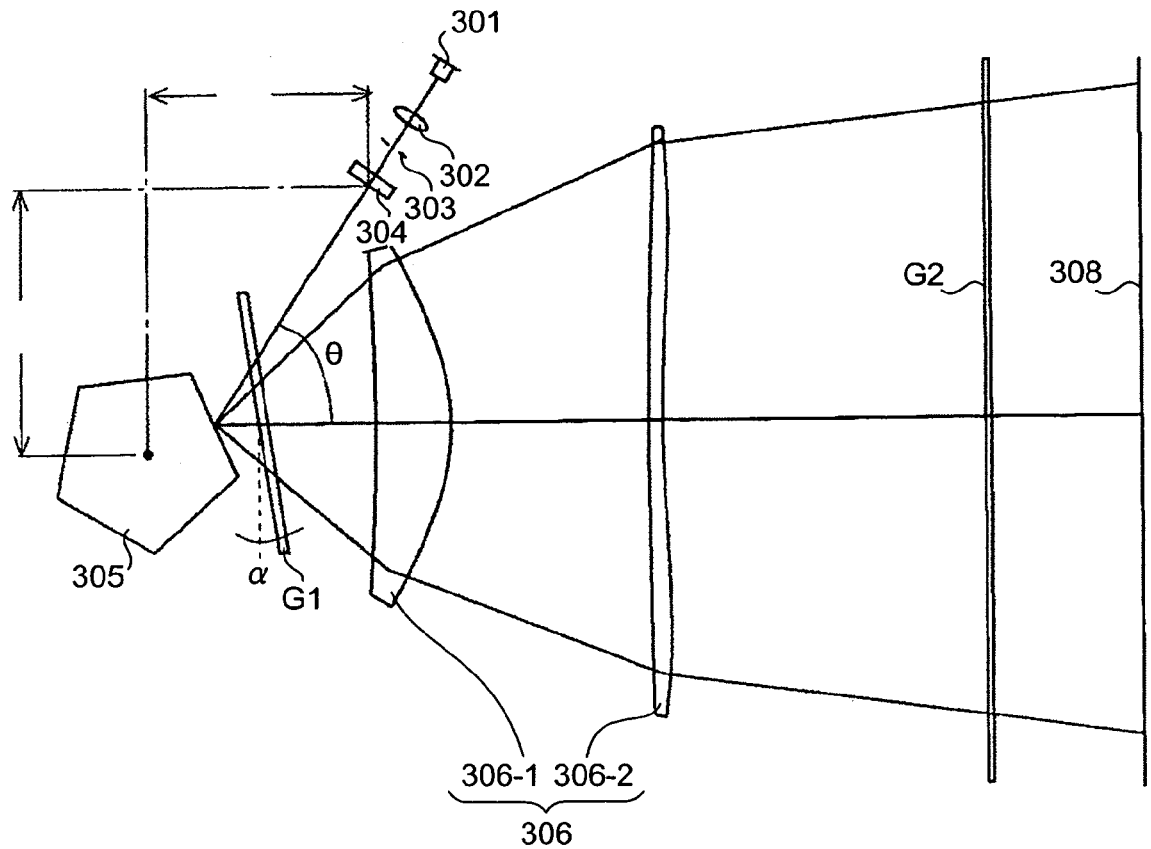
FIG. 12 is a schematic of another optical scanning device.

FIG. 12 is a drawing illustrating an optical arrangement according to one embodiment of the optical scanning device.

In FIG. 12, the reference numeral 301 denotes a semiconductor laser device functioning as a light source. The reference numeral 302 denotes a coupling lens. The reference numeral 303 denotes an aperture. The reference numeral 304 denotes an anamorphic optical element. The reference numeral 305 denotes a polygonal mirror which is a rotary polygonal mirror functioning as an optical deflector. The reference numeral 306 denotes a scanning optical element. The reference numeral 308 denotes a scanning surface. The reference symbol 30G1 denotes a soundproof glass that closes a window of a not shown soundproof housing in which the polygonal mirror 305 is housed. The reference symbol 30G2 denotes a dustproof glass provided at the deflected light beam exit of the housing in which the optical system is housed.

A divergent light beam emitted from the light source 301 passes through the coupling lens 302 and emerges as a substantially parallel beam. The emerging beam passes through the aperture 303, which carries out beam-shaping. The beam then enters the anamorphic optical element 304. The beam emerging from the anamorphic optical element 304 converges in the sub-scanning direction, passes through the soundproof glass 30G1 to emerge as a parallel beam in the main scanning direction and converges near the deflective surface of the polygonal mirror 305 as "a long line in the main scanning direction". The beam deflected from the polygonal mirror 305 passes through the soundproof glass 30G1 to become incident on the scanning optical system 306.

The scanning optical system 306 includes two lenses 306-1 and 306-2. The light beam emerging from the lenses 306-1 and 306-2 passes through the dustproof glass 30G2 and enters the scanning surface 308 and forms a beam spot on the scanning surface 308 due to the action of the scanning optical system 306.

The polygonal mirror 305 turns at a constant speed and the beam deflected by the deflective surface is deflected at isometric speed. The scanning optical system 306 includes an fθ feature that shifts the beam spot produced by the beam deflected at isometric speed in the sub-scanning direction (in the vertical direction in FIG. 12) at a constant speed. The beam spot thus scans the scanning surface 308 at a constant speed.

The scanning optical system 306 is also anamorphic. By geometric optically conjugating the position of the deflective surface of the polygonal mirror 305 and the position of the scanning surface 308, the slant of the polygonal mirror 305 is corrected. The scanning surface 308 is in actuality the surface of a photosensitive medium.

One surface of the anamorphic optical element 304, which is a resin lens, is an anamorphic refractive surface and the other surface bears thereon an elliptical power diffractive surface having an axis in the main scanning direction.

Figure 13:
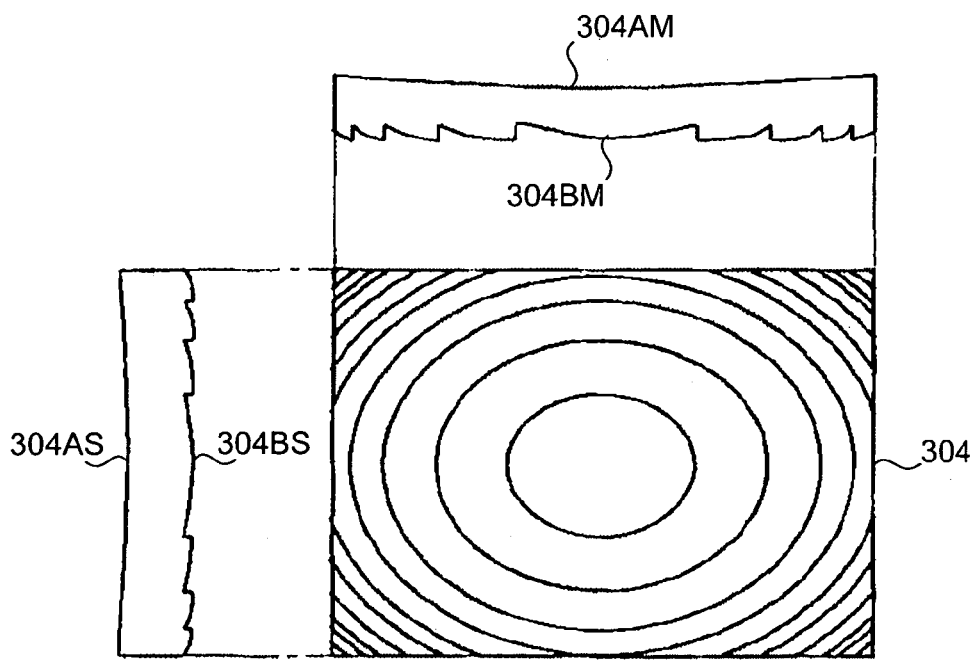
FIG. 13 is a schematic of another anamorphic optical element.

FIG. 13 is a drawing illustrating the anamorphic optical element 304. The horizontal direction in FIG. 13 represents the main scanning direction and the vertical direction represents the sub-scanning direction. The reference numeral 304 denotes the anamorphic optical element as viewed from the optical axis direction. When viewed from the optical axis direction, one surface of the anamorphic optical element 304 has a power diffractive surface consisting of elliptical grooves.

The drawing appearing above the anamorphic optical element 304 in FIG. 13 is that of the end face of an imaginary cross-sectional end face parallel to the main scanning direction and the optical axis direction. The drawing appearing to the left of the anamorphic optical element 304 in FIG. 13 is that of the end face of an imaginary cross-sectional end face parallel to the sub-scanning direction and the optical axis direction. In both the drawings, the end face opposite to the end face bearing the power diffractive surface is an anamorphic refractive surface.

The widths of the gratings in the cross section of the power diffractive surface in the main scanning direction (upper drawing in FIG. 13) 304BM and the cross section of the power diffractive surface in the sub-scanning direction (drawing on the left hand side in FIG. 13) 304BS differ. Consequently, the power diffractive surface itself possesses the effect of the anamorphic lens, that is, different power in the main scanning and the sub-scanning directions.

Further, as shown in FIG. 13, the curvature radius of the anamorphic refractive surface end face in the main scanning direction 304AM and in the sub-scanning direction 304AS also differ. In all the embodiments of the present invention, the anamorphic refractive surface of the anamorphic optical element 304 has a negative power and the power diffractive surface has a positive power.

Therefore, the light beam (parallel light beam) entering the anamorphic optical element 304 from the light source end is converted to a divergent beam in both main scanning and sub-scanning directions, and subsequently is acted upon by the power of the power diffractive surface. As the long axis of the power diffractive surface is along the main scanning direction, the power diffractive surface has a greater positive power of in the sub-scanning direction than in the main-scanning direction.

The positive power of the power diffractive surface in the sub-scanning direction cancels the divergence imparted on the light beam in the main scanning direction by the anamorphic refractive surface and makes the light beam parallel in the main scanning direction. The positive power of the power diffractive surface in the sub-scanning direction exceeds the divergence imparted on the light beam in the sub-scanning direction by the anamorphic refractive surface, and makes the light beam convergent in the sub-scanning direction.

Thus, the light beam enter the anamorphic optical element 304 emerges as a parallel beam in the main scanning direction and a convergent beam in the sub-scanning direction.

The power of the power diffractive surfaces in the main scanning direction and the sub-scanning direction is set such that the beam waist position variation due to mode hopping or temperature variation or both in the semiconductor laser device is kept substantially zero in the main scanning direction or in the sub-scanning direction or in both directions.

Fifth Working Example

A fifth working example pertaining to the embodiment described above is explained next.

Table 11 lists the data pertaining to the glass materials (referred to as glass 1 and glass 302) and the resin material (referred to as resin) used in the fifth working example and the working examples subsequent to it.

TABLE 11

|  | Center value | Wavelength jump | Temperature variation | Coefficient of linear expansion |
|---|---|---|---|---|
| Glass 1 | 1.68963 | 1.68959 | 1.68953 | $7.5 \times 10^{-6}$ |
| Glass 2 | 1.51437 | 1.51434 | 1.51429 | $7.5 \times 10^{-6}$ |
| Resin | 1.52726 | 1.52723 | 1.52537 | $7.0 \times 10^{-5}$ |

In Table 11, "center value" refers to the refractive index corresponding to an operating wavelength (standard wavelength) at 25° C., "wavelength jump" refers to the refractive index when there is a wavelength jump due to mode hopping, and "temperature variation" refers to the refractive index when the temperature goes up by 20° C. from the standard temperature. A wavelength jump of about 0.8 nm due to mode hopping is assumed.

The elements of the optical system are as follows:

"Light Source"

The semiconductor laser device 301 that functions as the light source has a standard emission wavelength, which is the wavelength set at the time of designing, of 655 nm, increasing by 0.2 nm with every 1° C. rise of temperature from the standard temperature of 25° C. A wavelength variation of 0.8 nm due to mode hopping is assumed.

The coupling lens 302 is a glass lens made of glass 1. The coupling lens 302 is placed such that the forward principal point is at a distance of 27 mm from the emitter of the semiconductor laser device 301 so that the collimation takes place at a focal distance of 27 mm. The coupling lens 302 includes an aspherical surface, which adequately corrects the wavefront aberration of the collimated light beam.

The semiconductor laser device 301 and the coupling lens 202 are fixed to a holding member made of a material with a linear expansion coefficient of $7.0 \times 10^{-5}$.

"Aperture"

The aperture 303 is a rectangular opening with an opening diameter of 8.1 mm in the main scanning direction and 2.92 mm in the sub-scanning direction, and shapes the light beam collimated by the coupling lens 302.

"Anamorphic Optical Element"

The incident surface of the anamorphic optical element 304 is a diffractive surface and is an arc-shaped normal toroidal surface in both main scanning and sub-scanning directions. The exit surface of the anamorphic optical element 304 is a plane surface that has formed thereon an elliptical power diffractive surface.

The secondary phase function of the power diffractive surface in both the main scanning and sub-scanning directions is represented by the expression as follows:

$$W = Cy \cdot Y^2 + Cz \cdot Z^2$$

where, Y denotes a coordinate in the main scanning direction and Z denotes a coordinate in the sub-scanning direction (the origin point of both Y and Z being the optical axis position). The coefficients Cy and Cz are given blow.

$$Cy = -1.06506 \times 10^{-3} \text{ and } Cz = -9.02664 \times 10^{-3}$$

"Optical Deflector"

The polygonal mirror 305 that functions as the optical deflector has five reflective surfaces with an incircle radius of 18 mm. The distance between the exit surface (the surface bearing the power diffractive surface) of the anamorphic optical element 304 and the optical axis of the polygonal mirror 305, represented by a "horizontal distance x" and a "vertical distance y" in FIG. 12, are 82.97 mm and 112.77 mm, respectively.

The soundproof glass 30G1 is made of glass 1 and has a thickness of 1.9 mm and a tilt angle α from y direction (vertical direction in FIG. 12) of 16°.

The angle θ formed between the direction of the light beam propagation from the light source and direction of propagation of the light beam deflected towards the target position 0 on the scanning surface 308 is 58°. Table 12 lists the data pertaining to all the elements constituting the optical system, from the light source to the optical deflector.

TABLE 12

|  | Rm | Rs | D, x, y | Material |
|---|---|---|---|---|
| Light source | — | — | 55.74 | — |
| Aperture | — | — | 34.71 | — |
| Anamorphic optical element | −246.5 | −52.16 | 3 | Resin |
| optical deflector (Rotation axis) | — | — | x = 82.97<br>y = 112.77 | — |

In Table 12, Rm represents curvature radius in the main scanning direction, Rs represents curvature radius in the sub-scanning direction, and D represents the distance between surfaces. The unit is millimeter.

Table 13 lists data of optical elements that come after the optical deflector.

TABLE 13

|  | Rm | Rs | Dx | Dy | Material |
|---|---|---|---|---|---|
| Optical deflector (Rotation axis) | — | — | 79.75 | 8.8 | — |
| Len 6-1 | −279.88 | −61.00 | 22.6 | 0 | Resin |
|  | −83.58762 |  | 75.85 | 0 | — |
| Lens 6-2 | 6950 | 110.91 | 4.9 | 0 | Resin |
|  | 765.95 | −68.22 | 158.71 | 0 | — |
| Scanning surface | — | — | — | — | — |

In table 13, Rm represents paraxial curvature in the main scanning direction, Rs represents paraxial curvature in the sub-scanning direction, and Dx and Dy represent relative distance from the origin point of one optical element to the origin point of the next optical element. The unit is millimeter.

For example, the distance Dx in the optical axis direction (x direction, horizontal direction in FIG. 12) from the rotation axis of the optical deflector (polygonal mirror 305) to the origin point of the incident surface of the lens 306-1 of the scanning optical system 306 is 79.75 mm. The distance Dy in the main scanning direction (y direction, vertical direction in FIG. 12) from the rotation axis of the optical deflector (polygonal mirror 305) to the origin point of the incident surface of the lens 306-1 of the scanning optical system 306 is 8.8 mm.

The thickness of the lens 306-1 on the optical axis is 22.6 mm, the distance between the lenses 306-1 and 306-2 is 75.85, the thickness of the lens 306-2 on the optical axis is 4.9 mm, and the distance between the lens 306-2 to the scanning surface 308 is 158.71. As shown in FIG. 12, the dustproof glass 30G2 of a thickness of 1.9 mm and made of glass 1 is disposed between the lens 206-2 of the scanning optical system 306 and the scanning surface 308.

All the surfaces of the lenses 306-1 and 306-2 of the scanning optical system 306 are aspherical.

The incident surface of the lens 306-1 and the incident and the exit surfaces of the lens 306-2 are acircular arc represented by Expression 1 in the main scanning direction. The curvature in the sub-scanning cross-section (an imaginary cross-section parallel to the optical axis and the sub-scanning direction) varies according to Expression 2 in the main scanning direction.

The exit surface of the lens 206-1 is concentric aspherical represented by Expression 3.

"Aspherical Arc"

"Aspherical arc" shape is represented by the expression as follows:

$$X = (Y^2/Rm)/[1 + \sqrt{1 - (1+Km)(Y/Rm)^2}] + A_1 Y + A_2 Y^2 + A_3 Y^3 + A_4 Y^4 + A_5 Y^5 + \quad (1)$$

where, Rm is the paraxial curvature radius in the main scanning direction, Y is the distance from the optical axis in the main scanning direction, Km is the cone constant, A1, A2, A3, A4, A5, and so on are high-order coefficients, and X is the depth along the optical axis.

"Variation in Curvature in Sub-Scanning Cross-Section"

This is represented by the expression as follows:

$$Cs(Y) = \{1/Rs(0)\} + B_1 Y + B_2 Y^2 + B_3 Y^3 + B_4 Y^4 + \quad (2)$$

where, Y is the sub-scanning direction coordinate with the optical axis position as the origin point, Cs(Y) is the curvature in the sub-scanning cross-section, Rs(0) is the curvature radius in the sub-scanning cross-section including the optical axis, and $B_1$, $B_2$, $B_3$, and so on are coefficients.

"Rotationally Symmetrical Aspherical Surface"

This shape is represented by the expression as follows:

$$X = (H^2/R)/[1 + \sqrt{1 - (1+K)(H/R)_2}] + A_1 Y + A_2 Y^2 + A_3 Y^3 + A_4 Y^4 + A_5 Y^5 + \quad (3)$$

where, R is the paraxial curvature radius, H is the distance from the optical axis, K is the cone constant, $A_1$, $A_2$, $A_3$, $A_4$, $A_5$, and so on, are high-order coefficients, and X is the depth along the optical axis.

Table 14 lists the coefficients of the incident surface (special surface) of the lens 306-1.

TABLE 14

| | Coefficient in main scanning direction | | Coefficient in sub-scanning direction |
|---|---|---|---|
| K | $-2.900 \times 10$ | $B_1$ | $-2.066 \times 10^{-6}$ |
| $A_1$ | 0 | $B_2$ | $5.728 \times 10^{-6}$ |
| $A_2$ | 0 | $B_3$ | $3.152 \times 10^{-8}$ |
| $A_3$ | 0 | $B_4$ | $2.280 \times 10^{-9}$ |
| $A_4$ | $1.756 \times 10^{-7}$ | $B_5$ | $-3.730 \times 10^{-11}$ |
| $A_5$ | 0 | $B_6$ | $-3.283 \times 10^{-12}$ |
| $A_6$ | $-5.492 \times 10^{-11}$ | $B_7$ | $1.766 \times 10^{-14}$ |
| $A_7$ | 0 | $B_8$ | $1.373 \times 10^{-15}$ |
| $A_8$ | $1.088 \times 10^{-14}$ | $B_9$ | $-2.890 \times 10^{-18}$ |
| $A_9$ | 0 | $B_{10}$ | $-1.985 \times 10^{-19}$ |
| $A_{10}$ | $-3.183 \times 10^{-19}$ | $B_{11}$ | 0 |
| $A_{11}$ | 0 | $B_{12}$ | 0 |
| $A_{12}$ | $-2.635 \times 10-24$ | $B_{13}$ | 0 |

Table 15 lists the coefficients of the exit surface (concentric aspherical surface) of the lens 306-1.

TABLE 15

| | Coefficient |
|---|---|
| K | $-0.549$ |
| $A_1$ | 0 |
| $A_2$ | 0 |
| $A_3$ | 0 |
| $A_4$ | $2.748 \times 10^{-7}$ |
| $A_5$ | 0 |
| $A_6$ | $-4.502 \times 10^{-12}$ |
| $A_7$ | 0 |
| $A_8$ | $-7.366 \times 10^{-15}$ |
| $A_9$ | 0 |
| $A_{10}$ | $1.803 \times 10^{-18}$ |
| $A_{11}$ | 0 |
| $A_{12}$ | $2.728 \times 10^{-23}$ |

Table 16 lists the coefficients of the incident surface (special surface) of the lens 306-2.

TABLE 16

| | Coefficient in main scanning direction | | Coefficient in sub-scanning direction |
|---|---|---|---|
| K | 0 | $B_1$ | $-9.594 \times 10^{-7}$ |
| $A_1$ | 0 | $B_2$ | $-2.135 \times 10^{-7}$ |
| $A_2$ | 0 | $B_3$ | $-8.080 \times 10^{-12}$ |
| $A_3$ | 0 | $B_4$ | $2.391 \times 10^{-12}$ |
| $A_4$ | $1.550 \times 10^{-9}$ | $B_5$ | $2.881 \times 10^{-14}$ |
| $A_5$ | 0 | $B_6$ | $3.694 \times 10^{-15}$ |
| $A_6$ | $1.293 \times 10^{-14}$ | $B_7$ | $-3.259 \times 10^{-18}$ |
| $A_7$ | 0 | $B_8$ | $1.814 \times 10^{-20}$ |
| $A_8$ | $-8.811 \times 10^{-18}$ | $B_9$ | $8.722 \times 10^{-23}$ |
| $A_9$ | 0 | $B_{10}$ | $-1.341 \times 10^{-23}$ |
| $A_{10}$ | $-9.182 \times 10^{-22}$ | $B_{11}$ | 0 |

Table 17 lists the coefficients of the exit surface (special surface) of the lens 306-2.

TABLE 17

| | Coefficient in main scanning direction | | Coefficient in sub-scanning direction |
|---|---|---|---|
| K | 5.790 | $B_1$ | 0 |
| $A_1$ | 0 | $B_2$ | $3.644 \times 10^{-7}$ |
| $A_2$ | 0 | $B_3$ | 0 |
| $A_3$ | 0 | $B_4$ | $-4.847 \times 10^{-13}$ |
| $A_4$ | $-1.150 \times 10^{-7}$ | $B_5$ | 0 |
| $A_5$ | 0 | $B_6$ | $-1.666 \times 10^{-16}$ |
| $A_6$ | $1.097 \times 10^{-11}$ | $B_7$ | 0 |

TABLE 17-continued

| | Coefficient in main scanning direction | | Coefficient in sub-scanning direction |
|---|---|---|---|
| $A_7$ | 0 | $B_8$ | $4.535 \times 10^{-19}$ |
| $A_8$ | $-6.542 \times 10^{-16}$ | $B_9$ | 0 |
| $A_9$ | 0 | $B_{10}$ | $-2.819 \times 10^{-23}$ |
| $A_{10}$ | $1.984 \times 10^{-20}$ | $B_{11}$ | 0 |
| $A_{11}$ | 0 | $B_{12}$ | 0 |
| $A_{12}$ | $-2.412 \times 10-25$ | $B_{13}$ | 0 |

Figure 14A:
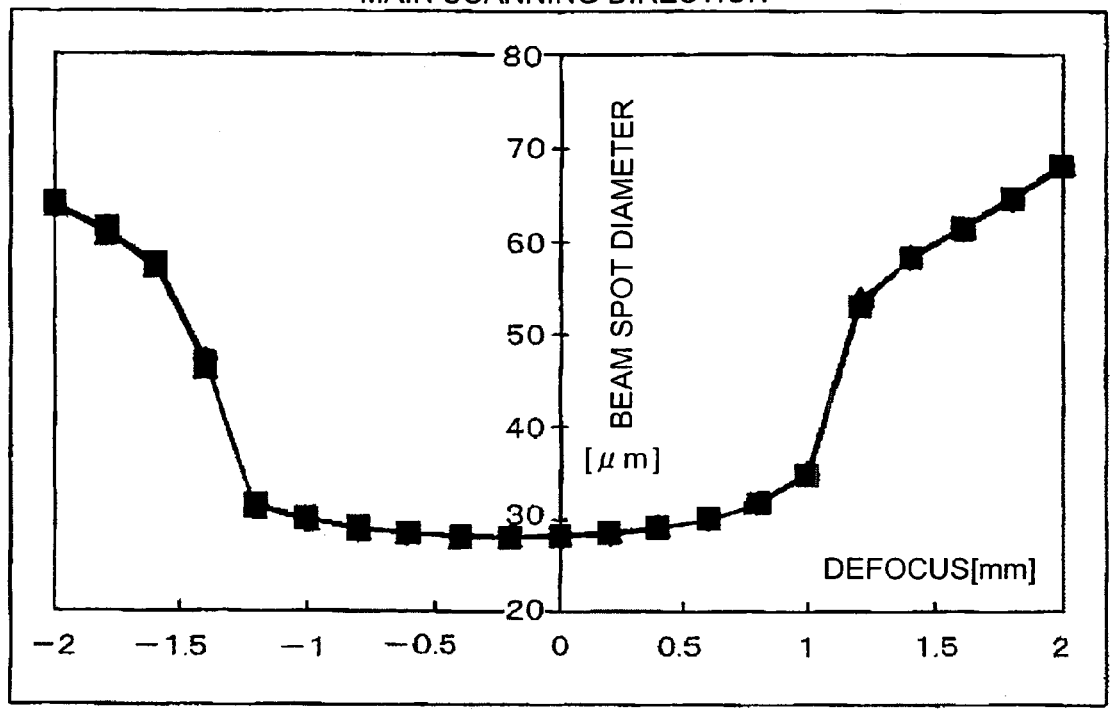
FIG. 14A and FIG. 14B depict depth characteristic of a fifth working example.
Figure 14B:
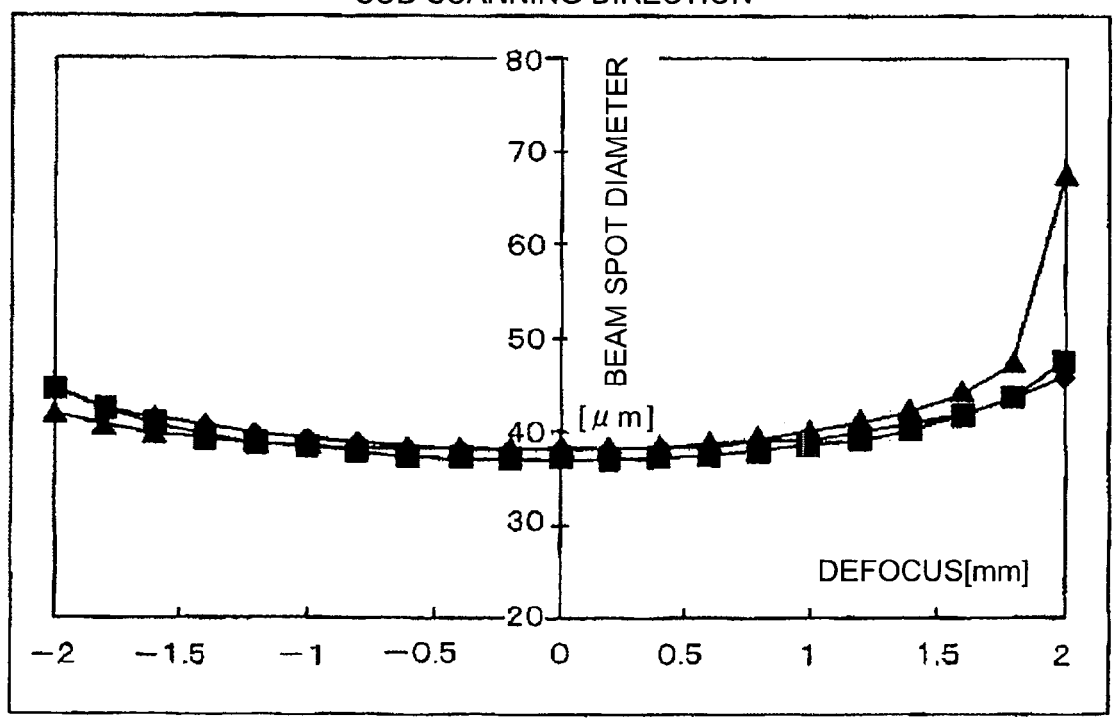

FIG. 14A and FIG. 14B are drawings illustrating the relation between the beam spot diameter in the main scanning and sub-scanning directions and the when the beam spot position defocuses on the scanning surface in the optical scanning device according to the fifth working example. The conditions under which the relation between the two are plotted are, at the standard temperature of 25° C. (Normal temperature), when there is a temperature rise of 20° C. (temperature variation), and when there is a variation of 0.8 nm in the emission wavelength due to mode hopping (wavelength jump).

FIG. 14A pertains to the beam spot diameter in the main scanning direction and FIG. 14B pertains to the beam spot diameter in the sub-scanning direction. In both the cases the target position of the beam spot is 0. As is evident from FIGS. 14A and 14B, in the optical scanning device according to the fifth working example, there is virtually no change in the relation between the beam spot diameter and the defocus amount in either the main scanning direction or the sub-scanning direction under all the three conditions, namely, under normal temperature, when there is a temperature variation, and when there is a wavelength jump. This indicates that irrespective of the temperature variation and mode hopping, there is practically no change in the beam waist position in either the main scanning direction or the sub-scanning direction.

Incidentally, in the fifth working example, the ratios Pcm/Pm and Pcs/Ps, which satisfy Conditions (1) and (2), are as follows:

$Pcm/Pm=9.2$ and $Pcs/Ps=1.1$ where, Pm is the power of the power diffractive surface in the main scanning direction, Ps is the power of the power diffractive surface in the sub-scanning direction, Pcm is the power of the coupling lens in the main scanning direction, and Pcs is the power of the coupling lens in the sub-scanning direction.

In other words, in the optical scanning device according to the fifth working example, the light beam emitted from the semiconductor laser device 301 is converted to a beam of desired beam pattern by the coupling lens 302. The beam then passes through the anamorphic optical element 304, which guides the beam to the optical deflector 305. The beam deflected by the optical deflector 305 is converged on the scanning surface 308 by a scanning optical system 306 to form a laser spot and scan the scanning surface 308. The scanning optical system 306 includes the resin lenses 306-1 and 306-2. One surface of the anamorphic optical element 304, which is a resin lens, is a refractive surface and the other surface bears thereon an elliptical power diffractive surface having an axis in the main scanning direction. The power of the power diffractive surface is set so that the variation in the beam waist position arising due to mode hopping or temperature variation in the semiconductor laser device 301 is substantially 0.

The anamorphic optical element 304 has a positive power in the sub-scanning direction and no power in the main scanning direction. The absolute value of the curvature radius of the refractive surface of the anamorphic optical element 304 is greater in the main scanning direction is greater than in the sub-scanning direction. The elliptical power diffractive surface of the anamorphic optical element 304 is formed on a plane surface. The coupling lens 302 is made of glass.

In the comparative example, the opening diameter of the aperture 303 of the fifth working example is changed in the main scanning direction to 7.85 mm and in the sub-scanning direction to 3 mm, and a cylindrical anamorphic optical element 304 made of glass 2 is used. To make the conditions identical to the fifth working example, the positional relation between the cylindrical lens and the optical deflector is changed. The positions of the optical elements are the same as in the fifth working example.

Table 18, similar to Table 12, lists the data pertaining to the optical elements from the light source to the optical deflector of the comparative example.

TABLE 18

|  | Rm | Rs | D, x, y | Material |
|---|---|---|---|---|
| Light source | — | — | 55.74 | — |
| Aperture | — | — | 36.8 | — |
| Cylindrical lens | ∞ | 64.5 | 3 | Glass 2 |
|  | ∞ | ∞ | — | — |
| Optical deflector (Rotation axis) | — | — | x = 83.34 y = 113.02 | — |

Figure 15A:
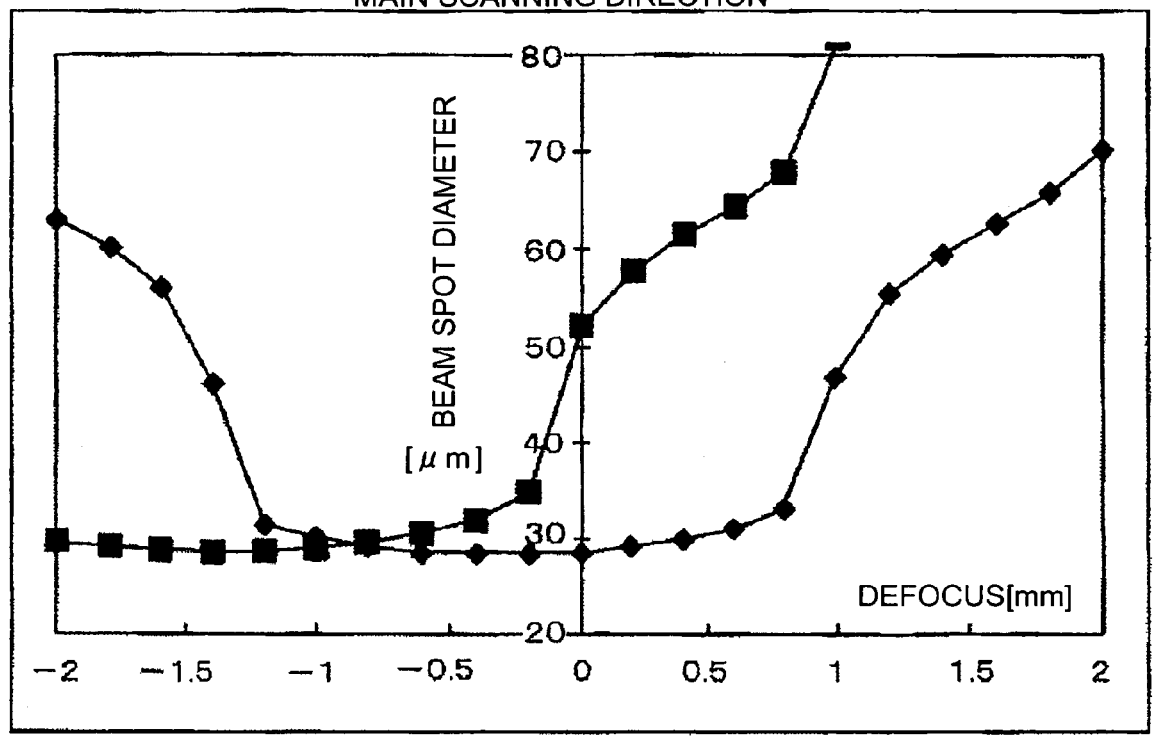
FIG. 15A and FIG. 15B depict characteristic of another comparative example devoid of a power diffractive surface.
Figure 15B:
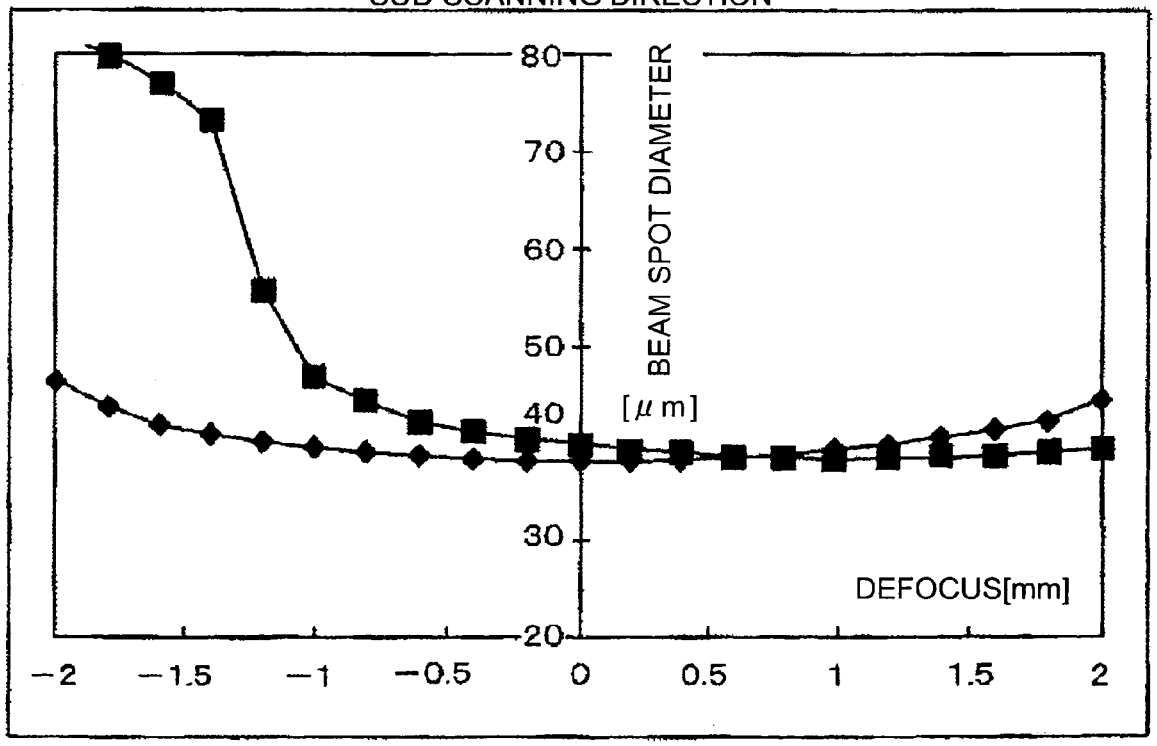

FIG. 15A and FIG. 15B, like FIG. 14A and FIG. 14B, are drawings illustrating the relation between the beam spot diameter in the main scanning and sub-scanning directions and the when the beam spot position defocuses on the scanning surface in the optical scanning device according to the comparative example. The conditions under which the relation between the two are plotted are, at the standard temperature of 25° C. ("Normal temperature"), and when there is a temperature rise of 20° C. ("temperature variation")

As is evident from FIG. 15A and FIG. 15B, as no power diffractive surfaces are present in the comparative example, the beam waist position varies substantially in both main scanning direction (FIG. 15A) and sub-scanning direction (FIG. 15B) when there the temperature goes up, thus necessitating drastic steps for preventing beam waist position variation to obtain high-resolution images.

Figure 16:
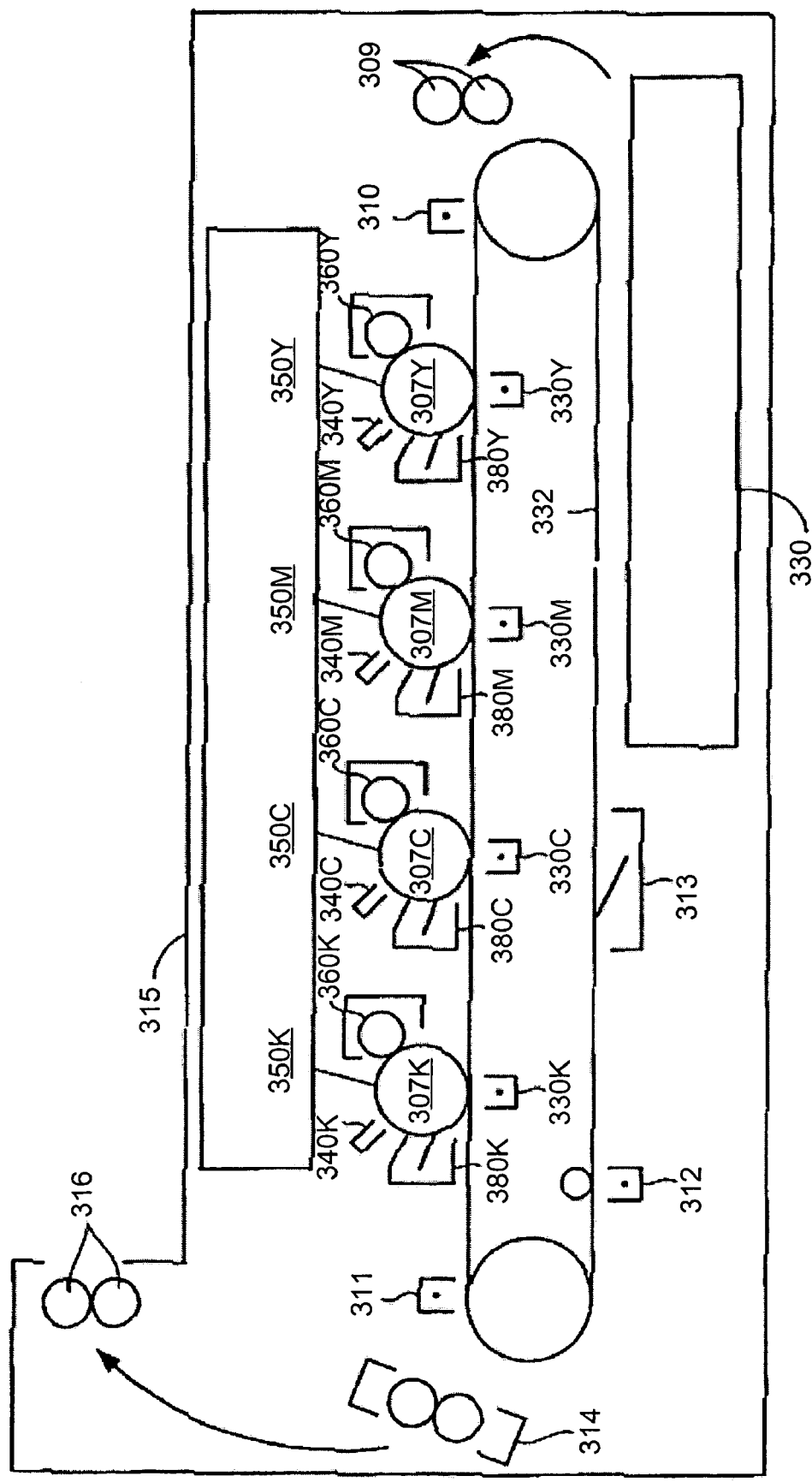
FIG. 16 is a schematic of yet another image forming apparatus.

FIG. 16 is a schematic diagram of the image forming apparatus according to another embodiment of the present invention.

The image forming apparatus in question is a tandem-type full color laser printer.

A paper feeding cassette 330 and a transfer belt 332 that carries a not shown transfer sheet fed by the paper feeding cassette 330 are disposed horizontally at the bottom of the image forming apparatus. Four photosensitive members for the four colors yellow Y, magenta M, cyan C, and black K, namely, 307Y, 307M, 307C, and 307K are arranged in that order from the upstream end, above the transfer belt 332 at equal spacing between them. In the description hereinafter, the reference symbols Y, M, C, and K will denote the colors yellow, magenta, cyan, and black, respectively.

All the photosensitive members 307Y, 307M, 307C, and 307K are of the same diameter. Around each of the photosensitive members 307Y, 307M, 307C, and 307K are arranged digital image processing members according to the sequence in which image processing occurs. For example, around the photosensitive member 307Y are sequentially arranged an electric charger 340Y, an optical scanning device 350Y, a developing device 360Y, a transfer charger 330Y, a cleaning device 380Y, etc. The other photosensitive members 307M, 307C, and 307K, also have a similar set up around them.

In other words, the image forming apparatus according to the present embodiment has four optical scanning devices 350Y, 350M, 350C, and 350K, one each for each photosensitive member 307Y, 307M, 307C, and 307K, which form the scanning surfaces for each of the colors, yellow, magenta, cyan, and black.

A separate optical scanning device having the configuration of the optical elements as shown in FIG. 12 may be provided one apiece for each photosensitive member. Alternatively, as disclosed in Japanese Patent Laid-Open Publication No. 2004-280056, a optical deflector (rotary polygonal mirror) shared by all the photosensitive members 307Y, 307M, 307C, and 307K, and one lens 306-1 of the scanning optical system shared by two photosensitive members 307M and 307Y, and another lens 306-1 shared by the other two photosensitive members 307K and 307C.

Around the transfer belt 332 are arranged a pair of resist rollers 309 upstream of the photosensitive member 307Y, a belt separating charger 311 downstream of the photosensitive member 307K, quenching charger 312, a belt cleaning device 313, etc. Further downstream of the belt separating charger 311 is disposed a fixing device 314 which is oriented towards an ejection tray 315 and is connected to a pair of ejection rollers 316.

In the image forming apparatus having the structure described above, in full-color mode, each of the optical scanning devices 359Y, 350M, 350C, and 350K carries out optical scanning based on the image signal of each color Y, M, C, and K and forms an electrostatic latent image on each of the photosensitive members 307Y, 307M, 307C, and 307K. These electrostatic latent images are developed by the toners of the respective colors and converted to toner images. The toner images electrostatically adhere to the transfer belt 332 and are sequentially transferred to superposed on the transfer sheet. The superposed toner image on the transfer sheet is fixed by the fixing device 314 to form a full color image. The transfer sheet bearing the full color image is ejected to the ejection tray 315.

By using the optical scanning device according to the fifth working example in the image forming apparatus according to the present embodiment, always a steady beam spot diameter can be ensured. Thus, a compact and cost-effective image forming apparatus can be realized that produces high-resolution images.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a light source that emits a light beam;
   a first optical system that guides the light beam emitted by the light source;

an optical deflector that deflects the light beam guided by the first optical system; and a second optical system that converges the light beam deflected by the optical deflector on a surface to be scanned, wherein the first optical system includes at least one resin lens having a diffractive surface, the second optical system includes at least one resin optical element, and a beam diameter depth in a main scanning direction, Wm, that can have a maximum intensity of $1/e^2$, satisfies conditions $$\Delta m1 \Delta m2 \Delta m3 - \Delta d1 \times (f2/f1)^2 < Wm/40 \quad (1)$$

$$\Delta d1 > 0 \text{ and } \Delta m2 < 0 \quad (2)$$

where, $\Delta m1$ is a beam waist position shift in the main scanning direction due to a change in the power in a refracting unit when the temperature in the first optical system rises by 1° C., $\Delta m2$ is a beam waist position shift in the main scanning direction due to a change in the power in a diffracting unit when the temperature in the first optical system rises by 1° C., $\Delta m3$ is a beam waist position shift in the main scanning direction when the temperature in the second optical system rises by 1° C., $\Delta d1$ is a shift in the distance between a forward principal point of the first optical system in the main scanning direction and the light source when the temperature in the first optical system rises by 1° C., $f1$ is a focal distance of the first optical system in the main scanning direction, and $f2$ is a focal distance of the second optical system in the main scanning direction.

2. The optical scanning device according to claim 1, wherein the light source is a semiconductor laser device, and the beam diameter depth in the main scanning direction, Wm, that can have a maximum intensity of $1/e^2$, satisfies a condition, $$-Wm < \Delta m'1 + \Delta m'2 \Delta m'3 < 0 \quad (3)$$

where, $\Delta m'1$ is a beam waist position shift in the main scanning direction due to a change in the power in the refracting unit of the first optical system, $\Delta m'2$ is a beam waist position shift in the main scanning direction due to a change in the power in the diffracting unit of the first optical system, and $\Delta m'3$ is a beam waist position shift in the second optical system in the main scanning direction, when the emission wavelength of the light source is increased by 1 nm.

3. The optical scanning device according to claim 1, wherein the first optical system includes at least one glass lens, the power of the glass lens in the main scanning direction being greater than the power of the resin lens in the main scanning direction.

4. The optical scanning device according to claim 1, wherein the first optical system and the second optical system include a plurality of lenses and all the lenses are resin lenses.

5. The optical scanning device according to claim 1, further comprising a housing configured to house the first optical system and the second optical system, wherein the housing includes an air passage that allows flow of air between the first optical system and the second optical system.

6. An optical scanning device comprising:
a light source that emits a light beam;
a first optical system that guides the light beam emitted by the light source;
an optical deflector that deflects the light beam guided by the first optical system; and a second optical system that converges the light beam deflected by the optical deflector on a surface to be scanned, wherein the first optical system includes at least one resin lens having a diffractive surface, the second optical system includes at least one resin optical element, and a beam diameter depth in a sub-scanning direction, Ws, that can have a maximum intensity of $1/e^2$, satisfies conditions $$\Delta s1 + \Delta s2 + \Delta s3 - \Delta d1 \times (\beta1 \times \beta2)^2 < Ws/40 \quad (4)$$

$$\Delta d1 > 0 \text{ and } \Delta s2 + \Delta s2 < 0 \quad (5)$$

where, $\Delta s1$ is a beam waist position shift in the sub-scanning direction due to a change in the power in a refracting unit when the temperature in the first optical system rises by 1° C., $\Delta s2$ is a beam waist position shift in the sub-scanning direction due to a change in the power in a diffracting unit when the temperature in the first optical system rises by 1° C., $\Delta s3$ is a beam waist position shift in the sub-scanning direction when the temperature in the second optical system rises by 1° C., $\Delta d1$ is a shift in the distance between a forward principal point in a main scanning direction of the first optical system and the light source when the temperature in the first optical system rises by 1° C., $\beta1$ is a lateral magnification of the first optical system in the sub-scanning direction, and $\beta2$ is a lateral magnification of the second optical system in the sub-scanning direction.

7. The optical scanning device according to claim 6, wherein the light source is a semiconductor laser device, and the beam diameter depth in the sub-scanning direction, Ws, that can have a maximum intensity of $1/e^2$, satisfies a condition $$-Ws < \Delta s'1 + \Delta s'2 + \Delta s'3 < 0 \quad (6)$$

where, $\Delta s'1$ is a beam waist position shift in the sub-scanning direction due to a change in the power in a refracting unit of the first optical system, $\Delta s'2$ is a beam waist position shift in the sub-scanning direction due to a change in the power in the diffracting unit of the first optical system, and $\Delta s'3$ is a beam waist position shift in the sub-scanning direction in the second optical system, when the emission wavelength of the light source is increased by 1 nm.

8. The optical scanning device according to claim 6, wherein the first optical system includes at least one resin lens having a diffractive surface, the second optical system includes at least one resin optical element, and a beam diameter depth in a main scanning direction, Wm, that can have a maximum intensity of $1/e^2$, satisfies conditions $$\Delta m1 + \Delta m2 + \Delta m3 - \Delta d1 \times (f2/f1)^2 < Wm/40 \quad (1)$$

$$\Delta d1 > 0 \text{ and } \Delta m2 < 0 \quad (2)$$

where, $\Delta m1$ is a beam waist position shift in the main scanning direction due to a change in the power in a refracting unit when the temperature in the first optical system rises by 1° C., $\Delta m2$ is a beam waist position shift in the main scanning direction due to a change in the power in the diffracting unit when the temperature in the first optical system rises by 1° C., $\Delta m3$ is a beam waist position shift in the main scanning direction when the temperature in the second optical system rises by 1° C., Δd1 is a shift in the distance between a forward principal point of the first optical system in the main scanning direction and the light source when the temperature in the first optical system rises by 1° C., f1 is a focal distance of the first optical system in the main scanning direction, and f2 is a focal distance of the second optical system in the main scanning direction.

9. The optical scanning device according to claim 6, wherein the light source is a semiconductor laser device, and
the beam diameter depth in the main scanning direction, Wm, that can have a maximum intensity of $1/e^2$, satisfies a condition, $$-Wm < \Delta m'1 + \Delta m'2 + \Delta m'3 < 0 \quad (3)$$

where, Δm'1 is a beam waist position shift in the main scanning direction due to a change in the power in the refracting unit of the first optical system, Δm'2 is a beam waist position shift in the main scanning direction due to a change in the power in the diffracting unit of the first optical system, and Δm'3 is a beam waist position shift in the second optical system in the main scanning direction, when the emission wavelength of the light source is increased by 1 nm.

10. An optical scanning device comprising:
a light source that emits a light beam;
a coupling lens that shapes the light beam into a beam pattern;
an anamorphic optical element that guides the light beam shaped by the coupling lens;
an optical deflector that deflects the light beam guided by the anamorphic optical element; and
a scanning optical system that converges the light beam deflected by the optical deflector on a surface to be scanned to form a laser spot, wherein
the scanning optical system includes more than one resin lens,
the anamorphic optical element is an anamorphic resin lens having a first surface and a second surface, the first surface being anamorphic refractive surface, the second surface bearing thereon a power diffractive surface with an elliptical shape and having an axis in a main scanning direction, and the power of the power diffractive surface in a sub-scanning direction is larger than the power in the main scanning direction, and
the power of the power diffractive surface is set so that a beam waist position shift in the main scanning direction or the sub-scanning direction or both the main scanning direction and the sub-scanning direction, caused by mode hopping or temperature variation in the semiconductor laser device is substantially zero.

11. The optical scanning device according to claim 10, wherein the anamorphic optical element has no power in the main scanning direction and a positive power in the sub-scanning direction.

12. The optical scanning device according to claim 10, wherein an absolute value of a curvature radius of the refractive surface of the anamorphic optical element is greater in the main scanning direction is greater than in the sub-scanning direction.

13. The optical scanning device according to claim 10, wherein the coupling lens is a glass lens.

14. An optical scanning device comprising:
a light source that emits a light beam;
a coupling lens that shapes the light beam into a beam pattern;
an anamorphic optical element that guides the light beam shaped by the coupling lens;
an optical deflector that deflects the light beam guided by the anamorphic optical element; and
a scanning optical system that converges the light beam deflected by the optical deflector on a surface to be scanned to form a laser spot, wherein
the scanning optical system includes more than one resin lens,
the anamorphic optical element is an anamorphic resin lens having a first surface and a second surface, the first surface being anamorphic refractive surface, the second surface bearing thereon a power diffractive surface having an axis in a main scanning direction,
the power of the power diffractive surface is set so that a beam waist position shift in the main scanning direction or a sub-scanning direction or both the main scanning direction and the sub-scanning direction, caused by mode hopping or temperature variation in the semiconductor laser device is substantially zero, and
the power diffractive surface is an elliptical power diffractive surface formed on a plane surface.

15. An image forming apparatus comprising an optical scanning device that includes
a light source that emits a light beam;
a first optical system that guides the light beam emitted by the light source;
an optical deflector that deflects the light beam guided by the first optical system; and
a second optical system that converges the light beam deflected by the optical deflector on a surface to be scanned, wherein
the first optical system includes at least one resin lens having a diffractive surface,
the second optical system includes at least one resin optical element, and
a beam diameter depth in a main scanning direction, Wm, that can have a maximum intensity of $1/e^2$, satisfies conditions $$\Delta m1 + \Delta m2 + \Delta m3 - \Delta d1 \times (f2/f1)^2 < Wm/40 \quad (1)$$

$$\Delta d1 > 0 \text{ and } \Delta m2 < 0 \quad (2)$$

where, Δm1 is a beam waist position shift in the main scanning direction due to a change in the power in a refracting unit when the temperature in the first optical system rises by 1° C., Δm2 is a beam waist position shift in the main scanning direction due to a change in the power in the diffracting unit when the temperature in the first optical system rises by 1° C., Δm3 is a beam waist position shift in the main scanning direction when the temperature in the second optical system rises by 1° C., Δd1 is a shift in the distance between a forward principal point of the first optical system in the main scanning direction and the light source when the temperature in the first optical system rises by 1° C., f1 is a focal distance of the first optical system in the main scanning direction, and f2 is a focal distance of the second optical system in the main scanning direction.

16. An image forming apparatus comprising:
a photosensitive image bearing unit;
an optical scanning unit that scan a surface of the image bearing unit with a light beam to thereby forming a latent image on the image bearing unit; and
a developing unit that develops the latent image on the image bearing unit into a visual image, wherein
the optical scanning unit includes
a light source that emits a light beam;
a coupling lens that shapes the light beam into a beam pattern;

an anamorphic optical element that guides the light beam shaped by the coupling lens;

an optical deflector that deflects the light beam guided by the anamorphic optical element; and a scanning optical system that converges the light beam deflected by the optical deflector on a surface to be scanned to form a laser spot, wherein the scanning optical system includes more than one resin lens, the anamorphic optical element is an anamorphic resin lens having a first surface and a second surface, the first surface being anamorphic refractive surface, the second surface bearing thereon a power diffractive surface with an elliptical shape and having an axis in a main scanning direction, and the power of the power diffractive surface in a sub-scanning direction is larger than the power in the main scanning direction, and the power of the power diffractive surface is set so that a beam waist position shift in the main scanning direction or the sub-scanning direction or both the main scanning direction and the sub-scanning direction, caused by mode hopping or temperature variation in the semiconductor laser device is substantially zero.

* * * * *